② United States Patent [19] [11] 3,772,657
Marsalka et al. [45] Nov. 13, 1973

[54] MAGNETIC TAPE DATA HANDLING SYSTEM EMPLOYING DUAL DATA BLOCK BUFFERS

[75] Inventors: Joseph P. Marsalka, Columbus; Charles F. Spademan, Worthington, both of Ohio

[73] Assignee: MI$_2$, Inc., Columbus, Ohio

[22] Filed: Nov. 30, 1971

[21] Appl. No.: 203,245

Related U.S. Application Data

[63] Continuation-in-part of Ser. No. 123,187, March 11, 1971.

[52] U.S. Cl. ............................................ 340/172.5
[51] Int. Cl. ........................... G06f 3/00, G06f 5/06
[58] Field of Search ................................. 340/172.5

[56] References Cited

UNITED STATES PATENTS

| | | | |
|---|---|---|---|
| 3,241,125 | 3/1966 | Tomasulo et al. | 340/172.5 |
| 2,905,930 | 9/1959 | Golden | 340/172.5 |
| 3,020,525 | 2/1962 | Garrison et al. | 340/172.5 |
| 3,012,230 | 12/1961 | Galas et al. | 340/172.5 |
| 3,202,972 | 8/1965 | Stafford et al. | 340/172.5 |
| 3,155,940 | 11/1964 | Taylor | 340/172.5 |
| 3,293,618 | 12/1966 | Klein | 340/172.5 |

*Primary Examiner*—Gareth D. Shaw
*Attorney*—Robert E. Leblanc et al.

[57] ABSTRACT

There is disclosed a data handling system including input-output means, intermediate memory means and principal memory means, together with data transfer and processing control logic. Input and output parallel to serial and serial to parallel and code conversion capability are provided. Input-output temporary storage and data processing are provided by the intermediate memory which comprises a pair of random access memory units or the like. The principal memory is a magnetic tape system, preferably employing a magnetic tape cassette as a memory medium. The system is usable in various ways, for example as a data terminal capable of local keyboard and/or remotely controlled data storage and transmission. Data input and output may be in parallel or serial form and a variety of data rates and data code words may be accommodated without system modification.

Broadly stated, for operation in the record mode, the system accumulates data in a first one of the intermediate memory units through the input-output means. When the capacity of the first unit is reached, the entire data block is transferred to the principal memory at a high speed. While data is being transferred to the principal memory from the first intermediate memory unit, data is accumulated in the second intermediate memory unit. Transfer of data from the first intermediate memory unit is completed before the capacity of the second intermediate memory unit for incoming data is reached. Thus, when the second intermediate memory unit is full, its contents are transferred to the principal memory, and data is again accumulated in the first intermediate memory.

For playback, an entire block of data is transferred at high speed from the principal memory into a first intermediate memory and is thereafter provided through the input-output means to suitable data utilization devices at a data rate compatible with such devices. While data is being transmitted from the first intermediate memory unit, a data block is rapidly entered into the second intermediate memory unit. When the first unit is empty data is transmitted from the second unit, and the first unit is refilled.

Among the features provided by the system are error checking and correction on a character-by-character basis, message identification (search) based on selectable identifying code characteristics and compatibility with a a variety of keyboard controlled devices or other data input and output devices, and automatic and manual data gathering and processing machinery.

92 Claims, 32 Drawing Figures

United States Patent [19]
Marsalka et al.
[11] 3,772,657
[45] Nov. 13, 1973
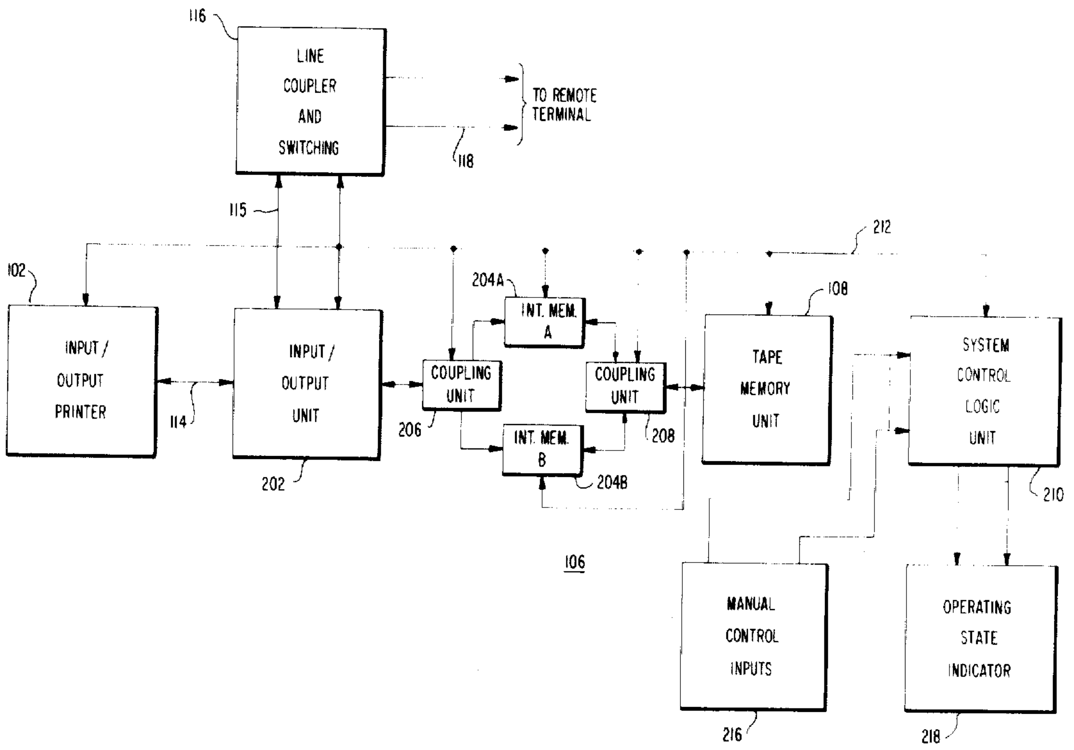

MAGNETIC TAPE DATA HANDLING SYSTEM EMPLOYING DUAL DATA BLOCK BUFFERS

INTRODUCTION

The present application is a continuation-in-part of copending application Ser. No. 123,187, filed Mar. 11, 1971, entitled Magnetic Tape Data System. The disclosure of said application Ser. No. 123,187 is fully incorporated by reference herein.

This invention relates to a keyboard controlled data storage and retrieval system. The invention is useful in a variety of commercial and technical data handling applications, but finds particular utility as a terminal for two-way data transmission or for message transmission in a system such as "TWX" or "TELEX," and will be described in this environment. However, with appropriate augmentation the system may be used in a variety of other ways, for example, as an automatic typewriting and composing system, an audio-dictation transcriber, in process control or as a means of data gathering, storage and control, or, in conjunction with a small-scale arithmetic processor such as a cash register, calculator, etc., as a minimum-scale computer capable of direct interface with larger, more versatile data processing machines, or even as all of these combined. These features are provided in a system which is simple and inexpensive in relation to other keyboard controlled terminals, yet possesses capabilities not available even in the more expensive and complex systems.

BACKGROUND

As explained in application Ser. No. 123,187, recent developments in data transmission, storage and processing have resulted in ready availability of access to computers for commercial and technical users, through established data transmission networks, such as telephone or teletypewriter systems at reasonable cost, for services such as space reservation, inventory control, centralized accounting, etc.

Our parent application Ser. No. 123,187 is directed to so-called "terminal equipment" used for obtaining access to and controlling a computer which is relatively inexpensive, reliable and durable, and sufficiently versatile, to be compatible with commonly used information transmission and processing formats, and data transmission rates. The equipment described here is particularly useful in the latter regard, to an extent even exceeding that of the system of application Ser. No. 123,187. The present system also improves the utilization of available communication channels for information transfer directly from one computer to another, requiring externally high information generating and handling capacity for the terminal equipment, and also for applications in which information is generated manually on a keyboard and/or received by an electromechanical printer.

Basically, these systems are organized to provide temporary storage of generated or received data before transmission or utilization. Our parent application describes various known systems employing keyboard control devices and remote data couplers to produce a punched paper tape or magnetic tape record of the information to be transmitted or received, and details various advantages and disadvantages of such systems.

One magnetic tape system described employs multibit code words uniquely identifying data characters which are stored as generated or received in parallel, i.e., all of the bits for each code word are simultaneously recorded in parallel tracks on the magnetic tape.

Among the noted disadvantages are the requirement for several parallel tape tracks, the need to augment the character code for remote transmission to include extra start, stop, and error checking bits, with the consequent need either to suppress all but the information bits for storage, and to generate (or regenerate) these bits when information is to be transmitted, or else to provide a sufficient number of parallel tape tracks for recording the entire code word.

For the foregoing reasons, the system of our parent application of the present application record multi-bit character code information serially on a single track, rather than in parallel. This appraoch eliminates many of the disadvantages of parallel recording such as the need for wide tape, multiple head recording apparatus, etc., but creates several new difficulties and complications not encountered in a parallel recording system.

Among these are the need to allow the tape transport mechanism to reach its intended operating speed before recording or playback without running the tape continuously between characters.

As will be understood, utilization of tape space is very inefficient if the tape runs continuously with no incoming data (as between characters) since much (actually, most) of the tape is empty. Even if the tape stops between characters, nothing is being recorded during the "start-up" and "slow-down" time and tape utilization is not still not efficient. To overcome this, efforts have been made to develop a tape transport not subject to a substantial "start" and "stop" delay, but no equipment meeting the various requirements appears to be available at reasonably low cost.

Other problems include compatibility between the operating speed of the keyboard (and the output printer) and the tape transport mechanism to permit maximum bit storage density on the tape, and maximum playback speed, and control of the operating speed of the tape transport mechanism. Tape transports are available which provide a high degree of speed control, but this is an important factor in the cost of transport, and thus ultimately in the overall cost of the system.

Another disadvantage of heretofore proposed serial recording systems is the difficulty of incorporating certain information processing functions such as error correction or message address or identifier searching.

Moreover, where it is desired to make the terminal system compatible with more than one information transmission format, it may be necessary to record information at one speed and to play it back at a different speed. This can be a substantial problem since data transmission rates currently employed or contemplated vary from 110 baud (bits/second) to 4800 band, or even higher. Since a relatively inexpensive transport could not possibly run fast enough to achieve a suitable bit density on tape for the highest baud rates, intermediate storage of some type has been found essential. All of the foregoing is detailed in our parent application.

BRIEF DESCRIPTION OF THE INVENTION

The present invention like that of our parent application, seeks to avoid the foregoing disadvantages of the serial and parallel recording formats in a serial system which provides flexibility in accommodating a wide variety of data processing and transmission applications at low cost without sacrifice of reliability or accuracy.

Broadly, the system of this invention includes an input-output printer, one or more magnetic tape memories and appropriate input-output, data processing, and control logic. A particularly important feature of this invention is the provision of an intermediate memory system including dual memory units for temporarily storing information read from the tape before further processing, and for storing incoming information before it is recorded. Each intermediate memory unit has a sufficient data capacity to permit use of a relatively slow speed inexpensive tape transport unit even for systems in which data is transmitted at 4800 baud, or even 9600 baud.

The two memory units are used alternately. For record operation, data is accumulated in one memory unit while data previously accumulated in the other memory unit is stored in the tape. For playback, data is transferred from the tape to one memory unit and is then released to a printer or a data coupler for remote transmission. During that time, the other memory unit receives data from the tape. Data transfer to and from the tape requires less time than accumulation or release of data by the memory unit. The tape runs only during data transfer to and from the memory unit.

Data is stored in the tape memory in serial form, with a fixed number of bits per character, independent of the information transmission and utilization format being employed. To accommodate different formats, simple input and output code converters are employed. The system is arranged to accommodate a single "plug-in" code converter for the desired code format if the system is to be used only with a single operating code. Alternatively, a plurality of input-output code converters may be provided and selectably operated to allow use of the system in conjunction with any one of several data transmission media or data processing systems.

To accommodate different clock or synchronizing rates characteristic of different information formats, the master timing control unit of the system is arranged to provide signals at all needed frequencies, with the particular frequencies for a given format being selected along with the code converter.

Because data is transferred to and from the tape only in blocks (corresponding to the capacity of the memory unit), the tape runs continuously for the entire data block. Maximum information storage density is thus achieved by eliminating lengthy pauses between characters corresponding to the "start" and "stop" time for the tape transport mechanism.

Further, since the electromechanical characteristics of the tape transport mechanism do not affect the operation of the printer, and vice versa, the printer and the tape mechanism may each be operated at their respective optimum speeds. This assures maximum rapid printout speed, and the desired signal to noise ratio for the tape. Also, when recording, it eliminates the possiblity that the typing speed of an accomplished typist will be hindered by a slow machine.

Use of the intermediate memory units also permits substantially complete independence between the respective bit rates of incoming and outgoing data and flexibility of changing the information transmission format within the system simply and conveniently. Thus, information may be provided over a remote communication channel at a high speed substantially in excess of that suitable for operation of the input-output printer at either end. Further, since information transmission and receipt are controlled by a master timing source, the intermediate memory units may receive information from a low-speed or a high-speed source, and the information is recorded on the magnetic tape at a rate independent of the rate at which it was received. Likewise, information is transferred from the tape to the intermediate memory units at an optimum speed, and is transferred to a utilization device at a rate suitable for that device. On this way, the system may readily accommodate a wide variety of input and output data utilization devices with little or no system modification.

An advantage related to the foregoing is that because the characteristics of the tape transport mechanism do not affect and are not affected by the characteristics of input and output equipment connected to the system, a simple tape transport mechanism may be employed, the only requirements being that the same is durable and reliable and that it be capable of operating in the forward and reverse directions. The playback process is controlled by a timing track on the tape which is used to synchronize the intermediate memory. The timing track is recorded simultaneously with the message information whereby the recording and playback processes are essentially independent of tape speed. This allows further simplification of the tape drive and the information transfer control logic.

In fact, because the demands on the tape transport mechanism are so limited, it has been found possible to employ a simple and inexpensive transport mechanism with standard ⅛-inch magnetic tape cassette as the memory unit, with a substantial reduction in the cost and complexity.

Another important advantage derived from utilization of the intermediate memory units is a considerably simplified and more rapid procedure for address search and error correction. Since information is transferred to and from memory in large blocks, identification of a particular character combination at the beginning of or elsewhere in a message can proceed simply by scanning an entire data block at high speed to locate the desired character combination. This can be done quite rapidly, resulting in a substantial increase in the speed with which a search may be accomplished and a simplification of the required control logic.

Correspondingly, error correction takes place in the intermediate memory permitting faster and simpler access to information required to be corrected.

Since the data storage and retrieval and data processing functions of this system are both simple and flexible, many uses of the system as detailed in our parent application may easily be accommodated.

OBJECTS OF THE INVENTION

Accordingly, it is an object of this invention to provide an improved magnetic tape data storage and processing system for use as a terminal in a remote data or message communication network. It is a related object of this invention to provide such a system which is readily adaptable for use in a variety of data storage and transmission functions such as automatic typing and composing, audio dictation, central processing of telemetered data from remote control systems, etc.

A further object of this invention is to provide a magnetic tape data terminal system having one or more keyboard controlled input-output devices such as a typewriter, a cash register, an adding machine, etc.

Another object of this invention is to provide a keyboard controlled magnetic tape data terminal which is simpler and less expensive than currently available devices, yet reliable and durable and capable of providing a wide range of functions.

An additional object of this invention is to provide a magnetic tape data terminal system which is compatible with a wide range of code formats and input-output devices operating either serially or in parallel A related object of this invention is to provide a data terminal system as described above which is compatible with code formats and input-output devices having a wide range of operating speeds and information handling capacities.

Yet another object of this invention is to provide a magnetic tape data terminal system in which information is transferred to and from the tape memory in large data blocks.

A further object of this invention is to provide a magnetic tape terminal system in which data is recorded serially on one tape track and in which synchronizing information for control of data playback from the first track is recorded on a second track.

It is another object of this invention to provide a data terminal system in which data is transferred to and from the tape to an intermediate memory comprising two separate intermediate memory units. A related object is to provide such a system in which information is accumulated in a first memory unit and transferred to the tape when the first memory unit reaches its capacity and in which data then accumulates in the second intermediate memory, while data from the first memory unit is transferred to the tape. Another related object is to provide such a system in which data is played back from the tape to fill a first intermediate memory unit before utilization, after which the second memory unit is filled while data is released from the first memory unit.

An additional object of this invention is to provide a magnetic tape terminal system in which information is stored in the system on a bit-by-bit basis in serial form with a fixed number of bits being stored per character independent of the code format. A related object of the invention is to provide such a system in which the number of bits stored includes all the information bits and error checking bits of the largest code format with which the system is to be compatible.

A further object of this invention is to provide a magnetic tape data terminal system in which transfer of information is controlled by a master timing source operating through a multiple output counting circuit and program control means for producing required sequences of timing pulses at various required frequencies. A related object is to provide such a system in which the rate at which information is transferred into and out of the system independent of the rate at which information is transferred into and out of the tape memory.

Another object of this invention is to provide a magnetic tape data terminal system having error correction and message identification searching capability.

It is also an object of this invention to provide a magnetic tape data terminal system employing a magnetic tape cassette as the memory medium.

A further object of this invention is to provide a magnetic tape data terminal system having a magnetic tape cassette memory and an intermediate memory comprising dual memory units in which information is transferred between the magnetic tape memory and one of the intermediate memory units while data accumulates in or is released from the other intermediate memory unit. A related object is to provide such a system in which information transfer between the tape memory and the intermediate memory is sufficiently rapid that it occasions no delay in the input and/or output code formats.

Another object of this invention is to provide a magnetic tape data terminal system compatible with a variety of information transmission code formats in which one or more non-information-bearing bits is suppressed during storage, and generated or regenerated at the time of information transmission.

It is also an object of this invention to provide a magnetic tape data terminal system including an input-output printer and a coupling unit for connecting the system to a communication channel, an input-output unit connected to the coupling unit and the printer, an intermediate memory including two large capacity memory units, a tape memory unit, and a logic subsystem for controlling the information storage and retrieval and processing functions.

Another object of this invention is to provide a magnetic tape data terminal system having provision for performing an error-checking operation on outgoing and/or incoming characters and for providing an indication whenever an error is detected.

It is a further object of this invention to provide a magnetic tape data terminal system in which the above-mentioned input-output unit includes input-output logic providing selective gating, code conversion, parity checking and parity bit generation, a shift register and control means for the shift register, and a logic unit for transferring information between the shift register and the intermediate memory.

A further object of this invention is to provide a magnetic tape data terminal system as described above in which the control logic subsystem comprises an intermediate memory selection and control unit, a special character identification and address search logic unit, a mode control logic unit, a tape control logic unit, a master timing source, and a master sequence control unit.

The exact nature of this invention, together with other objects and advantages thereof, will be apparent from consideration of the following detailed description and the accompanying drawings, in which:

Figure 5:
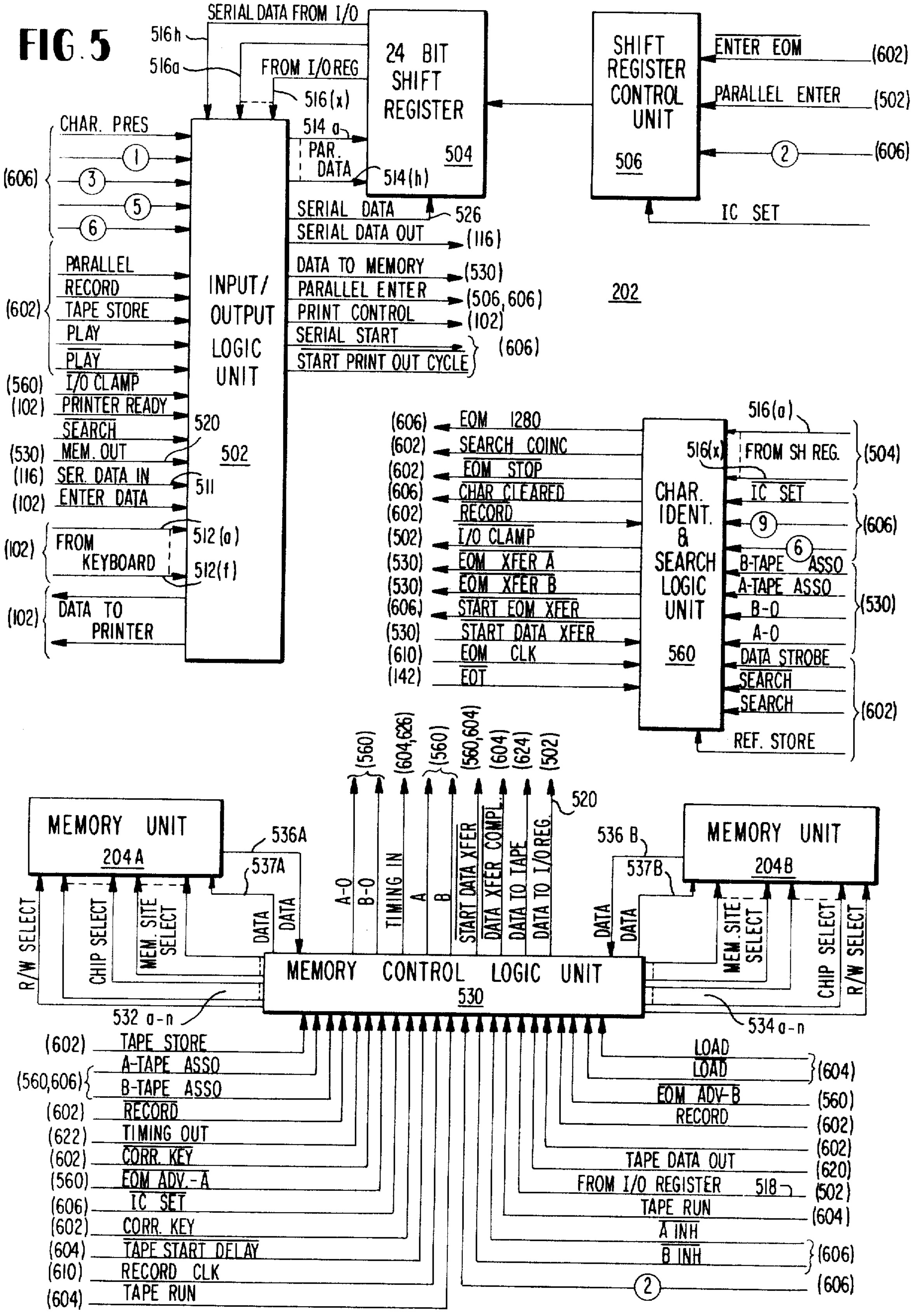
FIGS. 5 and 6 are a detailed block diagram showing the construction and interconnection of the system illustrated generally in FIG. 2.
Figure 6:
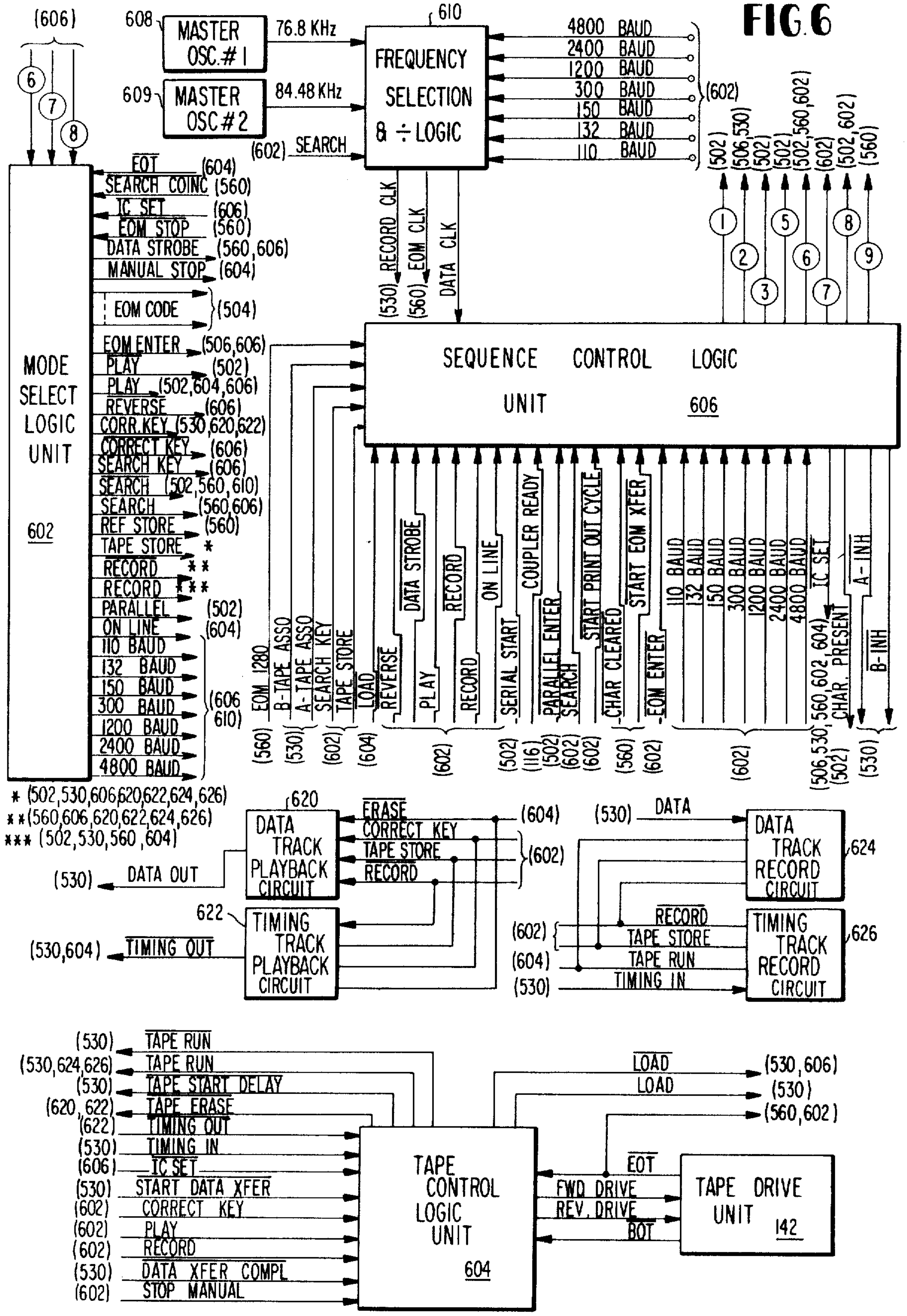

For convenient reference and correlation between the detailed description and the drawings, a reference numerical scheme has been adopted wherein the first digit or digits represent the FIGURE number on which the reference numeral first appears. Thus, an item bearing the reference numeral 604 first appears on and is described in connection with FIG. 6, and items bearing the refernece numerals 1208 and 1294 first appear on and are described in connection with FIG. 12. Reference numerals applying to portions of the system illustrated in the comprehensive drawing of FIGS. 1 and 2 (bearing reference numerals such as 102, 212, etc.) are carried through in the remaining drawings to the extent feasible. Lkewise, reference numerals pertaining to portions of the system shown in the detailed block diagram of FIGS. 5 and 6 are carried through to the detailed circuit drawings of FIGS. 8, 9, 11, 12, 14, 15, 16, 18, 19, 21, 22, and 24.

OVERALL SYSTEM ORGANIZATION

Figure 1:
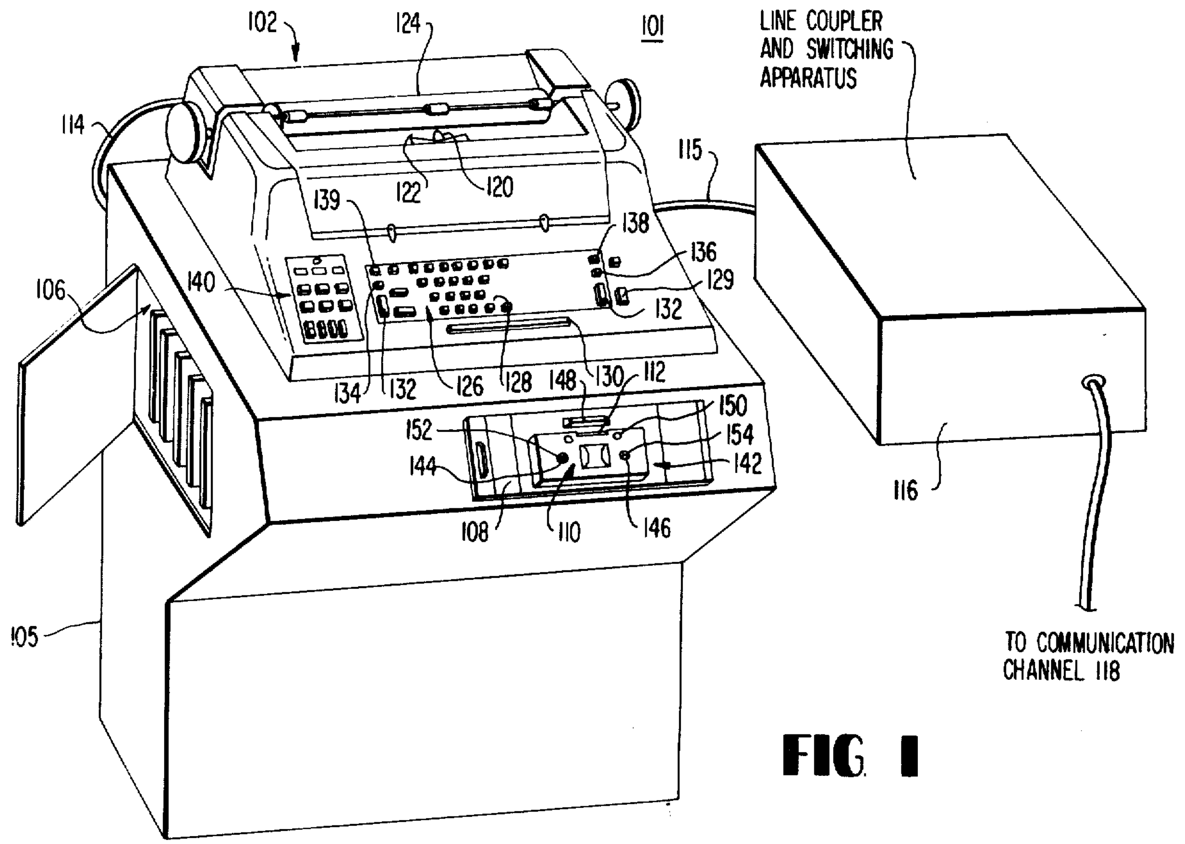
FIG. 1 is an overall pictorial view of a magnetic tape data terminal system constructed in accordance with the principles of the present invention.

Turning now to the drawings, FIG. 1 shows an overall pictorial view of the present invention used as a keyboard controlled input-output data terminal. The system, generally denoted 101, includes an input/output printer 102 shown mounted on a supporting pedestal 105 which houses an electronic data storage and processing unit 106 and a memory unit 108, preferably including a magnetic tape cassette 110 containing a data quality magnetic tape 112 as the memory medium. Printer 102 is connected to data storage and processing unit 106 by a multi-wire cable 114; a second cable 115 connects unit 106 to a communication line coupler and switching apparatus 116 constructed in any conventional or desired manner for interfacing with a communication channel 118. The latter may be a telephone or telegraph line when terminal 101 is used for remote communication, or more simply is a two-wire line of appropriate design when terminal 101 is to be connected to a central data processor in another part of the same or a closely adjacent building.

Printer 102 may be of any desired construction capable of meeting the following requirements:

*a*. In response to depression of any of a plurality of keys on an input keyboard, printer 102 should operate to produce typed copy on a sheet of paper. Simultaneously, the printer should provide serial or parallel electrical output signals on a set of output terminals, with the output signal patterns defining a set of multibit code words corresponding uniquely to each typed character and to the various typewriter operations such as paper feed, space, carriage return, etc. *b*. Likewise, in response to various combinations of signals externally provided serially or in parallel to a set of input terminals, printer 102 should operate to provide a typed output on a sheet of paper, with the particular typed message depending on the sequence of code words provided.

Several input/output printers meeting the above-stated requirements are available. One satisfactory type of parallel machine is an IBM Selectric typewriter such as shown in Palmer United Stages Pat. No. 2,919,002, modified as described in Decker et al U.S. Pat. No. 3,082,854. A particularly preferred printer unit, however, is the "Design 101" Input/Output Writer manufactured by Design Elements, Inc., of Columbus, Ohio, described and claimed in assignee's copending United States Patent Applications Ser. No. 79,202 filed Oct. 6, 1970 entitled Input-Output Typewriter Apparatus; Ser. No. 98,627, filed Dec. 16, 1970, entitled Solenoid Drive Circuit; and Ser. No. 101,502, filed Dec. 16, 1970, entitled Improved Solenoid Drive Circuit. Serial devices such as various Teletype machines may also be employed.

Briefly, as illustrated in FIG. 1, preferred printer 102 includes a so-called single element print head 120 mounted on a carrier 122 arranged to move longitudinally along a fixed paper support platen 124. A conventional keyboard 126 containing a plurality of alphanumeric keys 128, and ON-OFF switch 129 and a plurality of standard typewriter print format control keys such as Spacebar 130, Shift keys 132, and Shift-lock key 134, a Print Head Carrier Return key 136, a Backspace key 138, a Tabulator key 139, etc., permits control of the various typewriter functions.

In addition to the foregoing, printer 102 includes at least one auxiliary control keyboard 130 containing actuating keys for the special data storage, retrieval and processing functions hereinafter described.

Data storage and processing unit 106, memory unit 108, and, if feasible, even coupler unit 116 are preferably mounted in supporting pedestal 104, with printer 102 suitably positioned for comfortable access by an operator. Alternatively, a separate console may be provided, in which case, printer 102 would be located in customary fashion on a desk table, or the like, with the console positioned nearby for convenient access.

As illustrated in FIG. 1, memory unit 108 comprises a tape transport 142 including one or more drive motors and torque transmission apparatus (not shown) constructed in any conventional or desired manner for operating a pair of tape drive spindles 144 and 146 both clockwise and counterclockwise for forward and reverse tape movement. Memory unit 108 also includes magnetic recording and playback head 148 having two record and two playback elements. This provides for recording and playback of character and control function codes in a first track, and of timing signals in a second track. The latter are used to control the transfer of character and control function information from the first track, as hereinafter explained without dependence on the starting and stopping or speed control characteristics of the tape transport mechanism.

Magentic tape cassette 110 is supported by a plurality of suitable guide members 150 with drive spindles 144 and 146 engaging the tape drive openings 152 and 154 in the cassette body. As noted above, an important feature of the present invention is use of the dual buffer intermediate memory. This avoids dependence on the start and stop and speed control characteristics of the tape transport mechanism 128 by permitting playback and recording at a fixed, optimum bit rate, irrespective of the data baud rate. A relatively simple and inexpensive cassette tape transport may thus be used without sacrificing system reliability or accuracy. The cost saving resulting from use of a simplified transport is particularly noteworthy for data rates below 300 baud. Here, entertainment type cassette units operating at 1⅞ ips may be employed for particularly low cost "budget" systems, if desired. While systems having operating capabilities above 300 baud require tape transport operation at 15 ips, even these units may be simplified as a result of the dual buffer construction.

Also, as explained in detail below, the dual buffer memory arrangement facilitates data reception and transmission at a variety of baud rates, and simplifies certain data processing functions such as automatic search for a particularly identified message recorded in the tape memory, error correction, etc.

FUNCTIONAL ORGANIZATION OF SYSTEM (FIG. 2)

Figure 2:
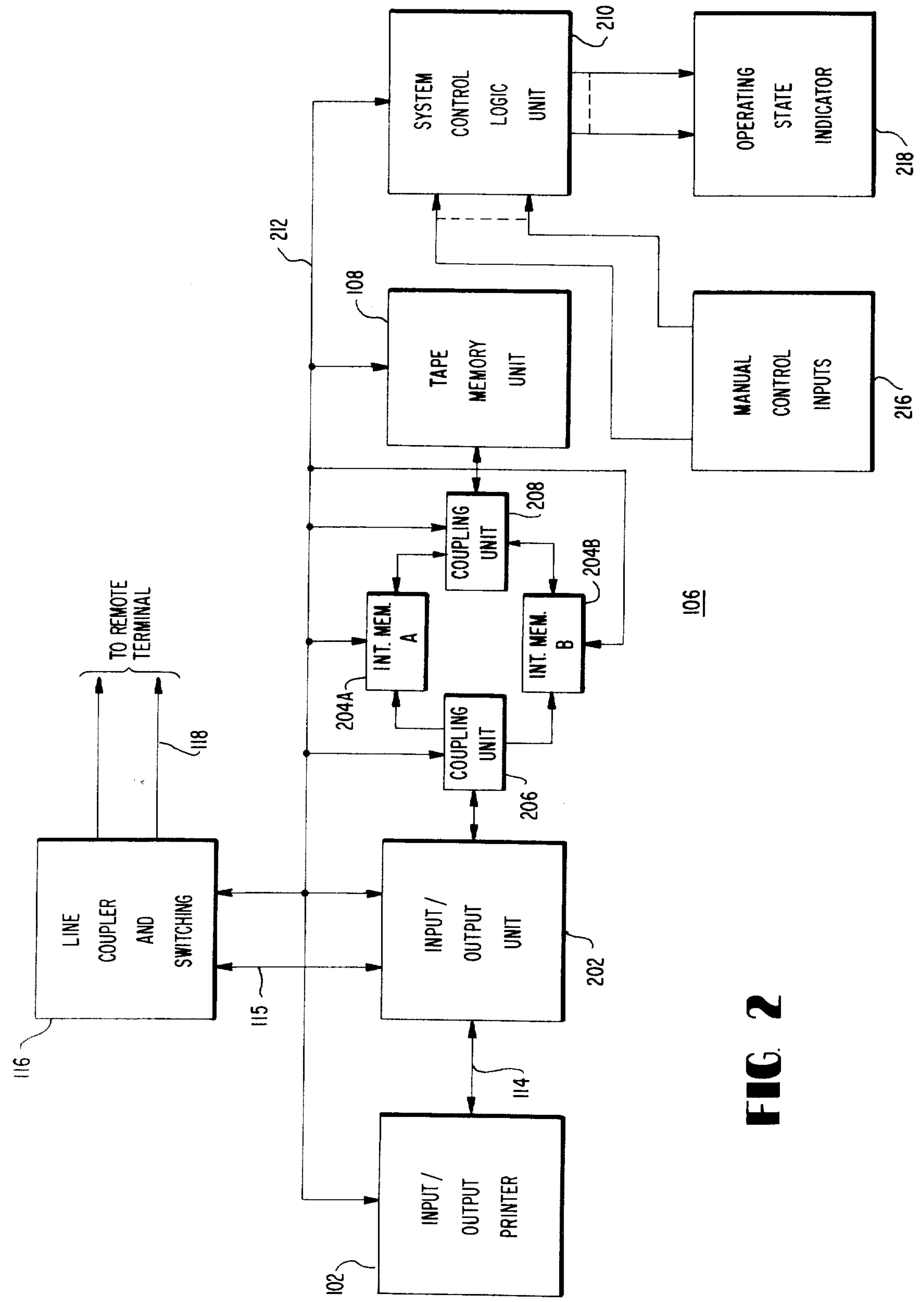
FIG. 2 is a generalized functional block diagram showing the organization of the system of FIG. 1.

Turning now to FIG. 2, there is shown functionally the organization of the system including input-output printer 102, data storage and processing unit 106, tape memory unit 108, and line coupler and switching unit 116.

As illustrated, data storage and processing unit 106 is comprised of an input-output unit 202 including an input-output buffer and required control logic, connected to printer 102 by cable 114, and to line coupler and switching unit 116 by cable 115. Data storage and processing unit 106 also includes a pair of intermediate memory units 204A and B, connected respectively to input-output unit 202 by coupling unit 206 and to tape memory unit 108 by coupling unit 208. The capacity of intermediate memory units is preferably at least 1280 bits per unit as explained in detail below.

Operational control for the entire system is provided by control logic unit 210 coupled to the system components mentioned above by signalling path 212 which provides signals for operating the various units, for seelecting memory units A or B, etc. Manual initiation of required operations is achieved by a set of manual control inputs 216 coupled to control system logic unit 206. As hereinafter explained, manual control inputs 216 represent the print format control keys on printer keyboard 126, and the function control keys contained in auxiliary control keyboard 140.

A set of visual indicators generally denoted 218 provides operating state information under control of system control logic unit 206.

SUMMARY OF OPERATING MODES

Briefly stated, the system illustrated in FIG. 2 is capable of functioning in six distinct modes as follows:

Mode 1: Information transfer from input-output printer 102 to tape memory 108 (LOCAL-RECORD);

Mode 2: Information transfer from tape memory 108 to input-output printer 102 (LOCAL-PLAY);

Mode 3: Information transfer from a remote terminal through line coupler and switching unit 116 to tape memory 108 (ON LINE-RECORD);

Mode 4: Information transfer from tape memory unit 108 to a remote terminal coupler 116 (ON LINE-PLAY);

Mode 5: High speed search for a body of data having a unique address code (SEARCH); and Mode 6: Error correction It should be noted, however, that Modes 5 and 6 are actually variants of the PLAY and RECORD modes, respectively.

It should also be noted that according to this invention, the need for transfer of information directly from printer 102 to a remote terminal, or vice versa, is avoided, which is advantageous for several reasons. For example, operation at data rates above 150 or even 132 band would require highly complex and costly ultra high-speed printers. Moreover, although the printer itself is a relatively lowspeed device, its steady operation speed usually will exceed that of the typist or other operator, resulting in highly inefficient channel utilization. However, for low speed operation, for example below 2400 baud, direct access between a remote terminal and printer 102 over line 118 can easily be provided, if desired.

Employment of memory unit 108 in all modes of operation is therefore preferred in terms of better utilization of all system components, and also provides the added advantage of simplified design and construction for the memory unit itself.

AUXILIARY KEYBOARD (FIG.3)

Figure 3:
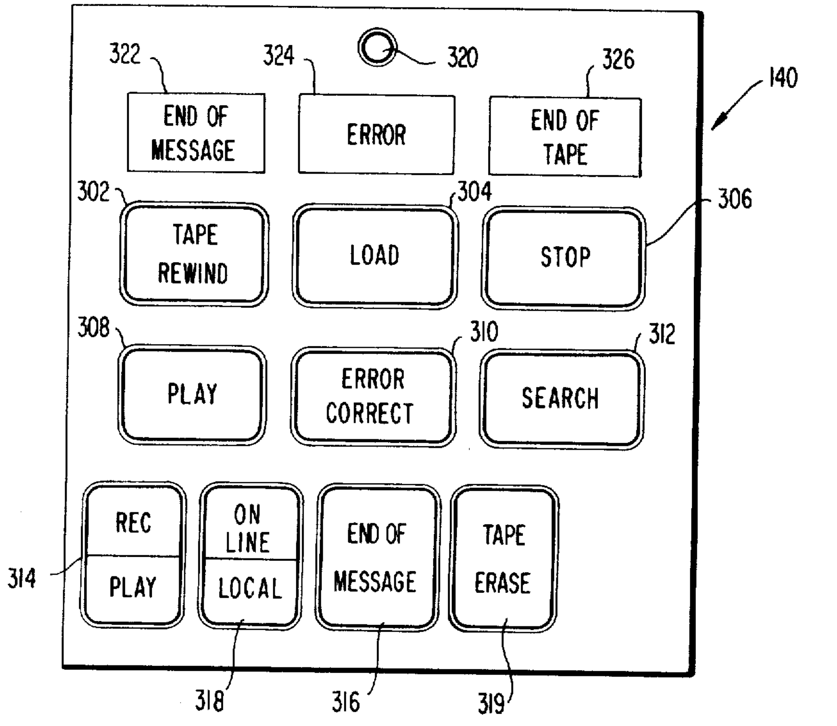
FIG. 3 is an enlarged view of the control keyboard shown in FIG. 1.

The manual controls required for selection of the desired system operating modes are contained on auxiliary keyboard 140. As illustrated in FIG. 3, auxiliary control keyboard 140 includes ten function control keys as follows:

302 Tape Rewind
304 Tape Load ("Load")
306 Stop
308 Playback Start ("Play")
310 Error Correction
312 Address Search ("Search")
314 Record-Playback Select
316 End of Message
318 Local-On Line Select
319 Tape Erase Also, auxiliary keyboard 140 includes the following illuminated indicators:

320 Power On
322 End of Message
324 Error
326 End of Tape

Control keys 302-318 may also be illuminated if desired, but preferably at least Load key 304 is illuminated to indicate to the operator that the load cycle has been completed, as hereinafter explained.

The above-mentioned control keys and indicators serve the following purposes:

Record-Playback Select Key 314: This is a two-position switch for conditioning those portions of the system required for Modes 1, 3 and 6 (RECORD) or for Modes 2, 4, and 5 (PLAY). A single two-position switch is preferred to prevent inadvertent simultaneous actuation of both record and playback modes of operation.

Local-On Line Select Key 318: This key conditions those portions of the system required for Modes 1 and 2 (LOCAL) or Modes 3 and 4 (ON LINE). Thus, with key 381 in the LOCAL position, the system will operate in Mode 1 if key 314 is in the RECORD position and Mode 2 if key 314 is in the PLAY position. Correspondingly, with key 318 in the ON LINE position, the system will operate in Mode 3 with key 314 in the RECORD position, and in Mode 4 with key 314 in the PLAY position.

Playback Start Key 308: When key 314 is in the PLAY position, depression of Playback Start Key 308 activates the pre-conditioned circuits required in Modes 1 and 3, and initiates transfer of information from the magnetic tape memory 108 to intermediate memory units A and B. Playback Start Key 308 is inoperative when key 314 is in the RECORD position.

Stop Key 306: This key permits the operator to halt operation in PLAY Modes 2 and 4, if necessary, and to stop the tape rewind operation if key 302 has been depressed previously. Restart of the halted operations is accomplished by again depressing Playback Start Key 308 or Tape Rewind Key 302. Key 306 does not affect system operation in RECORD Modes 1 and 3, nor is provision made for manually halting operation in these Modes (except by means of the main power key 129).

Tape Rewind Key 302: As suggested, Tape Rewind Key 302 actuates the tape drive mechanism to rewind the tape memory to the beginning of the tape. At the same time, the record and playback circuits are deactivated to prevent transfer of information to or from the tape memory, or erasure of stored information. A suitable Beginning of Tape Sensor halts the rewind operation after the tape has been fully rewound and returns the record and playback circuitry to its rest condition in readiness for further operator instructions.

Tape Erase Key 319: This provides an automatic operating cycle for completely erasing a tape. The cycle includes running the tape forward until the end of the tape is reached, the reversing the tape and rewinding to the beginning. During the entire operation, the record circuits are actuated to record a particular "rest" magnetic state on the entire tape, thereby clearing all previously recorded information.

Tape Load Key 304: This provides semi-automatic actuation of the tape mechanism for the purpose of locating the beginning of the first block of data recorded on a tape, or elsewhere on the tape if for some reason a substantial blank space has been left between two adjacent data blocks. This function is necessary since in the PLAY Modes, timing of certain operations depends upon the time interval between blocks of information recorded on the tape. Load Key 304 effectively bypasses the timing circuits and allows the tape to run continuously until recorded information is encountered, at which time the light in key 304 goes on, and the operator may begin a playback cycle by depressing Playback Start Key 308. Without Load Key 304, many successive depressions of Start Key 308 might be necessary before information appeared and operation actually commences.

Address Search Key 312: With Select Keys 314 and 318 in the RECORD and LOCAL positions respectively (Mode 1), depression of Search Key 312 together with one or more alphanumeric keys 125 generates a search code word which is used to identify a particular data block previously stored on the tape and which commences with the alpha-numeric sequence in question. Preferably, there is provided the capacity for generating a three-character search address. To accomplish a search, select key 314 is set in the PLAY position. Search key 312 is depressed, and held depressed while the address code is typed out. The Search Key is then released, and the tape plays forward alternately loading intermediate memories A and B, the contents of which are scanned at high speed until the desired sequence has been located. At that time, the machine pauses to await manual operator instructions. Should the entire tape memory be played without location of the address being searched, the system operation will cease and the end of tap indicator will be illuminated.

Error Correct Key 310: Error Correct Key 310 operates in conjunction with main keyboard 126. When key 310 is depressed, the last character stored in the accessible memory unit is deleted by reversing the memory unit and stepping it backward eight bits. The Error Correct Key is then released. When typing recommences, the corrected character is entered into the input/output register, and then into the intermediate memory in the same memory sites as the previous character. During this operation, the inaccessible intermediate memory is unaffected. Provision is also made for obtaining access to the inaccessible intermediate memory if necessary to effect deletion of additonal characters not available in the accessible memory unit.

End of Message Key 316: In the RECORD-LOCAL Mode, key 316 is used to record a predetermined character code, at the end of a message for subsequent use in stopping the tape after playback and printout or transmission of a complete message. In the ON LINE-RECORD or in either PLAY Mode an "end of message" code causes the system to halt operation pending receipt of further manual or automatic instructions. No provision is made for printing the "end of message" code since the same would serve no important purpose on the final printed copy.

Error Indicator 324: In the preferred embodiment ccch character code word includes a parity bit, and circuitry is provided in data storage and processing unit 104 for determining the parity of each character. Failure of an incoming character to exhibit the proper parity is indicated by a flashing of Error Indicator 324. The parity check is performed on all incoming and outgoing information. [In the PLAY-LOCAL Mode sensing of a parity error may also cause the printout of a character such as hyphen (-) or an asterisk (*) (or other desired character) to indicate that an incorrect character has been recorded.] Other utilization of the parity error detection such as return of an error indication to the sending terminal may also be provided, if desired.

End of Message Indicator 322: In the PLAY Modes, or in the RECORD-ON LINE MODE, recognition of the "end of message" code halts operation as previously noted. At the same time, End of Message Indicator 322 is illuminated to advise the operator of the system condition. The indicator remains illuminated until manually extinguished by depression of play key 308, load key 304 or certain other operations or until the main power switch is turned off.

End of Tape Indicator 326: The End of Tape Indicator is activated by a suitable sensing mechanism which responds to the complete transfer of all the tape to the takeup reel in the cassette (except for the retaining tab at the end of the tape leader which is permanently attached to the feed reel). Another sensor may also be provided to indicate near completion of the transfer of tape to the takeup reel thereby providing an indication that the memory capacity is nearly exhausted. Operation of the Near End of Tape Sensor may be arranged to flash the End of Tape Indicator intermittently until the end of the tape is actually reached, at which time Indicator 326 may be maintained continuously illuminated. Also, upon reaching the end of tape, the keyboard on printer 102 may be caused to lock thereby preventing attempted storage of any additional information.

PRINT FORMAT KEYS (FIG. 1)

In addition to the function control keys and indicators described above, certain of the keys on the main keyboard are actually also control keys. These are as follows:

Shift Keys 132: The shift keys operate in conventional fashion to select the upper or lower case symbol associated with each of the character keys. In the LOCAL-RECORD Mode, striking the shift key also generates a unique shift code which is recorded on the tape for later use in controlling the printout format. The shift code is generated twice, once when the shift key is depressed and again when the shift key is released. In the LOCAL-PLAY Mode, receipt of a shift code causes the character shift control mechanism in printer 102 to latch in the upper case position. Receipt of the subsequent shift code (corresponding to release of the shift key) causes the shift mechanism to unlatch.

Shift Lock Key 134: In the LOCAL-PLAY Mode, Shift Lock Key 134 operates to mechanically latch the shift mechanism of printer 102 in the upper case condition and to activate the shift code generating mechanism in the same manner as for Shift Keys 132. Subsequent depression of one of Shift Keys 132 releases the shift lock mechanism and generates the "shift return" code as previously noted.

Carrier Return Key 136: When printer 102 is operated manually, Carrier Return Key 136 actuates the line advance mechanism and the mechanism for returning print head carrier 122 to the left-hand margin position. In the two RECORD Modes, the carrier return code is stored on the tape for subsequent on line transmission in Mode 4 or for operation of the printer line advance mechanism and print head carrier in Mode 2.

Back-Space Key 138: This key serves the conventional typewriter function of spacing print head carrier 122 to the left. In the RECORD Modes (with Error Correct Key 310 not depressed) the "back-space" code word is recorded on the tape.

In the LOCAL-PLAY Mode, the "back-space" code word causes print head carrier 122 to move one space to the left each time the code word is encountered. As will be appreciated, the latter is a formatting function used to underscore or to produce some other compound character by overprinting.

Tabulator Key 139: The Tabulator ("Tab") Key serves the normal typewriter function of advancing the print head carrier 122 a number of spaces from its then current location until a Tab stop is encountered. Depression of the Tab key also generates a code word for storage. In the LOCAL-PLAY Mode, the "Tab" code advances the print head carrier from its then current position to the next present Tab stop. One or more Tab stops are manually set; so that ultimate position of the print head carrier depends on its positions at the time the "Tab" code appears, and the sequence of set Tab stops. As will be appreciated, if it is required to advance the print head carrier through two or more Tab stops, this is accomplished by recording two (or more) "Tab" codes in sequence, whereupon the Tab operation is repeated during the subsequent playback.

CODE FORMATS

Before proceeding with a detailed description of the system and the operation thereof, several representative information processing and transmission formats will be considered.

As mentioned, depression of the keys on printer 102 generates a multi-bit code words uniquely identifying each character and format key for recording in the tape memory. The printer described above in connection with FIG. 1 operates on the basis of a 6 bit code, thereby providing 64 different code combinations to represent the alphanumeric characters, punctuation, format codes, etc., required for operation of the printer. By way of example, Table 1 below sets forth the binary code combinations allocated to the various characters and operations in accordance with one embodiment of the system. Bits 1 thru 6 are denoted as 1, 2, 4, 8, A, and B respectively.

| | | | | | | | |
|---|---|---|---|---|---|---|---|
| A | a | 1 | 2 | 4 | | | B |
| B | b | 1 | 2 | | 8 | A | |
| C | c | 1 | 2 | 4 | | A | |
| D | d | 1 | | 4 | | A | |
| E | e | | | 4 | | A | |
| F | f | 1 | 2 | | | A | B |
| G | g | 1 | | | | A | B |
| H | h | 1 | | | 8 | A | |
| I | I | | 2 | 4 | | | B |
| J | j | | | | | A | B |
| K | k | | 2 | 4 | | A | |
| L | l | | | | 8 | A | |
| M | m | 1 | | | | | B |
| N | n | | 2 | | | A | |
| O | o | | | | 8 | | B |
| P | p | | | 4 | | A | B |
| Q | q | | 2 | 4 | | A | B |
| R | r | 1 | | 4 | | | B |
| S | s | 1 | | | 8 | | B |
| T | t | | | | | A | |
| U | u | 1 | 2 | | | A | |
| V | v | 1 | 2 | | | | B |
| W | w | 1 | 2 | | 8 | | B |
| X | x | 1 | | | | A | |
| Y | y | 1 | | | 8 | A | B |
| Z | z | | 2 | | 8 | | |
| ) | 0 | 1 | | | 8 | | |
| ± | 1 | 1 | | | | | |
| a | 2 | | 2 | | | | |
| # | 3 | 1 | 2 | | | | |
| $ | 4 | | | | 8 | | |
| % | 5 | | | 4 | | | |
| ¢ | 6 | | 2 | 4 | | | |
| & | 7 | 1 | | 4 | | | |
| * | 8 | 1 | 2 | 4 | | | |
| ( | 9 | 1 | 2 | | 8 | | |
| , | , | 1 | 2 | 4 | | A | B |
| . | . | | 2 | | | | B |
| : | ; | 1 | | 4 | | A | B |
| + | = | | 2 | | | A | B |
| ? | / | | | | 8 | A | B |
| " | , | | | 4 | | | B |
| — | - | 1 | 2 | 8 | | A | B |
| ! | ° | | | | | | B |
| SPACE | | | | | | | |
| BACKSPACE | | | 2 | 4 | 8 | | B |
| UP SHIFT | ¦ | | 2 | 4 | 8 | | |
| LO SHIFT | | | 2 | 4 | 8 | A | B |
| TAB | | 1 | | 4 | 8 | A | B |
| RETURN | | 1 | | 4 | 8 | | B |
| INDEX | | 1 | | 4 | 8 | A | |
| TYPE ON | | | | 4 | 8 | | B |
| TYPE OFF | | | | 4 | 8 | A | |
| LOCK KB | | | | 4 | 8 | | |
| UNLOCK KB | | | | 4 | 8 | A | B |
| STOP (EOM) | | 1 | 2 | 4 | 8 | | |
| STOP TRANS | | 1 | 2 | 4 | 8 | | B |
| FEED | | 1 | | 4 | 8 | | |
| REF. #1 | | | 2 | 4 | 8 | A | |
| REF. #2 | | | 2 | | 8 | A | |
| REF. #3 | | 1 | 2 | 4 | 8 | A | |
| AUTO SEND | | | 2 | | 8 | | B |
| | | 1 | 2 | 4 | 8 | A | B |
| | | | 2 | | 8 | A | B |

If the application of the present invention is limited solely to that of an automatic typewriting and composing machine, or to some other application not requiring interfacing and compatibility with other systems, then the 6 bit code set forth in Table 1 or an equivalent would be entirely sufficient as the information handling format for the system. However, as noted above, a variety of different codes have been developed and are in general use at this time. Since it is one of the important features and objects of the present invention to permit compatibility with many codes and information handling format, it has been found that the 6 bit code presented above is not sufficient.

Amplifying on the foregoing, the codes currently used for information transmission between remote locations include at least one error checking bit, e.g., a parity bit, selected such that the number of 1's (or 0's) in each code word is odd (odd parity) or even (even parity) as desired. The parity or other error checking bit may be used in several ways. For example, as described above, recognition of a code word having a parity error may be used to initiate the printout of a character such as a dash (-) or asterisk (*) which is obviously meaningless in the literal context of the message. To accomplish this, or other similar functions, however, it is necessary that provision be made for storing and processing the error checking bit together with the information bits. Thus, in the present context, provision for storage and handling of a minimum of 7 bits per character rather than 6 bits per character is necessary in any event.

Further, to facilitate synchronizing remotely located equipment, and to provide demarcation between adjacent characters, information transmission code formats also include at least one "start" and one "stop" bit per character. Thus, a minimum of 9 bits per character must be provided for, either by way of storage capacity or by suppressing the "start" and "stop" bits before storage and by generating or regenerating these bits before transmission.

While the number of "start" and "stop" bits per character varies from one code format to another, this inconsistency presents only minimal complications. Of more seriousness, however, is the fact that some information transmission formats employ a 7 bit information code rather than a 6 bit code. Consequently, to maintain compatibility between a printer of the type described in connection with FIG. 1 and a remote system employing one of the 7 bit information codes, provision must be made not only for storing information and error checking bits and for handling the "start" and "stop" bits, but also for code conversion and for handling the enlarged code.

The foregoing may be accomplished in several ways, but in accordance with this invention it has been found most practical to provide character storage capacity in the system great enough for the largest number of bits employed in any of the code formats to be accommodated, including the information and error checking bits but not the "start" and "stop" bits. The latter are handled by suppression-generation techniques as mentioned above and as described more fully hereinafter.

Figure 4A:
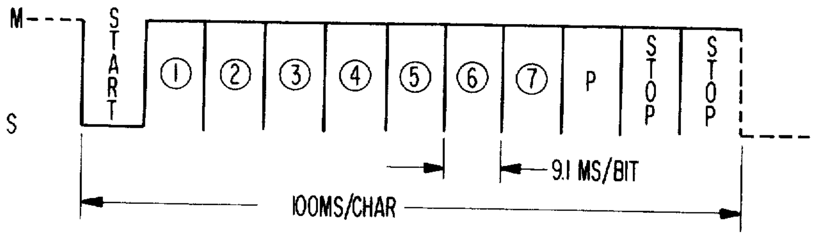
FIGS. 4A through 4C are diagrams showing code formats for three information transmission codes currently in use.
Figure 4B:
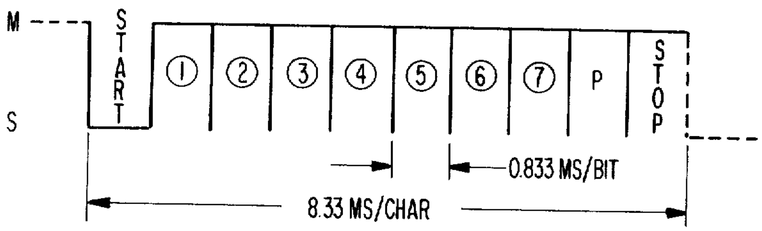
Figure 4C:
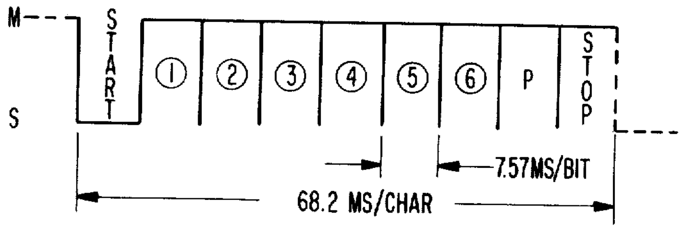

By way of specific example, FIGS. 4A through 4C show three of the more commonly employed transmission code formats. FIG. 4A shows the so-called "slow" ASCII code. This code (the American Standard Code for Information Interchange) is a binary 8 bit (level) code. Each code word comprises a "start" bit, 7 information bits, 1 parity bit, and 2 "stop" bits. The transmission rate for this code is 110 band, each bit being 9.1 milliseconds in duration, whereby transmission of each character requires 100 milliseconds.

A code word begins with a transition from a high signal level to a low signal level (usually termed "mark" and "space," respectively. The 7 information bits and the parity bit may be any required combination of "marks" and "spaces," depending on the character to be transmitted. (The standard ASCII code may be found, for example, in the book "Telecommunications and the Computer" By J. Martin, Prentice Hall 1969, pg. 111.)

The parity bit is "one" or "zero," depending on the character and the desired parity. The two "stop" bits following the parity bit are customarily "marks" and, in fact, if no character is to follow immediately, the signal level remains high as indicated by the dotted line to the left of the "start" bit in FIG. 4A.

The 110 baud ASCII code is used primarily in the commerical teletype network. Thus, compatibility of the terminal of the present invention with the teletype code allows direct interface of such a terminal with the teletype network, even though the printer itself may operate on an entirely different code format.

FIG. 4B shows another code format currently in use, generally known as the "high speed" ASCII code. This code comprises a "start" bit, 7 information bits, 1 parity bit, and a "stop" bit. Each bit is 0.833 milliseconds in duration whereby transmission of an entire character of 10 bits required 8.33 milliseconds. The code format for the high speed ASCII code is the same as as that for the low speed ASCII code.

The high speed ASCII code is used for all transmission rates above 110 baud. These include 150 baud, 300 baud, 1200 baud, 2400 baud and 4800 baud. Even higher rates such as 9600 baud are contemplated, and the system may readily be adapted to higher rate as required. Yet because of the use of dual intermediate storage capacity simple print and tape memory units may be employed.

FIG. 4C shows another code format of increasing current importance, namely, the EIA (Electronic Industries Association) code. As illustrated, the EIA code is a 9 bit code including a "start" bit (space), 6 information bits, 1 parity bit, and 1 "stop" bit. The EIA code is employed at several different transmission rates. By way of example, in one format, each bit is of 7.57 milliseconds duration, whereby transmission of an entire code word requires 68.2 milliseconds. This corresponds to a transmission rate of 132 bits per second and is a code rate frequently employed in moderate speed systems of various types. The same code format can be used for ultra high speed data transmission, for example, at 4800 bits per second and even 9600 bits per second.

The EIA information code format corresponds to that set forth above in Table 1.

As mentioned above, in accordance with an important feature of this invention, sufficient information storage capacity per character is provided to accommodate the maximum number of information plus error checking bits required by any of the code formats with which the system is to be compatible. Of the various code formats currently in use, the two ASCII codes require the largest number of information plus parity bits, namely, 8, and provision is therefore made in the system for storing and processing 8 information bits per character.

For the two ASCII codes, incoming information is processed to eliminate the start bit and the stop bit (or bits) before the information is stored. These bits are not required in either of the "local" operating modes and, thus, nothing is lost by this suppression. On the other hand, in Mode 4(ON LINE-PLAY), the "start" and "stop" bits are necessary, and provision is made for generating these bits prior to transmission of each character.

For the EIA code, storage capacity for only 7 bits is required, and, therefore, one additional bit, for example, the "stop" bit, may also be stored. Since the "stop" bit is always a mark, provision is made for inserting a "mark" or high level as the last bit in each character code when the same is generated (in the RECORD-LOCAL Mode), and for simply ignoring the "stop" bit in the PLAY-LOCAL Mode. In the "on-line" modes, only the "start" bit need be suppressed or generated and the system otherwise operates completely unaware of the non-information containing nature of the first and last bits in each character code word.

DETAILED FUNCTIONAL DESCRIPTION (FIGS. 5 AND 6)

FIGS. 5 and 6 comprise a detailed organizational block diagram of a preferred embodiment of the present invention.

Following the pattern of FIG. 2, input/output unit 202 includes input/output logic 502, three character (24 bits) shift register 504, and shift register control logic unit 506. Input/output logic 502 provides selective signal gating of signals to and from line coupler 116 or other remote device on a "bit by bit" basis and to and from printer 102 or other local device on a "character by character" basis, and also provides data coupling between shift register 504 and line memory 204. In addition, input/output logic unit 502 provides code conversion, for example, from the 6 bit typewriter code to the 7 bit ASCII code, as well as parity bit generation and checking.

When the system is operating one of the "record" modes, input/output logic unit 502 receives information signals from coupler 116 or from a local serial printer such as a teletype printer, over lead 510, and provides the same over lead 511 to the serial input of shift register 504. Parallel information, e.g. in the six-bit printer code, is received from a local source over leads **512*a* through 512*f*. After conversion to a seven-bit code, if necessary, and addition of a parity bit, the parallel data is provided over eight leads 514*a*–514*h*** to the parallel inputs of the shift register.

Parallel outputs are provided by the shift register over 24 leads **516*a*–516*x*. These are all provided to the character identification and search logic unit 560 described below for use during the search operation. Also, the first eight bits on leads 516*a–h*, are provided to input/output logic unit 502 for utilization during local playback operation. The eighth bit alone, representing a serial output of the shift register is provided to the input/output logic unit on the lead 516*h* from which it is transferred serially to the line memory control logic unit 530 over lead 518 during the record operation, and to appropriate serial utilization equipment over lead 526** during playback.

In the "playback" modes, data is coupled serially from line memory 204 to input/output logic unit 502 over lead 520 and from there to the shift register input over lead 511. The shift register data output is provided in parallel over leads **522*a* througn 522*h*, as previously noted. After parity check and code conversion to the six-bit printer code if necessary, the data is coupled to printer 102, over six parallel leads 524*a*–524*f***.

In addition to parallel and serial input and output data transfer, and also internal serial data transfer, shift register 504 provides 24 parallel outputs on leads **516*a–x* to character identification and search control logic unit 560**. The latter recognizes either the presence of a special "end of message" (EOM) character code when the system is not in the search mode, or the three-character search address when a search operation is taking place.

As noted above, each of intermediate memory units 204A and B provides temporary storage for 1280 data bits before transfer to the tape memory in the "record" modes, or out of the system in the "playback38 modes. Data is stored alternately in each unit; while one unit receives data, the other is emitting data previously stored. The entire operation, including selection of the unit to receive data, and the storage and retrieval is controlled by memory control logic unit 530. Control signals are provided over leads **532*a–n* for memory unit 204A. Similar control signals for memory unit 204B are provided over leads 534*a–n*. Data from the memory units are provided to the control unit 530 over leads 536A and B respectively, while data from the control unit to the memory units are provided over leads 537A and 537B. As explained later, each of memory units 204A and B are random access units in a preferred embodiment. For these, memory site (address) selection is provided over leads 532*a–m* and 534*a–m*, while read/write selection is provided over leads 532*n* and 534*n***.

Actual data transfer to and from the tape memory is accomplished by means of data record circuit 624 coupled to memory control logic unit 530 by lead 540, and by a data playback circuit 620 connected to memory control logic unit 530 over lead 544. Correspondingly, a timing signal record circuit 626, coupled to control unit 530 over lead 547, and a timing signal playback circuit 622, coupled to control unit 530 over lead 549 provide for transfer of timing information to and from a second tape track. Playback and record circuits 624, 620, 626 and 622 provide required signal processing and gating functions, and include magnetic recording and playback heads for transferring information to and from the tape memory, for example in a non-return-to-zero data format.

Overall control of the information transfer operations described above is effected by the system control logic generally denoted at 206 in FIG. 2, in conjunction with the manual inputs described above in connection with FIGS. 2 and 3. In addition to memory control logic unit 530, and character identification and search logic unit 560 previously mentioned, the system control logic includes mode select logic unit 602, tape control logic unit 604, sequence control logic unit 606, two master clock units 608 and 609, and frequency selection and division logic unit 610, the latter three units providing timing signals for operation of the remainder of the system. (See FIG. 6.)

Briefly stated, mode select logic unit 602 provides selective actuating signals for the respective portions of the system the operation of which are required for the above described operating modes 1–6. Tape control logic unit 604 operates tape drive unit 142 and other portions of the system as hereinafter described to provide for transfer of information to and from the data and timing tracks on the tape. Sequence control logic unit 606, in conjunction with master clocks 608 and 609, and frequency selection and division unit 610 provides the gating signals to control transfer of information between the memory units, and into and out of the system, and serves as a program control unit to initiate required data processing and transfer operations, as hereinafter described in detail.

Control signals for the above described operations are coupled betwen the various circuit units in the manner indicated in FIGS. 5 and 6. The exact nature of the signals involved will become more meaningful after consideration of the detailed construction of the system sub-units, and description is deferred for this reason. However, by way of introduction, it should be noted that incoming signals to a unit in FIGS. 5 and 6 are designated by inwardly directed arrowheads while outputs are designated by outgoing arrowheads. The reference numerals indicated parenthetically on inputs identify the signal source while those of an output identify the signal destination. Referring, for example, to mode select logic unit 602, the "LOCAL" signal is an output provided to input/output logic unit 502, and to sequence control logic unit 606 while the EOT (end of tape) signal is an input provided by tape drive unit 142.

DETAILED CIRCUIT DESCRIPTION

FIG. 4.

To facilitate the following detailed description, operation will be described in terms of positive true logic (a binary 1 level is represented by an electrical signal which is positive in relation to the 0 level signal), using various conventional logic elements as illustrated in FIGS. 7*a* through *g*.

Figure 7A:
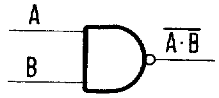
FIGS. 7A – 7G show the operating characteristics of certain circuit elements employed in the detailed description of a preferred embodiment of the invention.

FIG. 7*a* shows a so -called "NAND" gate having two inputs A and B and providing an output which is low (0 ) if and only if both inputs A and B are high (1). Conversely, the output of the NAND circuit is high if either of its inputs is low. As is well known, utilization of both the conjunctive (low) and the disjunctive (high) aspects of the NAND function allows implementation of any combinational logic function. This approach is followed here.

Figure 7B:
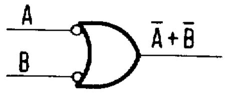

To distinguish the two functions, the logic device of FIG. 7*a* is used to represent the conjunctive and is referred to as a NAND gate. FIG. 7*b* shows a conventional NAND gate providing the disjunctive function, with two inputs A and B and an output which is high (1) if either input A or B is low (0) od if both inputs are low. This is actually an "OR" logic function with inverted inputs and will be so referred to. For convenience, the designation OR* will be used.

Figure 7C:

FIG. 7*c* shows an inverter having an input A and an output $\bar{A}$, the output being 1 if the input is 0 and being 0 if the input is 1.

Figure 7D:

FIG. 7*d* shows an EXCLUSIVE OR circuit having a pair of inputs A and B and output which is 1 if either input A or B is 1 and having a 0 output if inputs A and B are both 1 or both 0.

Figure 7E:
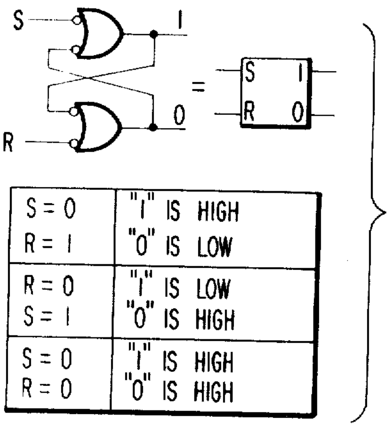
Figure 7F:
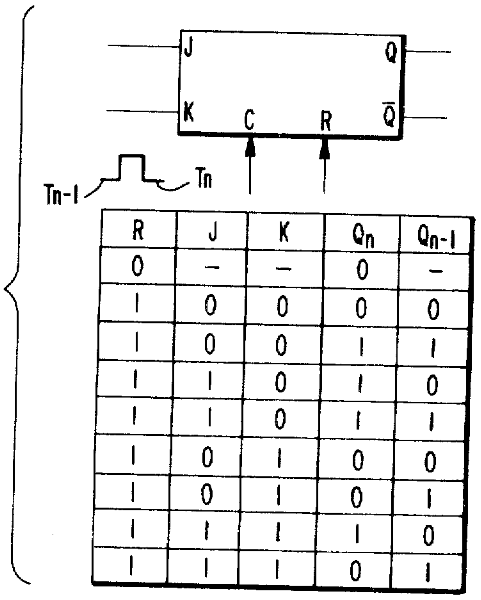

FIGS. 7*e* and 7*f* show two types of bi-stable multivibrators or flip-flops. FIG. 7*e* shows a set reset flip-flop comprised of a pair of cross coupled OR* gates having a set input designated S, a reset input designated R and a pair of complementary outputs designated "ONE" and "ZERO." A single block representation of the same unit is also shown. In the convention to be employed, a set input of 0 and a reset input of 1 produces a 1 and the "ONE" output and a 0 at the "ZERO" output. Conversely, a set input of 1 and a reset input of 0 produces a 1 at the "ZERO" output and a 0 at the "ONE" output.

These are stable states, i.e. if the set input goes low with the reset input high, return of the set input to a high level does not alter the output stages. Similarly, if the set input is high and the reset input is low, return of the reset input to a high level does not alter the output.

Two low inputs produce two high outputs, but this state is not stable. Thus if one of the two inputs goes high, the new input states will determine the outputs. If both inputs go high, then both outputs go low.

FIG. 7*f* shows a J-K flip-flop having a pair of signal inputs designated J and K, clock input designated C and a reset input designated R, and two complementary outputs Q and $\bar{Q}$. Circuit operation is such that a 0 signal level at the reset input produces a 0 output at Q and a 1 output at $\bar{Q}$ irrespective of the state of the clock input or the J and K inputs, which output state remains unchanged until the reset returns to 1 and the next 1 clock pulse arrives.

If the reset input is 1, a 1 clock input causes the outputs Q and $\bar{Q}$ to assume values depending on the values of the J and K inputs and the Q output at the time of the clock pulse, the new values appearing when the clock pulse returns to 0. The truth table indicating the relationship between the previous output state designated $Qn-1$, the output state $Qn$ after time tn (the time the clock input returns to 0) and the J and K inputs is shown in FIG. 7*f*.

Figure 7G:
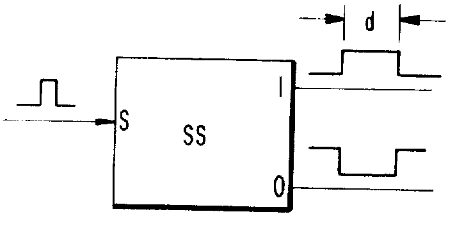

FIG. 7*g* shows a mono-stable or single shot multivibrator. This unit has a set input designated S, and a pair of complementary outputs designated "One" and "Zero." Circuit operation is such that a short duration set input of "1" produces a signal level of 1 at the "one"output, and a signal level of 0 at the "zero" output for a delay period *d.* determined by the choice of the circuit parameters. At end of the delay period, the circuit returns to its rest state with a 0 signal level at the "one" output and a signal level of 1 at the "zero" output. Even if the duration of the set input exceeds the delay time *d*, the outputs return to their respective rest conditions after the delay period *d.*

Additional logic units, such as conventional AND gates, OR gates, counters, shift register units, and the random access memory will be described and/or identified as appropriate throughout the following description.

With the foregoing in mind, FIGS. 8 through 24 show the details of a preferred embodiment of the present invention. As previously noted, the system is described as a data terminal system capable of operating compatibly with the "slow" ASCII format (110 baud) illustrated in FIG. 4*a*, "fast" ASCII formats (150, 300, 1200, 2400 and 4800 baud) shown in FIG. 4*b*, and the EIA format (132 baud) illustrated in FIG. 4*c*. However, the system can be readily adapted for compatibility with additional or other code formats as will be apparent to one skilled in the art in light of the present description. Also, while the system is described in terms of an implementation employing logic elements such as those shown in FIGS. 7a through 7g, it should also be appreciated that other implementations may also be employed.

Figures 8, 10:
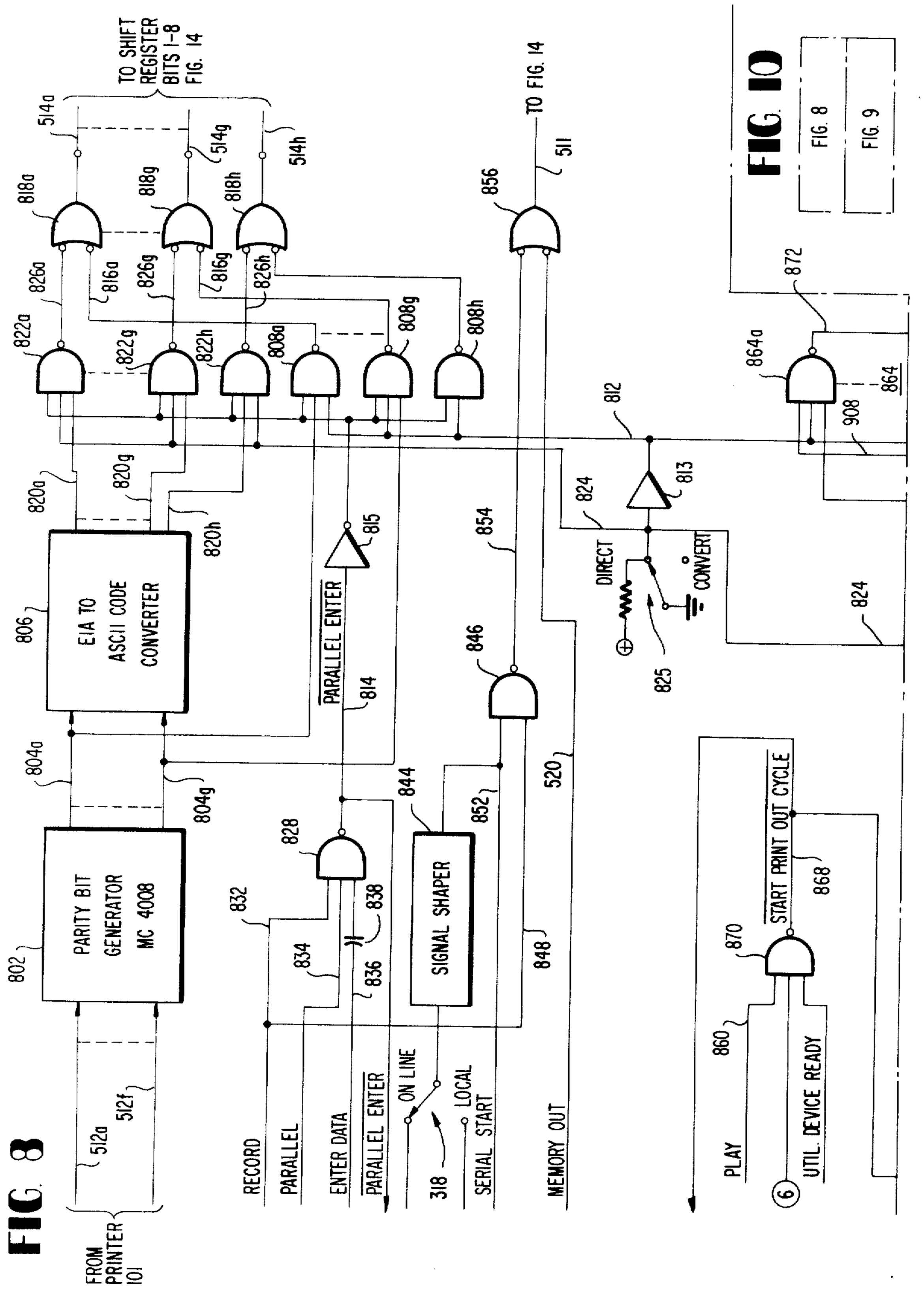
FIGS. 8 and 9, arranged as shown in FIG. 10 are a detailed circuit diagram of the system input-output logic.
Figure 9:
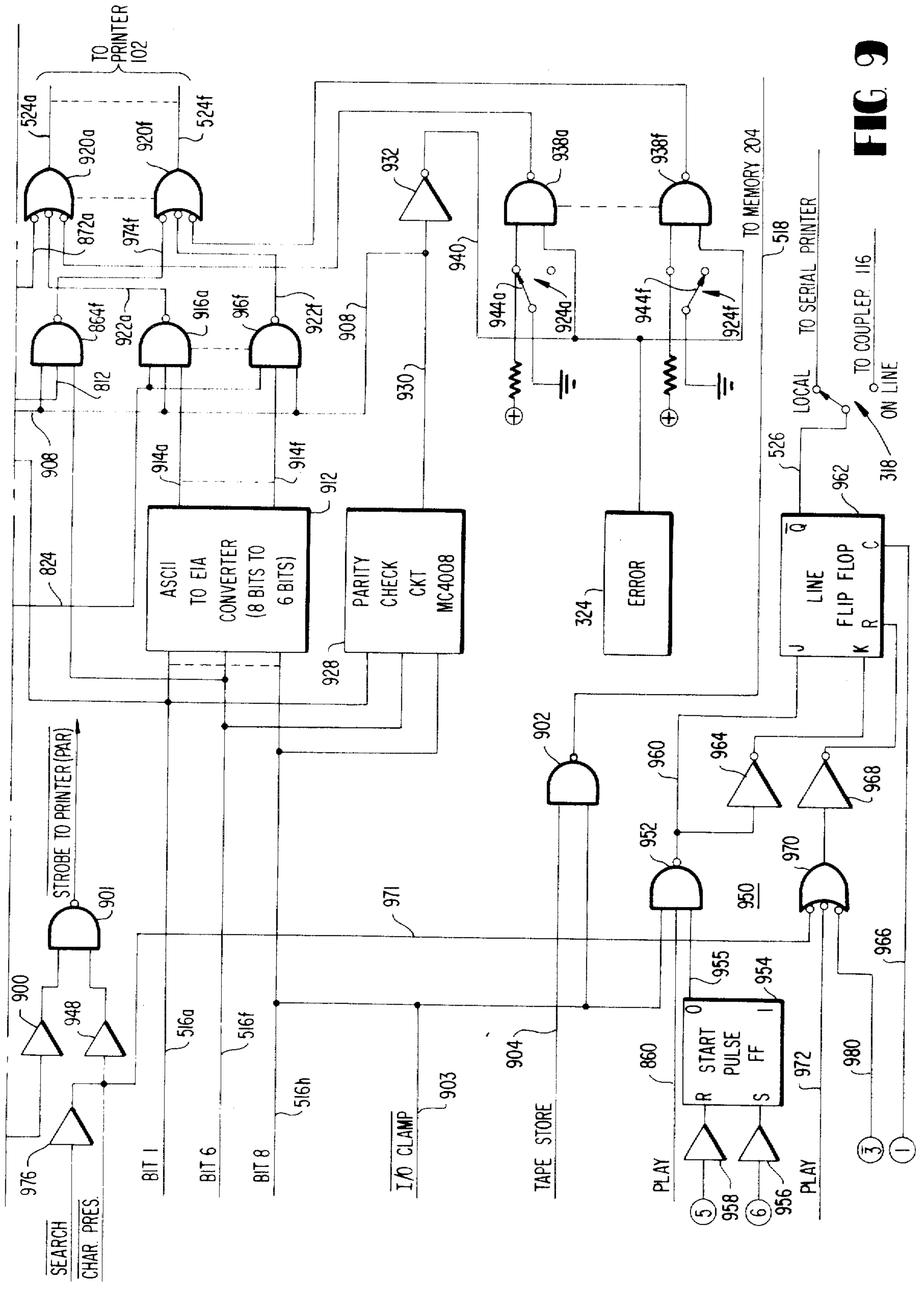

INPUT/OUTPUT LOGIC: FIGS. 8 and 9, arranged as shown in FIG. 10 illustrate the construction of input/output logic unit 502. For purposes of illustration, the system is described as operating with a parallel input from the above mentioned Design 101 Printer and a serial input from a local teletype printer or from a transmission line at various baud rates. Parallel outputs are compatible with the printer EIA code while serial outputs are in ASCII.

For a parallel input from printer 102, i.e. operation in the LOCAL-RECORD Mode, six bit signals appearing on leads 512 (two of which are illustrated at 512a and 512f) are connected in parallel to respective inputs of a parity generating circuit 802, which comprises suitable logic circuitry for generating a 1 or 0 binary output depending on whether even or odd parity is to be maintained.

The input signals on leads 512a through 512f are provided unchanged on output leads 804, with the parity bit appearing on lead 804g. By way of example, assuming a six bit code combination appearing on input leads 512a through 512f is 001101, the parity bit generating circuit will produce a 1 output on lead 804g if even parity is desired and a 0 output is odd parity is desired. Therefore, the complete parallel output code appearing on leads 804a through 804g would be 0011010 for odd parity and 0011011 for even parity.

Parity bit generator 802 may be constructed in a variety of ways which will be apparent to one skilled in the art in light of the above stated operational requirements. For example, there may be employed a commercially available integrated circuit, e.g., the Motorola eight bit parity tree, MC 4008, manufactured by Motorola Semiconductor Products, Phoenix, Arizona, or any other suitable circuit capable of responding to several parallel inputs to produce a predetermined output as a function of the number of 1's in the input.

The seven outputs of parity bit generator 802 on leads 804a – 804g are connected in parallel to respective inputs of an EIA to ASCII code converter 806. The latter is a diode matrix, or other comparable device capable of transforming an input characterized by one code format, e.g. the EIA code format to an output having a different code format, e.g., the ASCII code format. As will be understood, conversion units for codes other than EIA and ASCII may also be provided. These would be connected in parallel to the output of parity bit generator 802, if required.

The ASCII parallel code word produced by the outputs of code converter 806 is provided over leads 820a through 820h as respective signal inputs to a set of eight NAND gates 822, two of which are shown at 822a and 822h. Control inputs to gates 822a through 822h are provided over lead 814 by the $\overline{\text{PARALLEL ENTER}}$ signal hereinafter described, coupled through an inverter 815 to produce the PARALLEL ENTER signal and by a CONVERT signal provided over lead 824. The CONVERT signal is generated by a two-position switch 825 which has one of its fixed contacts unused, and the other conected to the positive power supply through a resistor. The moving contact of switch 825 is grounded so when the switch is in the "DIRECT" position as illustrated, the signal on lead 824 is low and the output of inverter 813 on lead 812 is high. In the other position, lead 824 is high and lead 812 is low. As will be understood, switch 825 is placed in the "CONVERT" position when data is to be converted from EIA code to ASCII. Under this condition the PARALLEL ENTER signal activates NAND gates 822a through 822h to provide eight parallel outputs representing the ASCII code word (including the parity bit) corresponding to the typewriter code word being entered.

For operation in the EIA format, code conversion is not necessary, and the outputs of parity bit generator 802 on leads 804 are connected as signal inputs to a set of seven NAND gates, two of which are illustrated at 808a and 808g. An eighth NAND gate 808h is provided to accommodate the 8-bit storage format employed in the system. In the EIA format the eighth bit is the stop bit and is always a mark or 1. This is provided by the DIRECT signal on lead 812 from inverter 813 which is high when switch 825 is in the "DIRECT" position. NAND gate 808h is gated by the PARALLEL ENTER signal at the output of inverter 815. The DIRECT and PARALLEL ENTER signals also provide control signals for NAND gates 808a through 808g; no additional inputs for NAND gate 808h are required.

The EIA format outputs of NAND gates 808a through 808h are provided respectively over a set of eight leads 816, two of which are shown at 816a and 816h as inputs to a set of eight OR* gates 818a through 817h. The ASCII format outputs of NAND gates 822a through 822h are also connected respectively over leads 826a through 826h as inputs of OR* gates 818a through 818h, whereby the outputs on leads 514a through 514h represent an 8 bit parallel character code word in either the ASCII or EIA format. The outputs of OR* gates 818a through 818h are provided over leads 514a through 514h as the parallel inputs for bit positions 1 through 8 of the input/output portion of shift register 504 [see FIG. 5.]

As mentioned above, data transfer through NAND gates 808a–h or 822a–h is controlled by the PARALLEL ENTER signal. The purpose of this is to assure that data is not transferred to the shift register until after completion of the printer operating cycle by which the character is generated.

The $\overline{\text{PARALLEL ENTER}}$ signal is generated by inverter 815 coupled to a NAND gate 828. This receives as inputs, the RECORD signal over lead 832, and the PARALLEL signal over lead 834, from mode select logic unit 602, and an ENTER DATA signal over lead 836 from the cycle control mechanism of printer 102, the latter being AC coupled as indicated by capacitor 838.

The ENTER DATA signal is high when a key on keyboard 126 is depressed, and the RECORD and PARALLEL signals are high when keys 314 and 318, respectively (see FIG. 3) are depressed. Due to the AC coupling of the ENTER DATA signal, NAND gate 828 operates when a key is depressed if a parallel input device is employed for LOCAL-RECORD operation or if a search address code is being entered. This actuates NAND gates 808a–h or 822a–h briefly during each printer operating cycle. As will be appreciated, NAND gates 808a–h are activated only for operation in the EIA format while NAND gates 822a through *h* operate only for the ASCII format.

For serial inputs over lead 510 from coupler 116 in the ON LINE-RECORD mode, or for use of a serial input unit for LOCAL RECORD operation, code conversion is not required since incoming information is stored in the format employed by the remote information source, and is converted to the EIA code as hereinafter described, if necessary, for playback. (This avoids parallel processing of the incoming serial data). Further, remotely transmitted information ordinarily contains a parity bit, and therefore parity bit generation is unnecessary.

The serial input data is coupled through a pair of fixed contacts of ON LINE-LOCAL selection switch 318 to the input of a signal shaping circuit 844 including a threshold detector and a single shot multivibrator, or other comparable devices. The purpose of circuit 844 is to compensate for high frequency attenuation suffered by the data pulses due to transmission over communication channel 118 by regenerating each data pulse as a sharply defined straight-sided pulse for the signal processing.

The output of signal shaper 844 is connected as a signal input to a NAND gate 846. The latter receives as a control input, the RECORD signal over lead 840, from mode select logic unit 602. This signal is high when key 314 (see FIG. 3) is in the "record" position, thereby indicating that incoming data is to be accepted.

The output of signal shaper 844 also provides the SERIAL START signal on lead 852. As explained below, this actuates sequence control logic unit 606 in the RECORD mode for serial inputs to transfer the incoming serial information through the input/output portion of shift register 504 and into one of memory units 204A or B for storage. NAND gate 846 is coupled to an OR* gate 856, the output of which is connected over lead 511 as the serial input to shift register 594. [See FIG. 5.] The other input to OR* gate 856 is provided by the output of one of the memory units over lead 520.

Input/output logic unit 502 also provides for selective gating of information from the shift register to one of the memory units 204A or B when the system is operating in the RECORD mode. This is accomplished by a NAND gate 902 which receives as inputs, the TAPE STORE signal from mode select unit 602 over lead 904 and the serial output of the input/output portion of shift register 502 at the 8th bit position over lead **516*h*. Lead 516*h* is also OR-tied to a lead 903 which provides the I/0 CLAMP signal from character identification and search logic unit 560. This signal is high (and thus without effect) except during a special memory formatting sequence which simplifies certain operations following entry of an EOM character during a record sequence. [This is described more fully in connection with FIG. 24 below.] The low level on lead 903 inhibits NAND gate 902 and maintains its output on lead 518 high — irrespective of the data output of the I/0 register on lead 516*h*. The NAND gate output is provided over lead 518 (see FIG. 5) as a signal input to memory unit 204**A or B through gating circuits described below.

Information is transferred out of the system from shift register 504, either to a parallel printer, or serially to a teletype printer or to coupler 116. For parallel output, the shift register outputs at the 1st through the 6th bit positions are coupled over leads **522*a*–522*f* as the signal inputs to a set of six NAND gates 864, two of which are shown at 864*a* and 864*f*. The seventh and eighth bits are ignored since these contain no information useful for the printer. However, as explained below, the seventh or parity bit is employed in a parity check operation. A conditioning input for NAND gates 864 is provided by the DIRECT signal over lead 812 while an inhibit input is provided over lead 930 by the output of parity check circuit 928** hereinafter described. This signal is high unless a parity error is detected.

The outputs of NAND gates 864 constitute the inputs to printer 102 if the information stored in the tape is in the EIA format. If the stored information is in the ASCII format, output code conversion may be required, e.g. if a parallel output printer is employed. For this, the shift register outputs on leads **516*a* through 516*h* are connected to respective inputs of an ASCII to EIA code converter 912 (see FIG. 9) which transforms the 8-bit ASCII code to the EIA code including the 6 EIA information bits. As in the case of code converter 806 described above, code converter 912** may be constructed in any conventional or desired fashion; for example, a diode matrix or the like may be employed.

The 6 bit output of code converter 912 is provided in parallel over a set of leads 914, two of which are shown at **914*a* and 914*f* as signal inputs to a set of NAND gates 916*a* through 915*g*. The control inputs for gates 916 are the same as those provided for EIA gates 864 except that the CONVERT signal from switch 825 on lead 824 is substituted for the DIRECT signal in lead 812. The outputs of NAND gates 916*a–f*** are connected respectively to the inputs of a set of OR* gates **920*a* through 920*f*, hereinafter described, over leads 922*a* through 922*f***.

If the system is operating in a parallel format with an EIA code, then operation of code convertor 912 is not required, as mentioned above. Therefore, the outputs of NAND gates 864, 916, etc. are connected over leads 872, 922, etc. as second inputs to OR* gates **920*a* through 920*f*. Thus, if there is no parity error, NAND gates 864 will be activated for the EIA format while NAND gates 916** will be activated for the ASCII format.

The parallel outputs of the input/output portion of the shift register (bit positions 1–8) are also connected in parallel to respective inputs of a parity checking circuit 928, which produces a low output on lead 930 if the number of input bits having the value 1 is not correct. For example, if even parity is to be maintained, and the number of 1 bits in the input is odd, then the output on lead 930 will be low. If the number of 1 inputs is even then the output on lead 930 will be high.

Parity check circuit 928 may be constructed in any conventional or desired fashion to accomplish the above stated function, but as in the case of parity generating circuit 802, it is preferably the Motorola 8-bit parity tree MC 4008 or its equivalent.

The output of parity check circuit 928 over lead 930 also provides an actuating input for error indicator 324 (see FIG. 3) through an inverter 932.

Because of the inhibit signal on lead 930, NAND gates 864 and 916 are actuated only when a parity error is not detected. This construction results in the printer simply skipping a character and printing a "space" when a parity error is detected since that is the "all zero" code word. As an alternative, however, the system may be arranged so that whenever a parity error is detected, the playback operation is halted as by resetting the playback control portion of mode select logic unit 602. As a further alternative, the erroneous character may be suppressed as described above, and there may instead be provided to the printer, a special error indicating character such as an asterisk (*) to indicate immediately that an erroneous character has been suppressed without halting playback. The suppressed character may be replaced simply by a space, which permits later typing-in of the correct character if it can be determined from the context of the message but this does not provide as graphic an indication that an error is present.

The circuitry for accomplishing the above described character substitution comprises a group of six NAND gates 938, two of which are shown at 938*a* and 938*f*. The outputs of NAND gates 938 are connected, together with the respective outputs of NAND gates 864 and 916, previously described, as inputs to OR* gates 920.

The outputs of the latter are provided to the actuating circuitry for printer 102 over leads 424*a*–424*f* respectively.

The control inputs for NAND gates 938 are provided over lead 940 by the PARITY ERROR signal output of inverter 932. The signal inputs for NAND gates 938 are provided by a set of six two-position switches 942 [two of which are shown at 942*a*–941*f*)] having respective moving contacts 944*a*–944*f* grounded, and one fixed contact connected to the positive power supply through resistors 946*a–f*. The latter are also connected to NAND gates 938. Setting the switches in the desired position (the illustrated position corresponds to a 0 input for the respective NAND gates) establishes a combination of 1's and 0's to represent the code of the character to be substituted for an erroneous character. Alternatively, the required code may be wired in, and switches 942 dispensed with.

Employing the foregoing circuitry, when a parity error is detected, NAND gates 938 are activated, and NAND gates 864 and 916 are deactivated whereby the outputs of OR* gates 920*a* through 920*f* represent the "error" code rather than the erroneous character code being processed.

Initiation of a printout cycle is accomplished by a START PRINTOUT CYCLE signal, generated by a NAND gate 870. This receives as its inputs, the PLAY signal over lead 860, and the No. 6 output of sequence control logic unit 606 over lead 936. An additional signal, denoted UTILIZATION DEVICE READY, may also be provided. This signal is generated in suitable fashion by printer 102 or its associated logic, and is provided over lead 876, at a high level after each operating cycle to indicate that the unit is ready to receive further data. As explained below, the output of NAND gate 870 is used to initiate internal data transfer for all playback operations, local and on line, serial and parallel. The UTILIZATION DEVICE READY signal is therefore provided by whatever output source is actually being employed at the time, or by coupler 116.

The START PRINTOUT CYCLE signal actuates the internal data transfer operations required for printing a character, as mentioned above. To actuate a parallel output printer, there is provided a NAND gate 901 which receives as inputs, the CHAR. PRESENT signal coupled through an inverter 948, the START PRINT-OUT CYCLE signal coupled through an inverter 900, and the SEARCH signal coupled through an inverter 976, and OR-tied to the input of inverter 948.

Employment of the SEARCH signal as an input to NAND gate 901 has the effect of inhibiting operation of the output data receiver during a search operation. The purpose of this is to prevent printing of meaningless characters while a search is taking place. If NAND gate 901 operates, the data provided to the parallel format printer by OR* gates 920 is actually utilized. Otherwise the printer does not operate, but the internal data transfer operations which result in movement of data from the intermediate memory to the I/0 register are permitted. This assures that erroneous contents from an "empty" I/0 register are not printed out.

The remaining function of input/output logic unit 502 is to control serial transfer of information from the input/output portion of shift register 504 to coupler 116 during ON LINE-PLAY operation or to a serial printer during local playback. However, the operation of this portion of the system is largely dependent upon sequence control logic unit 606 and shift register 504. In the interest of clarity, therefore, description of the remainder of FIG. 9 is deferred until the exact nature of the sequence control logic unit and shift register 504 has been described.

Figures 11, 13:
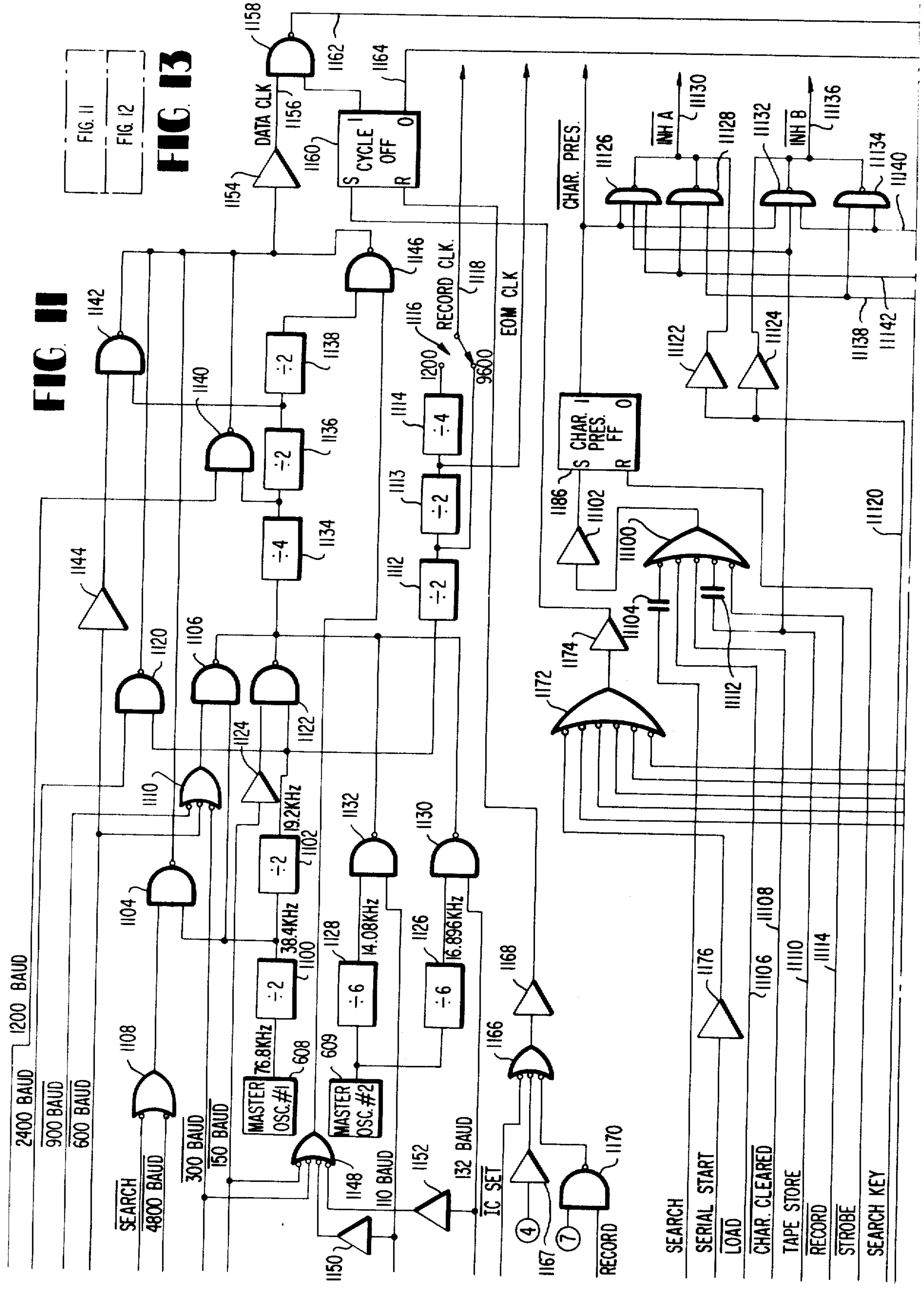
FIGS. 11 and 12, arranged as indicated by FIG. 13 show the details of the system program control logic.
Figure 12:
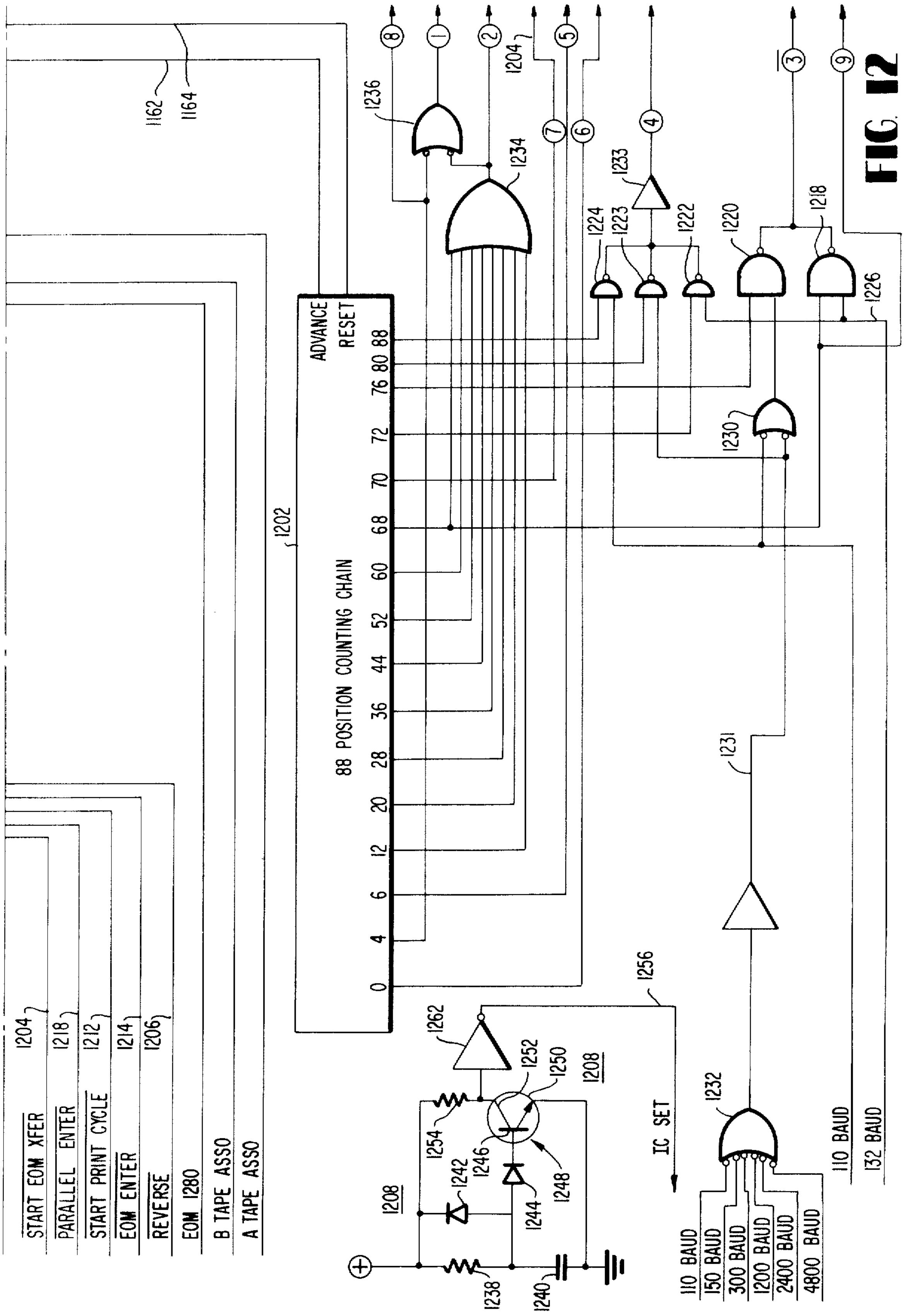

Program Control Logic (Timing and Sequence Control), FIGS. 11 and 12

FIG. 11 shows master oscillators 608 and 609, and the details of the circuitry comprising frequency selection and division logic unit 610. FIG. 11 also shows a portion of sequence control logic unit 606, the remainder of which is shown in FIG. 12.

Master oscillators 608 and 609 are high stability crystal controlled oscillators constructed in any conventional or desired fashion. The oscillators serve as the primary timing reference for all code formats and operations, and for this reason are preferably designed to operate at frequencies which, together, provide integral multiples of all of the other frequencies required in the system.

As pointed out above, the system is designed for compatibility with the EIA 132 baud code, and with various codes, at 110, 150, 300, 1200 and 2400 baud. At least these frequencies must therefore be available. However, to provide for high speed internal data processing, to facilitate synchronizing the system with serial input and output equipment, by permitting the allocation of several clock pulses (for example, four or preferably even eight clock pulses) per code word bit, to achieve optimum data handling rates for the various system components, and also to simplify clock design, substantially higher operating frequencies, which are multiples of the above, are preferred.

For example, with higher frequencies available for internal operations, data transfer to and from the tape memory and address searching may be accomplished at speeds substantially in excess of the operating speeds of the input-output equipment. Allocation of several clock pulses per data bit also assures that data appearing just after a clock pulse is not sampled so near the end of the bit period that the signal level is substantially below its maximum value.

The foregoing results are achieved in a preferred embodiment by employment of two master oscillators 608 and 609 operating at 76.8 kHz and 84.48 kHz, respectively. The outputs of the two oscillators are provided as the inputs to frequency selection and division logic unit 610, which produces the required lower frequency signals required elsewhere in the system.

Logic circuit 610 comprises a plurality of integrated circuit divider units together with the required gating logic. In particular, the output of oscillator 608 is coupled to a divider chain comprising a pair of binary dividers 1100 and 1102 to produce signals at frequencies of 38.4 kHz and 19.2 kHz, respectively. The 38.4 kHz signal is provided as an input to two NAND gates 1104 and 1106. A second input for NAND gate 1104 is provided by an OR* gate 1108 which in turn receives as its inputs, the SEARCH signal from search control logic unit 560, and the "4800 baud" signal from mode select logic unit 602. The second input to NAND gate 1106 is provided by an OR* gate 1110 which receives as its inputs, the "300 baud," "600 baud," and "900 baud" signals from mode select logic unit 602.

The 19.2 kHz output of binary divider 1102 is coupled as an input to a second counting chain comprised of a pair of binary dividers 1112 and 1113 and a "divide by 4" circuit 1114 to provide signals at frequencies of 9600, 4800 and 1200 Hertz, respectively. The 9600 and 1200 Hz signals are connected by means of a switch 1116 to a signal path 1118 to provide the RECORD CLK signal which serves to control transfer of data from one of the memory units 204A or 204B to the tape memory. Two frequencies are provided to permit use of logic unit 610 without modification with a high speed tape transport running, for example at 15 inches per second or a low speed transfer running at 1 ⅞ inches per per second. Use of the latter obviously reduces system cost but the low speed is not suitable where high bit density on tape is required, as for example, with data rates exceeding 300 baud. Switch 1104 may obviously be replaced by a direct connection to one of dividers 1112 or 1114, if desired.

The output of divider 1113 at 4800 Hz provides the EOM CLK signal. As explained below, this is used to establish the desired format for data stored on the tape after the EOM character in a particular data block.

The 19.2 kHz output of divider 1102 is also provided as inputs to a pair of NAND gates 1120 and 1122. A second input for NAND gate 1120 is provided by the "2400 baud" signal from mode select logic unit 602 while the second input to NAND gate 1122 is provided by an inverter 1124 coupled to the "150 baud" signal from the mode select logic unit.

84.48 kHz oscillator 609 provides its output in parallel to a "divide by five" counter 1126 and a "divide by six" counter 1128 to provide outputs at 16,892 Hertz and 14,080 Hertz, respectively. These signals are coupled as inputs to a pair of NAND gates 1130 and 1132 which respectively receive as second inputs, the "132 baud" and "110 baud" signals from mode select logic unit 602.

The outputs of NAND gates 1106, 1122, 1130, and 1132 are or-tied together to the input of a further counting chain comprising a "divide by four" circuit 1134, and binary dividers 1136 and 1138. The output of "divide by four" counter 1134 is coupled to one input of a NAND gate 1140, the other input to which is provided by the "1200 baud" signal from mode select logic unit 602. The output of first binary divider 1136 is coupled to a NAND gate 1142, the second input to which is provided through an inverter 1144 by the "600 baud" signal from the mode select logic unit 602. The output of the second binary divider 1138 is coupled to a NAND gate 1146 which receives its second input from the output of an OR* gate 1148. This, in turn, receives as its inputs, the "150 baud" and "300 baud" signals, and the "110 baud" and "132 baud" signals respectively provided through inverter 1150 and 1152.

The outputs of NAND gates 1104, 1120, 1140, 1142, 1146 are all OR-tied together to an input of an inverter 1154 which provides the timing signal DATA CLK on lead 1156 for controlling all system operations except data transfer to the tape.

As will be appreciated, the frequency of the DATA CLK signal is determined by the particular one of the baud rate selection signals provided, or by the SEARCH signal indicating a search operation to be in progress. The following table gives the frequency of the DATA CLK signal for the various operating functions.

| Baud Rate | DATA CLK Frequency |
|---|---|
| 110 | 880 |
| 132 | 1056 |
| 150 | 1200 |
| 300 | 2400 |
| 1200 | 9600 |
| 2400 | 19200 |
| 4800 | 34800 |
| SEARCH | 34800 |

The various division units referred to above are conventional solid state I.C. units. Advantageously, however, various ones of these may be combined in commercially available units. For example, dividers 1100 and 1128 may be combined as part of a single unit, type SN7492, dividers 1102 and 1126 may be combined as part of a single unit, type SN7490, and dividers 1112–1114 and 1134–1138 may be combined respectively as single units, type SN7493. All of these are available from Texas Instruments, Inc.; similar units are also available from other sources.

The DATA CLK signal on lead 1156 is connected as the timing signal input for sequence control logic unit 606. This signal serves as the basic frequency reference for sequence control logic unit 606 and is provided as an input to a NAND gate 2258. A set-reset cycle flip-flop 1160 has its "ONE" output connected as the control signal for NAND gate 1158.

Sequence control logic unit 606 also includes a counting chain 1202 having an 88-count capacity and a reset or 0 count state. This circuit actually provides the program control signals for the rest of the system. Counting chain 1201 is described in detail below, but for the present, it should be noted that an "advance" input is provided over lead 1162 from NAND gate 1158 for increasing the count, and a reset input is provided over lead 1164 by the ZERO output of cycle flip-flop 1160 to return the count to 0.

Outputs representing the 0, 4, 6, 12, 20, 28, 36, 44, 52, 60, 68, 70, 72, 76, 80 and 88 counts are provided; these are collected as hereinafter described to provide eight different sequences of output pulses for each counter cycle. The latter are designated as the No. 1 through NO. 9 outputs of the sequence control logic unit. (See also FIG. 6.)

With the foregoing in mind, the rest inputs for cycle flip-flop 1160 are provided by an OR* gate 1166 through an inverter 1168. OR* gate 1166 receives as its inputs, the I.C. SET signal from master reset circuit 1208, and the 4 output of counting chain 1202, the latter coupled through an inverter 1167, and the output of a NAND gate 1170. This, in turn, receives as its inputs the No. 7 output of counting chain 1202 and the RECORD signal from mode select logic unit 602.

The set input for cycle flip-flop 1160 is provided by an OR* gate 1172, coupled through an inverter 1174. The inputs for OR* gate 1172 are provided by the SERIAL START signal from I/0 logic unit 502 through an inverter 1176, by the START EOM XFR signal from character identification and search logic unit 560 over lead 1204, by the REVERSE and EOM ENTER signals from mode select logic unit 602 over leads 1206 and 1214, and by the PARALLEL ENTER and START PRINTOUT CYCLE signals from input/output logic unit 502 over leads 1210 and 1212.

As previously mentioned, the "ONE" output of cycle flip-flop 1160 provides the control signal for NAND gate 1158. This in turn provides the advance input signal for counting chain 1202. The "ZERO" output of cycle flip-flop 1160 provides the reset input for counting chain 1202.

Counting chain 1202 is constructed in any conventional or desired fashion. For example, a pair of 4-bit binary counters such as Texas Instruments Model SN7493 or the equivalent combined with appropriate external logic circuitry may be employed to provide the required individual count outputs as noted above. The actual construction will be apparent to one skilled in the art in light of the required functions and in the interest of simplicity, the counting chain is shown as single block having numbered outputs one of which is high to indicate the particular count states of the counting chain.

As previously explained, the DATA CLK signal on lead 1158 is a continuous pulse train. Thus, wherever cycle flip-flop 1160 is set, counting chain 1202 is continuously advanced at the input frequency, and the outputs representing the various count states are activated in succession. When cycle flip-flop 1160 is reset, counting chain 1202 is returned to the 0 state, (i.e. the 0 output is high) at which it remains until the cycle flip-flop is again set.

As mentioned above, certain of the outputs of counting chain 1202 are used directly, while others are combined to produce multiple pulse sequences as required for system operation. Specifically, the outputs representing the 0 count and the 4th, 6th, 68th, and 70th counts are provided as the No. 6, No. 8, No. 5, No. 9, and No. 7 outputs respectively.

The No. 3 and No. 4 outputs also represent individual count state outputs but the particular count depends on whether the system is operating in an ASCII or EIA format.

For the No. 3 output, selection is accomplished by a pair of NAND gates 1218 and 1220 having as information inputs, the 68th and 76th count outputs of counting chain 1202. For the No. 4 output, selection is accomplished by three NAND gates 1222, 1223, and 1224 having as information inputs, the 72nd, 80th, and 88th count outputs of the counting chain. Control inputs for NAND gates 1218 and 1222 are provided over lead 1226 by the "132 baud" signal from mode select logic unit 602. Control input for NAND gate 1224 is provided over lead 1228 by the "110 baud" signal from mode select logic unit 602.

The control input for NAND gate 1220 is provided by an OR* gate 1230 which receives as its inputs, the "110 baud" signal and a signal over lead 1231 from an OR* gate 1232, the latter receiving as its inputs, the "150 baud," "300 baud," "1200 baud, " "2400 baud" and "4800 baud" control signals. NAND gate 1220 thus operates for all of the ASCII modes.

The control input for NAND gate 1223 is provided directly by the output of OR* gate 1232 and thus operates for all of the high speed ASCII modes, i.e., 150 baud and above.

The outputs of NAND gates 1218 and 1220 are OR-tied together, and coupled through an inverter 1225 to produce a signal which is 1 for the 68th count output of counting chain 1202 when the system is operating in 132 baud (EIA) mode, and for the 76th count output when the system is operating in one of the ASCII formats. Similarly, the outputs of NAND gates 1222–1224 are OR-tied together, and coupled through an inverter 1233 to produce a signal which is 1 for the 72nd count output of counting chain 1202 for the EIA format, for the 80th count output for the high speed ASCII formats, and for the 88th count output for the low speed ASCII (110 baud) format.)

The No. 1 and No. 2 outputs of sequence control logic unit 606 constitute groups of count outputs of counting chain 1202. Specifically, the No. 2 output is developed by an OR gate 1234 having its inputs provided by the 12th, 20th, 28th, 36th, 44th, 52nd, 60th, and 68th count outputs of counting chain 1202. Similarly, the No. 1 output of the sequence control logic unit is developed by a second OR gate 1236 connected to the fourth count output of counting chain 1202 and to the output of OR gate 1234. Thus, it may be seen that the 1 output of the sequence control logic unit is a series of pulses corresponding the 4th, 12th, 20th, 28th, 36th, 44th, 52nd, 60th, and 68th count states while the No. 2 output is identical to the No. 1 output except that it does not include a pulse corresponding to the 4th count.

Returning to FIG. 11, the character present indication, $\overline{\text{CHAR. PRES.}}$, is developed by the ONE output of a flip-flop 1186. The reset input is provided by the $\overline{\text{DATA STROBE}}$ signal generated by mode select logic unit 602. As hereinafter explained, this signal is low at count 4 of each 88 count cycle for local record operation, and at count 70 for all other modes of operation. The set input for flip-flop 1186 is provided by an OR* gate 11100 and an inverter 11102. The inputs for OR* gate 11100 are provided by the SEARCH signal AC coupled through a capacitor 11104, by the $\overline{\text{LOAD}}$ signal over lead 11106, by the $\overline{\text{CHARACTER CLEARED}}$ signal over lead 11108, by the TAPE STORE signal over lead 11110, AC coupled through a capacitor 11112 and by the $\overline{\text{RECORD}}$ signal over lead 11114.

The $\overline{\text{CHARACTER PRESENT}}$ signal serves primarily a formatting function. In other words, the various operating conditions causing flip-flop 1186 to be set are indications that a meaningful character is not present in the input/output register whereby transfer of data from the input/output register to one of the intermediate memories, or to an outside utilization device should be prevented. This assures that meaningless characters or, at such times as the input/output register is reset, an all 0 character (actually the code for "space") is not improperly printed or transmitted.

Also illustrated in FIG. 11, is logic circuitry for utilizing $\overline{\text{CHARACTER PRESENT}}$ signal to generate inhibit control signals for the A and B memory units. Utilization of these signals will be described in detail below, but structurally, the inhibit signal for the A memory, $\overline{\text{INH-A}}$, is provided by the OR-tied output of an inverter 11122, and a pair of NAND gates 11126 and 11128. Inverter 11122 is coupled to the SEARCH KEY signal on lead 11120 generated by mode select logic unit 606. NAND gate 11126 receives as its inputs, the $\overline{\text{CHARACTER PRESENT}}$ signal, the TAPE STORE signal on lead 11110, and a B-TAPE ASSO signal on lead 11142 from memory control logic unit 530. As hereinafter explained, the B-TAPE ASSO signal is high when the B memory is conditioned to receive data from the tape during playback operation, or to provide data to the tape during record operation. NAND gate 11128 also receives as one input, the B TAPE ASSOCIATED signal from lead 11142, and also the EOM-1280 signal on lead 11138 generated by character identification and search logic unit 530 to indicate that the last character of a particular message happens to have filled one of the A or B memory units to its capacity.

A corresponding construction provides the inhibit control signal for the B memory unit, $\overline{\text{INH-B}}$. An inverter 11124 coupled to the SEARCH KEY signal on lead 1120 has its output OR-tied to the outputs of a pair of NAND gates 11132 and 11134. The former receives as its inputs the $\overline{\text{CHARACTER PRESENT}}$ signal, The TAPE STORE signal, and an A TAPE ASSO signal on lead 11140. The latter is analogous to the B TAPE ASSO signal, and is high when the A memory unit is conditioned to provide data to the tape during record operation, or to receive data from the tape during playback. NAND gate 11134 also receives the A TAPE ASSO signal as an input, as well as the EOM 1280 signal on lead 11138 previously mentioned. characters (actually the code for "space" ) are not improperly printed.

Also illustrated in FIG. 12 is start conditioning circuit 1208 mentioned above. This serves to place certain critical logic elements in the required initial operating condition when the system is first turned on.

The circuit includes a resistor 1238 and a capacitor 1240 connected in series between the positive power supply and ground. A back-biased diode 1242 is connected across resistor 1238 with the common point between resistor, the capacitor, and the diode connected through a second diode 1244 to the base 1246 of a transistor 1248. The emitter 1250 of transistor 1248 is grounded while the collector 1252 is connected to the positive power supply through a load resistor 1254, and also through an inverter 1262 as the output to provide the IC. SET signal at a group of terminals 1256.

In operation, before the power supply is turned on, capacitor 1240 to discharged. When power is applied, the capacitor begins to charge through resistor 1238 and the base voltage of transistor 1248 begins to rise. However, until the base voltage reaches a sufficient level to cause the transistor to conduct, collector 1252 is at the power supply voltage. The resulting 0 level at the output of inverter 1262 at terminal 1256 is used directly or through inverters as necessary to reset the various memory elements such as flip-flops and counters, which must be placed in a known initial operating state.

As capacitor 1240 charges, the voltage at base 1246 of transistor 1248 rises to the level required for conduction and the voltage at collector 1252 drops to zero, and the output of inverter 1262 goes high where it remains, as long as power supply remains on, and has not further effect on circuit operation.

When the power supply is again turned off, capacitor 1240 discharges through diode 1242 and the circuit returns to its initial or rest condition. Thus, each time power is applied, the voltage at output terminals 1256 is clamped at a low level for sufficient time to reset the varius circuit elements in the required initial condition. In this way it is assured that each time the system is turned on, all circuit elements, the initial state of which is critical to proper operation, are properly set.

SHIFT REGISTER AND ITS CONTROL CIRCUITS

Figure 14:
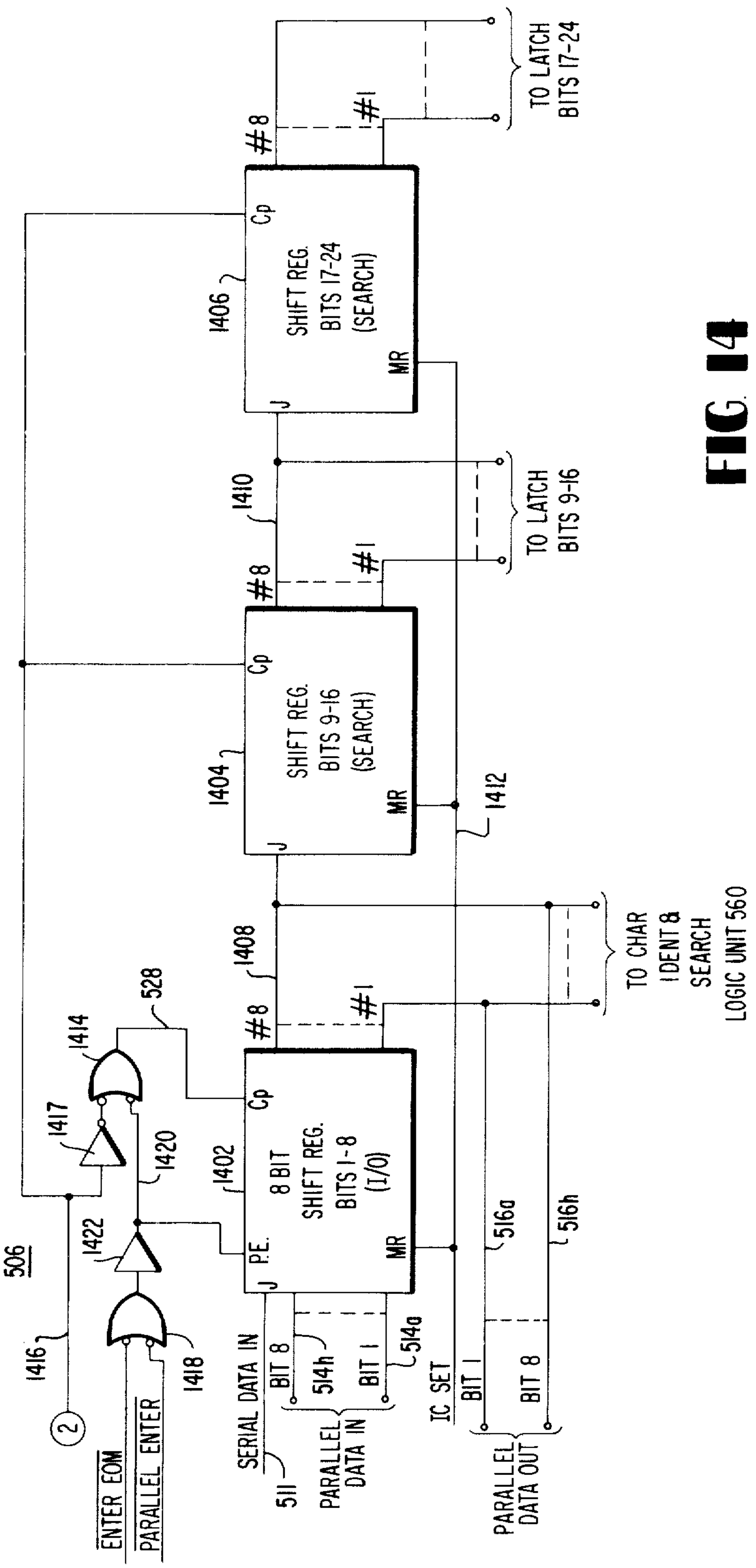
FIG. 14 shows the details of the input/output register, and the associated control logic.

FIG. 14 shows the details of the construction of shift register 504, and shift register control logic unit 506.

Shift register 504 is preferably constructed of commercially available integrated circuit sub-units, a sufficient number of sub-units being connected in series to provide the required 24-bit capacity. In a preferred embodiment, the sub-units are Model 9300 4-bit universal shift registers manufactured by Fairchild Semiconductor Division of Fairchild Camera and Instrument Company, Mountain View, California. The 24-bit capacity is provided by connecting six such sub-units in series. It will be appreciated, however, that any other comparable shift register circuits may be employed instead of those mentioned.

For convenience of illustration and description, pairs of the preferred Fairchild Model 9300 4-bit register units are joined together to form three sub-units, identified at 1402, 1404, and 1406. Sub-unit 1402 is the input/output register, the primary purpose of which is to provide input parallel to serial conversion, output serial to parallel conversion, and convenient receipt and delivery of serial input and output data. Also, sub-unit 1402 cooperates with sub-unit 1404 and 1406 in the implementation of the search operation, as described below. Each subunit includes a serial input denoted J and eight parallel inputs denoted No. 1 – No. 8. Control inputs include a parallel entry control input P.E., a shift advance input $C_P$ and a master reset input MR.

As illustrated in FIG. 14, the serial input for shift register sub-unit 1402 is connected to the serial data input line 511 from input-output logic unit 502. The serial input for shift register sub-unit 1404 is coupled to the No. 8 output of sub-unit 1402 over lead 1408. Lead 1408 also provides the serial output from the shift register on lead 516h to NAND gates 902 and 952 (see FIG. 9). The serial input of sub-unit 1406 is, in turn, coupled to the No. 8 output of sub-unit 1404 over lead 1410.

In addition to its serial input, sub-unit 1402 includes eight parallel inputs denoted Bit 1 through Bit 8 provided by the outputs of OR* gates **818*a*–818*h* (see FIG. 8.) These represent the parallel data input originating at keyboard 126**.

The MR inputs for all of shift register sub-units 1402 through 1406 are provided in common by the I.C. SET signal from sequence control logic unit 606 over lead 1412. As previously explained, the IC SET signal remains 0 briefly when power is applied to the system and thereafter goes to and remains at 1. Thus, the master reset inputs for the shift register sub-units remain at 0 for a short time after power is applied to the system. This forces all of outputs to 0. In this way, it is assured that shift register is "empty" at the time the system is turned on.

The shift advance signals provided to the $C_P$ inputs of sub-unit 1402 are provided over lead 528 from shift register control logic unit 506 (see FIG. 5) As illustrated in FIG. 14, shift register control logic unit 506 comprises a OR* gate 1414 receiving as inputs the No. 2 output of sequence control logic unit 606 over lead 1416 through an inverter 1417, and the output of a second OR* gate 1418 coupled through an inverter 1422 over lead 20. The latter receives as its inputs, the $\overline{\text{ENTER EOM}}$ signal from mode select logic unit 602, and the $\overline{\text{PARALLEL ENTER}}$ signal from input/output logic unit 502. The No. 2 output of the sequence control logic unit is coupled directly over lead 1416 as the $C_P$ input for shift register sub-units 1404 and 1406.

As previously explained, the No. 2 output of sequency control logic unit 606 is a series of eight pulses corresponding to the 12th, 20th, 28th, 36th, 44th, 52nd, 60th and 68th outputs of each cycle of counting chain 1202 (see FIG. 12.) these serve to transfer groups of eight pulses into the shift register from printer 102 or coupler 116, and out of the shift register into the intermediate line memory when recording. Correspondingly, during playback the No. 2 pulse group controls data transfer from the intermediate memory to the shift register and out of the shift register to printer 102 or coupler 116.

A $C_P$ input of 1 causes the signal value in each bit position to be transferred to the next bit position and to appear at the respective outputs in coincidence with the trailing edge of the advance pulse. Thus, the value of the signal at the serial (J) input of sub-unit 1402 is transferred to the No. 1 output, i.e., the 1st bit position, the No. 1 output is transferred to the No. 2 (2nd bit position) output, etc. The contents of the 8th bit position are transferred out over lead 1408 through the serial input of sub-unit 1404 to the 9th bit position of the shift register and appears at the No. 1 output of that sub-unit.

As will be understood, the information stored in the 23rd bit position is transferred to the 24th bit position, i.e., from the No. 7 to the No. 8 output of sub-unit 1406. The information previously at the 24th bit position is lost, if not utilized.

Shift register 504 is arranged to permit Simultaneous entry of new data in bit positions 1 through 8 by means of the parallel inputs of sub-unit 1402, as mentioned above. Data present at these inputs when the P.E. input is 0 and the $C_P$ input is 1, are prestored at the respective No. 1 through No. 8 outputs in coincidence with the return of the $C_P$ input to 0. Actuation of the parallel entry control input for sub-unit 1402 is provided by an inverter 1422 coupled to the output of OR* gate 1418.

It may therefore be seen that the P.E. input of shift register sub-unit 1402 is actuated either in response to the $\overline{\text{PARALLEL ENTER}}$ signal indicating the presence of a character to be transferred in from keyboard 126, or by the $\overline{\text{ENTER EOM}}$ signal when the special EOM character is to be stored.

As indicated above, parallel entry requires a 0 at the P.E. terminal and a 1 at the $C_P$ terminal. The required inversion of the P.E. signal is provided by OR* gate 1414, previously described.

Since an input character comprises only 8 bits it will be understood that parallel entry of new data is only required for the first eight bit positions, i.e. in sub-units 1402. No parallel entry at the other bit positions (i.e., for sub-units 1404 and 1406) is provided for.

As noted above, the parallel entry operation occurs when data is to be transferred into the system from a parallel source such as printer 102. The incoming data is provided over leads 514*a* through 514*h* in response to the $\overline{\text{PARALLEL ENTER}}$ pulse (s4e FIG. 8).

The $\overline{\text{PARALLEL ENTER}}$ pulse simultaneously activates the P.E. and $C_P$ inputs of sub-units 1402 entering the data on leads 514*a*–514*h* in the first eight bit positions of the shift register. Since the $\overline{\text{PARALLEL ENTER}}$ pulse also starts sequence control counter 1202 (see FIG. 12) the $\overline{\text{PARALLEL ENTER}}$ pulse on lead 528 is followed by the eight shift pulses comprising the No. 2 output of sequence control logic unit 606 which transfer the data just entered into bit positions 1–8 to positions 9–16, respectively, and also out along lead 516*h*, one bit at a time. Since the data on lead 516*h* is gated directly into one of the intermediate memory units during record the data in shift register sub-units 1404 and 1406 are not needed. The same is true for serial operations, both record and playback, and for parallel (local) playback, where data is shifted into sub-units 1402 serially and sampled in parallel as explained in connection with FIGS. 8 and 9 above.

For the search function, however, a three character address code capacity is provided. This code is entered in parallel from the keyboard and is stored temporarily in the three sub-units 1402–1406 before entry in a reference memory. Also, as stored data is scanned for the reference character, all three shift register sub-units are employed to store three characters for comparison with the reference characters. The foregoing is explained more fully below in connection with FIG. 24 below.

Serial Output Circuit

Referring back to FIG. 9, there will now be described the construction and operation of the serial output circuit, generally denoted 950. Basically, the function of this portion of the system is to add the START and STOP bits to the shift register output prior to serial transmission to a remote receiver or local teletype printer. Output circuit 950 comprises a NAND gate 952 which receives as a signal input, the shift register serial output at the 8th bit position over lead 516*h*. Control inputs for NAND gate 952 are provided over lead 860 by the PLAY output of mode select logic unit 602, and by the ZERO output of a set-reset start pulse flip-flop 954 over lead 955. The set and reset inputs for flip-flop 954 are provided through inverters 956 and 958 by the No. 6 and No. 5 outputs respectively of sequence control logic unit 606.

The output of NAND gate 952 is provided over lead 960 as the J input to a J-K line flip-flop 962. The K input for flip-flop 962 is also provided by the output of NAND gate 952 is complementary form through an inverter 964. The Q output of line flip-flop 962 is provided over lead 526 as the serial data output to coupler 116 or to a local serial printer. Signal steering may be accomplished in any convenient way, e.g. by a pair of contacts on locial-on line selection switch 318.

The clock input for line flip-flop 962 is provided over lead 966 by the No. 1 output of sequence control logic unit 606, while the reset input is provided through an inverter 968 by the output of an OR* gate 970. The latter, in turn, receives as its inputs, the OR-tied combination of the $\overline{\text{CHAR. PRES.}}$ and SEARCH signals described above on lead 971, the PLAY signal from mode select logic unit 602 over lead 972, and the $\overline{\text{No. 3}}$ output of sequence control logic unit 606 over lead 980.

Referring to the truth table for the J-K flip-flop in FIG. 7*f*, it will be seen that for the J and K inputs connected to complementary-signal sources, the Q output follows the J input and the $\overline{Q}$ output follows the K input. In other words, each successive clock pulse causes the Q and $\overline{Q}$ outputs to assume the values of the J and K inputs respectively at the time of the clock pulses.

As shown in FIG. 9, each clock pulse on lead 966 causes the output of flip-flop 962 on lead 526 to assume the value of the complement of the input on lead 960 at the time of the clock pulse. The latter is 0 if NAND gate 952 is inhibited (e.g. by the absence of the PLAY signal, etc.,) or it will follow the contents of the 8th bit position of the shift register if NAND gate 952 is free to operate. As will be recalled from the discussion of FIGS. 11 and 12 above, information is advanced through the shift register in response to the trailing edge of each shift pulse. Since the shift register advance sequence is controlled by the No. 2 output of sequence control logic unit 606, advance pulses are provided at 12th, 20th, 28th, 36th, 44th, 52nd, 60th, and 68th counts of each cycle. New data thus appear in the 8th bit position of the shift register at the end of each of the noted count outputs.

Line flip-flop 962 also changes its output state in response to the trailing edge of its clock pulse, but the new output is determined by the input and output signal states existing at the time of the leading edge of the clock pulse. Since operation of flip-flop 962 is controlled by the output of sequence control logic unit 606, clock pulses are provided in synchronism with the shift register advance pulses plus an additional clock pulse at the 4th count of each cycle.

Ignoring the latter for a moment, it may be seen that while the shift register and the line flip-flop are activated simultaneously, the new output state of thd flip-flop is determined by the state of 8th bit position of the shift register prior to the shift since the shift register state does not change until after the new output state of the flip-flop has been established. The result, of course, is that the flip-flop output is one bit behind the shift register.

As explained above in connection with FIGS. 11 and 12 a shift register advance cycle ends with the first information bit of a character code word at the 8th bit position of the shift register, the second bit of the character code word at the 7th bit position of the shift register, etc. At count 12 of the next cycle, the first bit is shifted out and the second bit is transferred to the 8th bit position, but line flip-flop 962 is updated before the shift takes place. Thus, at count 12 of a cycle, line flip-flop 962 provides as its output the first bit of the code word in question.

As noted above, line flip-flop 962 is first sampled at the 4th count of each cycle. The purpose of this is to generate the "start" bit (always a "space" or 0) which precedes the first information bit. For this purpose, start pulse flip-flop 954 is set at the end of a shift register advance cycle by the No. 6 output of sequence control logic unit 606, corresponding to the 0 count output of counting chain 1202 (see FIG. 12.) Flop-flop 954 is reset by the No. 5 output of the sequence counter which is the 6th count output of counting chain 1202. Accordingly, the ZERO output of start pulse flip-flop 954 is 0 from the end of one shift register advance cycle until the 6th count of the next cycle. This, in turn inhibits NAND gate 952, and its output is 1 irrespective of the data in the 8th bit position of the shift register.

When NAND gate 952 is initiated, the J input to line flip-flop 962 on lead 960 is clamped to 1, and the flip-flop clock pulse at the 4th count of each cycle produces a 0 output on lead 526. The first output in each cycle is therefore always a space, constituting the "start" pulse of each character code word.

When flip-flop 954 is reset at the 6th count of each cycle, its "zero" output returns to 1 and NAND gate 952 is reactivated. This permits line flip-flop 962 again to follow the value of the 8th bit position of the shift register. Thus, at the 12th count, the first information bit is sampled by line flip-flop 962 and the shift register is advanced to transfer the second information bit to the 8th bit position. The above described operation continues for the rest of the bits comprising each character. At the 20th count, bit 2 is sampled, and bit 3 is shifted to the 24th bit position. At the 28th count the 3rd bit is sampled and the 4th bit is shifted to the 24th bit position, etc.

At count 68, the eigth bit of the character code word is sampled and the first bit of the next character is transferred to the 8th bit position of the shift register.

For operation in the 132 baud EIA format, the eighth bit is the "stop" bit, so transfer of the entire code word is completed after the 68th count pulse, and counting chain 1202 may therefore be reset. As explained in connection with FIGS. 11 and 12, for 132 baud operation the 3 output of sequence control logic unit 606 corresponds to the 68th count of the cycle, whereby line flip-flop 962 is reset concurrently with the sampling of the 8th bit of the character code word. This returns the $\overline{Q}$ output of the line flip-flop to 1 but since the 8th bit of the EIA code word is a mark or 1 in any case, there is no difference in the output as a result of the simultaneous sampling and reset of the line flip-flop. The operating cycle having been completed, counting chain 1202 is reset by flip-flop 1128 the reset being initiated by the sequence control logic unit No. 4 output (see FIG. 11.)

As previously explained, for the EIA format this corresponds to the 72nd count, i.e. 4 counts after completion of the 68 count operating cycle, and thus only four of the required eight counts defining the stop pulse interval are provided. The remaining four counts are inherently provided since even assuming that the next count sequence begins promptly upon reset, a time period corresponding to four counts elapses before line flip-flop 962 is sampled (i.e. at count 4) to establish the leading edge of the start pulse for the next character.

For operation in the several ASCII formats, however, the 8th bit is the parity bit. For 110 baud transmission (11bit format) two stop bits must still be generated before the character transfer cycle is completed. This is accomplished by resetting line flip-flop 962 at count 76, which is the $\overline{\text{No. 3}}$ output of sequence control logic unit 606 for the ASCII formats. This corresponds to the beginning of the next bit following the parity bit — eight counts after count 68. Resetting flip-flop 962 produces a 1 at the $\overline{Q}$ output which corresponds to the mark level of the stop bits. Flip-flop 962 remains in the reset condition with a $\overline{Q}$ output of 1 until the next clock pulse, corresponding to the 4th count pulse of the next count sequence.

The time interval required to accommodate the two stop pulses, i.e. a total of 16 counts is established by resetting cycle flip-flop 1160 and counting chain 1202 at the 88th count or the cycle. This provides a total of 12 counts, even assuming that the next count cycle commences promptly upon reset of counter 1202 after the 88th count. The remaining four counts are inherently provided since flip-flop 962 is not sampled until the fourth count of the next cycle. If the next cycle does not commence immediately, an even greater interval is provided.

Operation for the 10-bit ASCII formats (150–2400 baud) is identical to that for the 11 bit format except that only a single stop bit is required. Thus only eight counts are required from the time flip-flop 962 is reset until the next clock pulse. This is provided by resetting the line flip-flop at count 76 and resetting the cycle flip-flop 1160 and counting chain 1202 at count 80. Four counts are thus provided; the other four counts are the first four counts of the next cycle, as in the previous examples.

Record and Playback Circuitry

Figure 15:
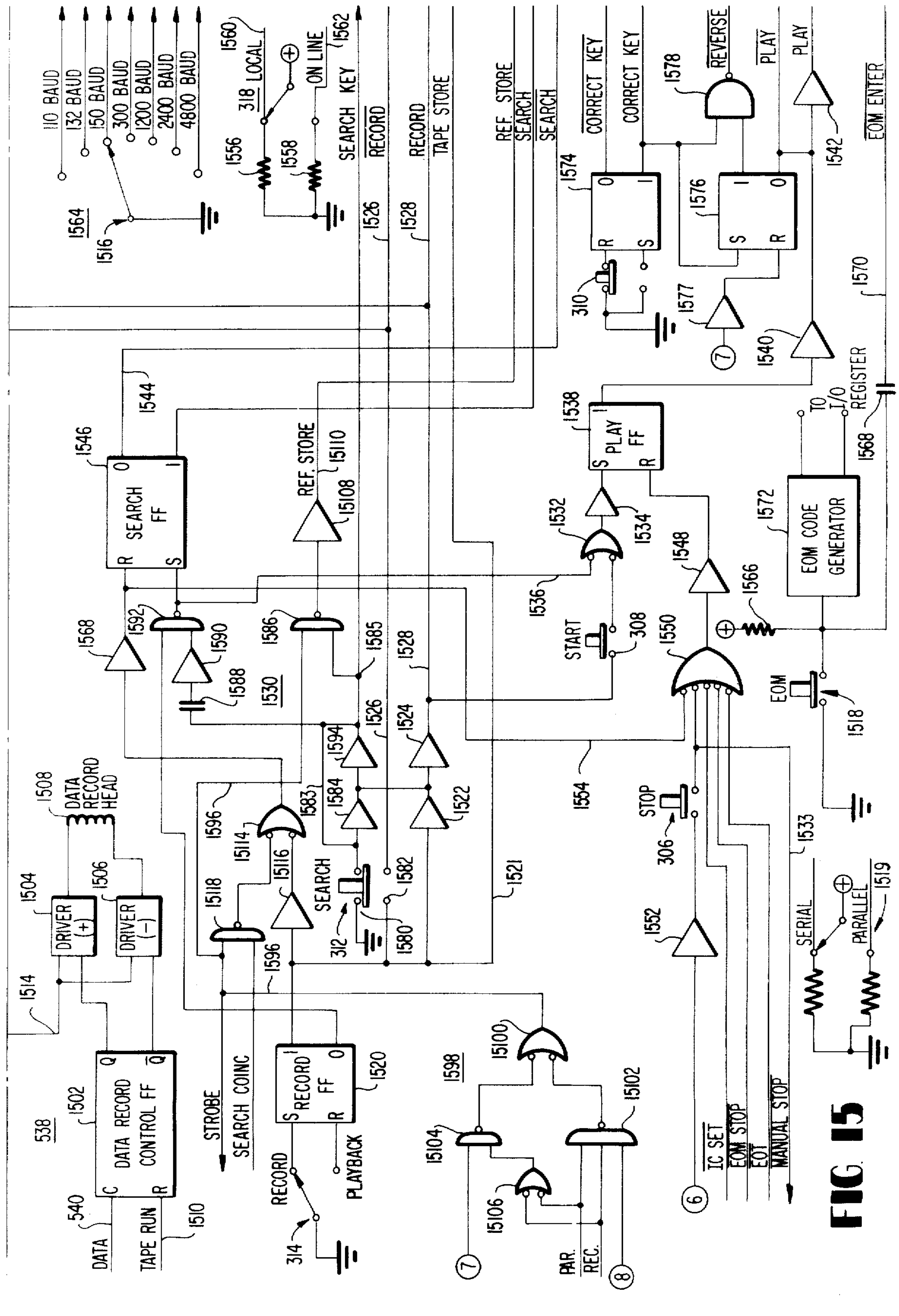
FIGS. 15 and 16, arranged as shown in FIG. 17, illustrate the details of the record and playback circuits, and the operating mode selection logic.
Figures 16, 17:
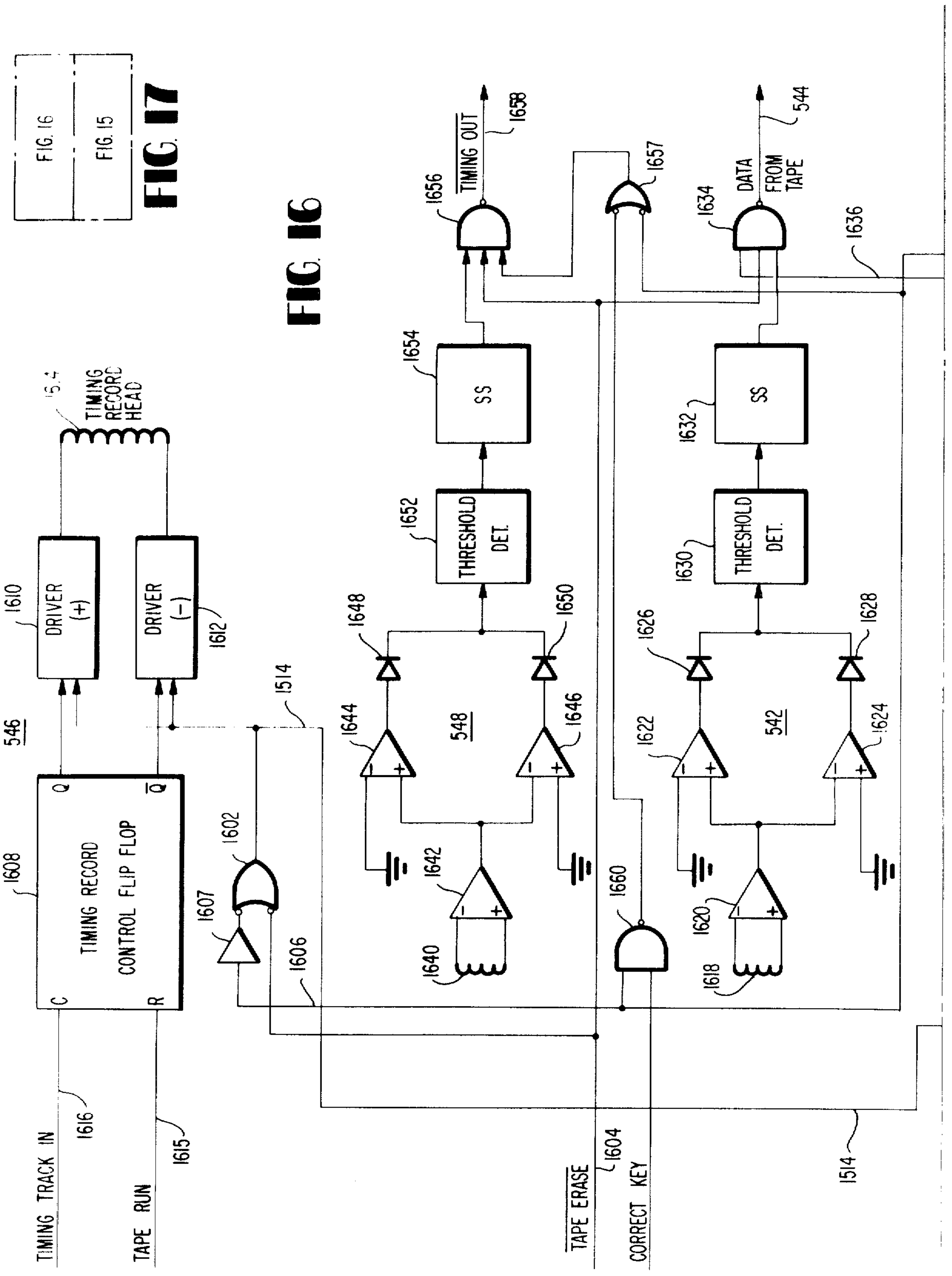

FIGS. 15 and 16 arranged as shown in FIG. 17 illustrate the construction of data and timing track record circuits 624 and 626, and data and timing track playback circuits 620 and 622.

Information in both the data and timing tracks is recorded in the non-return-to-zero format in which the magnetization state of the tape changes from full magnetization in one direction to full magnetization in the other direction to record a 1 bit, but does not change to record a 0 bit. Bi-phase format may also be employed.

Data track record circuit 624 shown in FIG. 15 comprises a J - K data record control flip-flop 1502, a pair of driver circuits 1504 and 1506 coupled respectively to the Q and $\overline{Q}$ outputs of flip-flop 1502, and a data record head 1508, coupled to the outputs of driver circuits 1504 and 1506. The clock input of flip-flop 1502 is connected to data output of one of memory units 204A or 204B as explained below over lead 540. The reset input is provided over lead 1510 by the TAPE RUN signal from tape control logic unit 552.

The J and K inputs of flip-flop 1502 (not shown) are connected in common to the positive power supply thereby providing constant 1 inputs. Consequently, as indicated by the truth table in FIG. 7(f), the flip-flop operation is such that each successive clock input at the 1 level reverses the flip-flop output state if the reset input is also 1, i.e. if the tape is running. Thus, 1's of the data signal reverse the flip-flop output but 0's do not.

When the TAPE RUN signal is 0, indicating that the tape is not running, flip-flop 1502 is reset, whereby the Q and $\overline{Q}$ outputs are clamped respectively to 0 and 1, and remain at these levels (even after the reset signal returns to a 1 level) until the next 1 bit of the data input.

The Q and $\overline{Q}$ outputs of flip-flop 1502 respectively actuate driver circuits 1504 and 1506. The latter are solid state amplifiers of any conventional or desired construction. These provide current flow through dtat head 1508 in the direction shown by the arrow when the Q output of flip-flop 1502 is 1 and reverse current flow when the $\overline{Q}$ output of flip-flop 1502 is 1.

Driver circuits 1504 and 1506 are also provided with conditioning inputs over lead 1514 by the output of an OR* gate 1602. This receives as its inputs, the $\overline{\text{TAPE ERASE}}$ signal over lead 1604 from tape control logic unit 604, and the TAPE STORE output of mode select logic unit 602, described below, over lead 1606 through an inverter 1607. Drivers 1504 and 1506 operate only if the signal on lead 1514 is 1, thereby preventing operation of the record circuits during playback with resulting loss of previously recorded information. Further, because driver 1506 is conditioned by the $\overline{Q}$ output of flip-flop 1502 whenever the tape is stopped, the tape is always magnetized in the same direction when the tape restarts, and thus the first transition unambiguously represents a 1 being recorded (or previously recorded) on the tape.

Timing track record circuit 626 shown in FIG. 16 is contructed identically to data track record circuit 624. The circuit includes a J-K timing record cotnrol flip-flop 1608, a pair of driver circuits 1610 and 1612 connected the Q and $\overline{Q}$ outputs respectively of flip-flop 1608 and a timing track record head 1614, connected to the outputs of driver circuits 1610 and 1612. As in the case of driver circuits 1504 and 1506, the output of OR* gate 1602 is connected as a conditioning input for driver circuits 1610 and 1612, and the reset input for flip-flop 1608 is provided by the TAPE RUN signal over lead 1615. The clock input for flip-flop 1608 is provided over lead 1616 by the "TIMING PULSE" output of intermediate memory control logic unit 530 as hereinafter explained.

Timing track record circuit 626 operates in the same manner as described above for data track record circuit 624. However, because the timing pulses constitute a continuous succession of 1's throughout the recording period, each successive timing pulse inverts the outputs of flip-flop 1608, and reverses the magnetization state of the tape.

Data track playback circuit 620 shown in FIG. 5 is constructed to convert the non-return-to-zero record format back to a binary format. The circuit comprises a differential amplifier 1620 having positive and negative inputs connected to the output of a data playback head 1618. The output of amplifier 1620 is connected to the positive and negative inputs respectively of a second pair of differential amplifiers 1622 and 1624. The negative input of amplifier 1622 and the positive input of amplifier 1624 are both grounded. Consequently, amplifier 1622 reproduces the output of amplifier 1620 while amplifier 1624 inverts the output of amplifier 1620. As will be appreciated, each transition between magnetization states on the tape results in a pulse of current in playback head 1618, with pulses of opposite polarity representing transistors in opposite magnetic "directions" and with a zero signal level representing continuation of a previous magnetic state, i.e., no transition. Thus, each pulse, whatever the polarity represents a 1 since a recorded 0 does not change the magnetization state of the tape. Since amplifiers 1622 and 1624 produce inverted versions of the output of data head 1618, it will be appreciated that a particular state transition produced a positive output from amplifier 1622 and a simultaneous negative output from amplifier 1624. An opposite transition produces a negative output from amplifier 1622 and positive output from amplifier 1624.

The positive outputs of both amplifiers (or the negative outputs) thus constitute all of the 1's recorded on the tape. These are collected by connecting the outputs of amplifiers 1622 and 1624 respectively to a pair of diodes 1626 and 1628. The diodes are poled to permit current flow for positive outputs of the respective amplifiers, thereby achieving the required collection of 1 outputs.

Diodes 1626 and 1628 are connected in common to the input of a threshold detector 1630, set to trigger at approximately one-half the level corresponding to response to full magnetization of the tape in either direction. The output of threshold detector 1630 is connected to the input of a single shot multi-vibrator 1632 having a delay period of approximately one-half the duration of the transition pulses. Thus, each transition pulses of 1 being played back produces an accurately defined, straight sided pulse for transfer to line memory 204. Conversely, continued absence of transition pulses (signifying a 0 bit) maintains multi-vibrator 1632 in its rest condition, and no output pulse is provided.

The output of single shot multi-vibrator 1632 is provided as the signal input to a NAND gate 1634 which receives as control inputs, the $\overline{\text{RECORD}}$ signal from mode select logic unit 602 over lead 1636, and the $\overline{\text{TAPE ERASE}}$ signal over lead 1604 from tape control logic unit 604. The output of NAND gate 1634 is coupled over lead 544 as the signal input to intermediate memory 204 (see FIG. 5.).

Timing track playback circuit 622 is identical to data track playback circuit 620. The circuit includes a differential amplifier 1642 having its inputs coupled to a timing track playback head 1640. The output of amplifier 1642 is connected to the respective positive and negative inputs of a further pair of differential amplifiers 1644 and 1646, the negative and positive inputs of which are grounded. The outputs of amplifiers 1644 and 1646 are connected to a pair of diodes 1648 and 1650 poled to pass current when the amplifier outputs are positive.

The diodes are connected in common to the input of a threshold detector 1652, the output of which triggers a single shot multi-vibrator 1654. The latter provides the signal input to a NAND gate 1856, which receives as its control inputs the output of an OR* gate 1657 and the $\overline{\text{TAPE ERASE}}$ signal over lead 1604 from tape control logic unit 604. OR* gate 1657 receives as its inputs, the $\overline{\text{RECORD}}$ signal, and the output of a NAND gate 1660 which receives as its inputs the TAPE STORE signal, and the CORRECT KEY signal from mode select logic unit 602 as hereinafter described. NAND gate 1656 is thus permitted to operate either for playback or during record when error correction is in progress. The output of NAND gate 1656 is provided over lead 1658 as the "TIMING SIGNALS" to intermediate memory control logic unit 530 and to tape control logic unit 604.

Mode Select Logic Unit

FIG. 15 also illustrates the construction of mode select logic unit 602. The circuit includes playback-record select key 314, local-on line select key 318, playback start key 308, manual stop key 306, search key 312, and error correct key 310, all previously described, a baud rate selector logic switch 1516, a special "end of message" or EOM key 1518, and a parallel-serial selection switch 1519, together with logic circuitry activated by the above mentioned control keys.

Playback-record select key 314 operates a two-position switch having a moving contact connected to ground, and a pair of fixed contacts respectively connected to the set and reset inputs of a set-reset flip-flop 1520. The latter provides the TAPE STORE signal at its ONE output over lead 1521. This signal controls data transfer to the tape from one of the intermediate memory units, and gates record drivers 1504, 1506, 1610, and 1612 as previously explained. The ONE output of flip-flop 1520 on lead 1521 is also coupled to a pair of inverters 1522 and 1524, the outputs of which respectively provide the $\overline{\text{RECORD}}$ and RECORD signals on leads 1526 and 1528. The junction between inverters 1522 and 1524 is also connected to a search control logic circuit 1540 described in detail below. The latter cooperates with inverters 1522 and 1524 to produce a 1 value for the RECORD signal and 0 value for the $\overline{\text{RECORD}}$ signal either when the system is actually operating in the record mode (as established by the position of record-playback selection switch 314,) or when the search key 312 has been depressed to permit entry of the search reference characters in a temporary reference memory. Otherwise, the RECORD and $\overline{\text{RECORD}}$ signals are 0 and 1, respectively.

Playback start key 308 operates a signal pole normally open switch having one contact connected to the output of inverter 1524 and a second contact connected to an OR* gate 1532. The output of the latter is connected through an inverter 1534 to the set input of a set-reset playback flip-flop 1538. The ONE output of flip-flop 1538 is coupled to a pair of series-connected inverters 1540 and 1542. These, in turn, provide the $\overline{\text{PLAY}}$ and PLAY signals respectively, for use elsewhere in the system.

A second input for OR* gate 1532 is provided over lead 1536 by a NAND gate 1592 described below which also sets set-reset search flip-flop 1546 at the beginning of a search operation.

The reset input for playback flip-flop 1538 is provided by inverter 1548 coupled to the output of an OR* gate 1550. The latter receives as inputs, the $\overline{\text{I.C. SET}}$ signal from sequence control logic unit 606, the $\overline{\text{EOT}}$ (end of tape) signal from tape drive unit 142 and the $\overline{\text{EOM STOP}}$ signal from character identification and search logic unit 650. A fourth input is provided by stop key 306. The latter operates a normally open single pole switch connected to the output of an inverter 1552, the input of which is provided by the 6 output of sequence control logic unit 606. Since the latter signal is high only when counting chain 1202 is reset, i.e. when an eight-bit data transfer sequence is not in progress, it is clear that manual reset of flip-flop 1538 can occur only at that time. Thus, stop key 306 is inoperative to halt playback if transfer of a character is in process, thereby preventing mutilation of a character which could occur if the 8-bit data transfer operation is interrupted.

Depression of stop key 306 also provides an output over lead 1553 as the $\overline{\text{MANUAL STOP}}$ signal, which is provided to tape control logic unit 504 for manually stopping a tape rewind operation as hereinafter described. (The No. 6 output of the sequence control logic unit will always be high at that time.)

Local-On Line select key 318 operates a 2-position switch having a moving contact connected to the positive power supply and fixed contacts grounded through respective resistors 1556 and 1558. The fixed contacts are also connected to leads 1560 and 1562 to provide the LOCAL and ON LINE signals for use elsewhere in the system.

Mode select logic unit 602 also includes a baud rate selection logic unit 1564 which generates the frequency selection control signals for the various baud rates. In its simplest form unit 1564 may be a seven position switch with a grounded selector arm 1516. This may be positioned along with the other function control keys previously described on auxiliary keyboard 140, or may be located in the electronics console if preferred, since its use may be less frequent than the other control keys.

As indicated, switch 1516 has its moving contact grounded, and is arranged to engage fixed contacts corresponding to the available system baud rates. Inverters (not shown) may be provided to generate complementary values of the selection signals as required.

Mode select logic unit 602 also includes EOM ENTER Key 1518. This is representative of a mechanism for generating the "end of message" character code word, and actuating shift register 504 and sequence control logic unit 606 to store the code word.

Key 1518 is shown simply as operating a single pole normally open switch having one contact connected to ground and the second contact 1594 connected to the positive power supply through a resistor 1566. This junction is coupled by a capacitor 1568 to lead 1570 to provide the EOM ENTER signal for shift register sub-units 1404 and 1502 previously described.

In addition, it will be appreciated that the EOM code word itself must also be generated in response to depression of EOM key 1518. This may be accomplished in several ways, the simplest being by a set of normally open contact pairs, one contact of each pair being connected to the positive power supply or ground to generate the required pattern of 1's and 0's, and the other contact of each pair being connected to the respective parallel inputs of shift register sub-unit 1402. The foregoing is illustrated as a single "EOM" code generator block designated 1572 for simplicity of illustration.

Yet another function controlled by mode selection logic unit 602 is error correction. For this purpose, there is provided a pair of flip-flops 1574 and 1576, the former being set and reset by depression and release, respectively of correct key 310. The 0 output of flip-flop 1574 produces the CORRECT KEY signal, while the 1 output provides the set input for flip-flop 1576. Thus, when correct key 310 is depressed, flip-flop 1576 is set. The reset input for flip-flop 1576 is provided by the No. 7 output of sequence control logic unit 606, coupled through inverter 1577.

The 1 output of flip-flop 1576 is coupled, together with the 1 output of flip-flop 1574, to a NAND gate 1578 to produce the REVERSE signal. The latter goes low when the flip-flops are triggered, and is coupled to OR* gate 1172 to set cycle flip-flop 1160 (see FIG. 11) and thus to trigger cycle counter 1202. At count "70" the No. 7 signal is low, and flip-flop 1576 is reset, causing the REVERSE signal to return to a high level.

It thus may be seen that in response to depression of the correct key, the correction logic circuit is activated for one cycle of the cycle counter 1202. As explained hereinafter, this permits the operation of one of intermediate memory units 204(A) or 204(B) [the one then receiving data from the external source through the I/O register] in such a manner as to return to the memory storage position corresponding to the beginning of the last recorded character. As a result a substitute character may be stored in place of that previously stored. This operation takes place each time the error correct key is depressed — the system stepping backward one character at a time for each depression.

Another function controlled by the circuitry shown in FIG. 15 is the initiation of the search operation. The circuitry employed for accomplishment of this function includes the search key 312, and search flip-flop 1546, previously mentioned, and associated logic circuitry. Specifically, search key 312 controls a pair of normally closed contacts 1580 and a pair of normally open contacts 1582. Contact pair 1580 operates to provide a ground to the inputs of an inverter 1584 and over lead 1583 to a NAND gate 1586, and also through an AC coupling circuit represented by capacitor 1588 to an inverter 1590 which is connected to one input of a second NAND gate 1592. Lead 1583, connected to lead 1585, and the output of an inverter 1594 also provides the SEARCH KEY signal — a high level when the search key is depressed and a low level under other conditions. Normally open contact pair 1582 is arranged to couple the "ONE" output of record flip-flop 1520 to the junction between inverters 1522 and 1524 previously mentioned, and to the input of another inverter 1594. This junction is connected over lead 1526 to provide the RECORD signal.

Considering the result of the above-described circuit configuration, it may be seen that with search key 312 in its normal position, the output of inverter 1594 and thus the input to and gate 1586 is held low. Correspondingly, the low level at the output of inverter 1594 is connected through AC coupling circuit 1588 and inverter 1590, producing a pulse input to NAND gate 1592 whenever the output of inverter 1594 changes, and a low input otherwise, the pulse being of polarity opposite to the transition at the inverter output. Thus, except for the effect of such a pulse of positive polarity, both NAND gates 1596 and 1590 are inhibited with search key in its normal position.

When search key 312 is depressed, the input to inverter 1594 will depend on the output of record flip-flop 1520 provided through contact pair 1582. When the flip-flop is set — i.e. for record operation, its "ONE" output is high, but the signal on lead 1526 is held low by the operation of inverter 1522. Thus, the output of inverter 1594 is high and the output of inverter 1590 is low, thereby continuing to inhibit NAND gate 1592. On the other hand, the high output of inverter 1594 conditions NAND gate 1586 and permits its operation in response to its second input as hereinafter described.

If record flip-flop 1520 is reset, i.e. for playback operation, the "ONE" output is low. Then, depression of search key 312 forces the signal on lead 1526 to a low level, and the output of inverters 1524 and 1594 are high. Thus, even with the system in playback, if the search key is depressed, the RECORD and RECORD signals are respectively 1 and 0, and portions of the system responsive to these signals are unable to detect the difference between a record operation and depression of the search key during playback operation.

As previously mentioned. initiation of a search operation requires depression of the search key, followed by entry into the system through the manual keyboard of the search reference characters (hence the need for the system to appear to be operating briefly in the record mode) followed by release of the search key and initiation of the actual search operation. This, and certain of the related search functions are controlled by NAND gates 1586 and 1592, and search flip-flop 1546. For this purpose, the second input to NAND gate 1586 is provided over lead 1596 by the DATA STROBE signal generated by a logic circuit generally denoted 1598.

Logic circuit 1598 comprises an OR* gate 15100 which receives as inputs, the outputs of a pair of NAND gates 15102 and 15104. NAND gate 15102 recieves as its inputs, the PARALLEL signal generated by parallel-serial switch 1519 previously mentioned, by the RECORD signal appearing on lead 1528 at the output of inverter 1524, and by the No. 8 output of sequence control logic unit 606 (corresponding to count 4 of the 88 count cycle.) The inputs for NAND gate 15104 are provided by the No. 7 output of sequence control logic unit 606, (corresponding to count 70) and by the output of an OR* gate 15106 which receives as its inputs, the PARALLEL and RECORD signals provided as inputs to NAND gate 1560.

The purpose of the DATA STROBE signal is to identify at time at which a complete character is unambiguously present in the I/O register. As will be recalled, during playback and for serial recording, data is transferred in 8-bit bursts ending at count 68 of each 88 count cycle from one of intermediate memory units 204(A) or 204(B) to the I/O register. For record operation from a local parallel source, data is entered in parallel at count 4, followed by direct serial transfer to the intermediate memory. Thus, for the latter, a complete character is present in the I/O register at count 4, but for the former, a complete charcter is not present until after count 68. The DATA STROBE signal is therefore high either at count 4 for local record operation or at count 70 for playback or on-line recording.

Returning to NAND gate 1592, the second input is provided by the ZERO output of record flip-flop 1520, whereby NAND gate 1592 is conditioned only when record flip-flop 1520 is reset, i.e., when the system is operating in playback.

The output of NAND gate 1592 initiates the search and is provided to the set input of search flip-flop 1546, as well as over lead 1536 to OR* gate 1532 as noted above. The reset input for search flip-flop 1546, as previously mentioned, is provided by an inverter 1568. This in turn is coupled to the output of an OR* gate 15114 which receives as its inputs, the output of an inverter 15116 coupled to the ONE output of record flip-flop 1520, and the output of NAND gate 15118. The latter receives as its inputs, the DATA STROBE signal previously described, and the SEARCH COINCIDENCE signal from character identification and search logic unit 560. As hereinafter explained, this signal is high to indicate completion of a search operation, i.e., successful recognition of the pre-established reference characters. The output of inverter 1568 is also coupled over lead 1554 to OR* gate 1550 to reset playback flip-flop 1538 when the search is completed.

Referring again to NAND gate 1586, this is activated by the DATA STROBE signal when search key 312 is depressed, and the system is in the playback mode. The DATA STROBE signal is generated at count 4 because the system is in local operation, and the RECORD signal on lead 1528 is force high by depression of the search key. Moreover, the presence of count 4 indicates that a character is being entered through the keyboard — representing one of the search reference characters. At that time, therefore, NAND gate 1586 operates and generates the REFERENCE STORE signal on lead 15110. This activates storage circuitry for retaining the just entered reference character. Similar operation occurs in response to entry of the second and third reference characters.

When search key 312 is released after entry of the third reference character, the output of inverter 1594 drops to a low level. The high to low transition is coupled through capacitor 1558 to produce a high pulse at the output of inverter 1590. Since record flip-flop 1520 is reset, its "ZERO" output is high, and NAND gate 1592 operates to set search flip-flop 1546, initiating the search operations hereinafter described. When the search is completed as indicated by a high level of the SEARCH COINCIDENCE signal, and the DATA STROBE signal is also high, indicating the legitimacy of the search coincidence, NAND gate 15118, OR* gate 15114, and inverter 1586 operate to reset the search flip-flop, thereby terminating the search operation.

The final function of mode selection logic unit 602 is to select parallel or serial operation. This may be done by strapping the circuit inputs requiring the PARALLEL signal to a high level for parallel operation or to ground for serial operation. Alternatively switch 1519 may be employed if user selectability is desired. As a further alternative, contacts of switch 1519 may be mechanically coupled to local-on line selection switch 318. This could be convenient if a parallel local source is to be used exclusively with a serial remote source. Other alternatives will also be apparent.

Tape Operation Control

Figure 18:
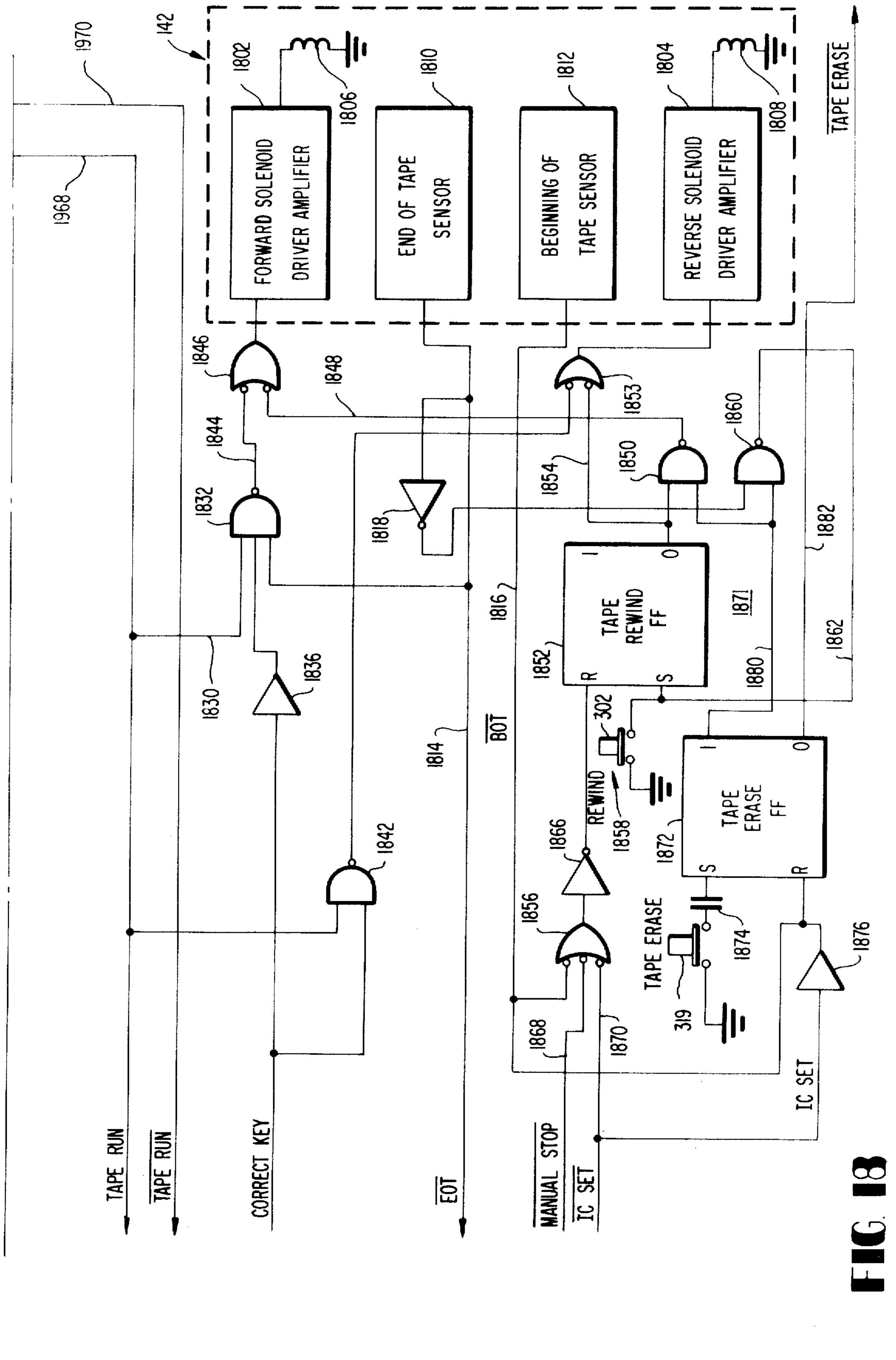
FIGS. 18 and 19, arranged as shown in FIG. 20 illustrate the details of the tape memory operation control logic.
Figures 19, 20:
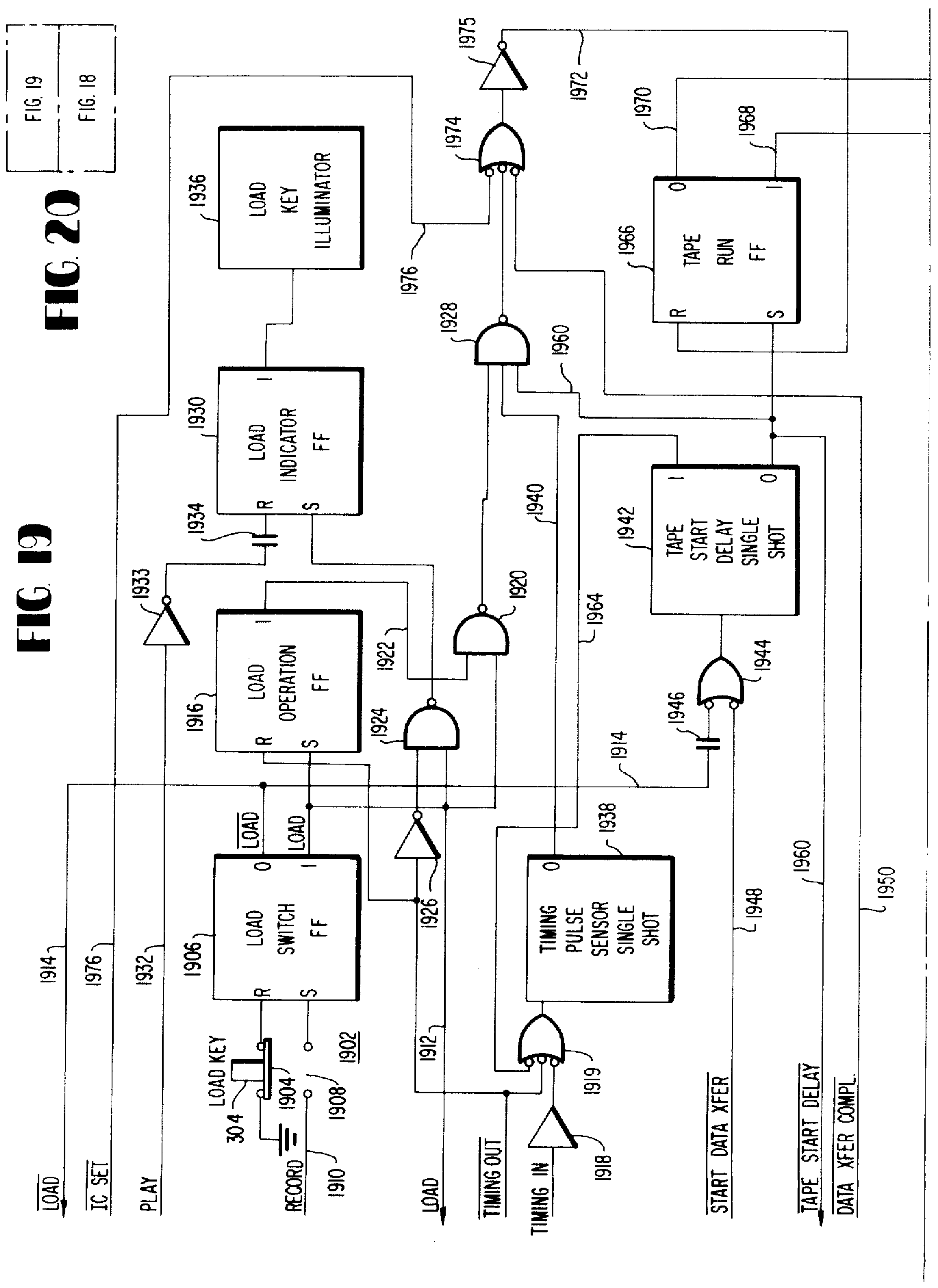

FIGS. 18 and 19 arranged as shown in FIG. 20 illustrate, in schematic form, certaion portions of the tape drive unit 142, and the details of the construction of tape control logic unit 604.

The details of the construction of tape drive unit 142 do not per se constitute part of this invention, and have therefore been omitted. It should be noted, however, that the tape drive unit includes forward and reverse solenoid driver amplifiers 1802 and 1804 actuating respective forward and reverse solenoids 1806 and 1808. The latter operate clutch mechanisms (not shown) for driving the tape transport in the forward and reverse directions. As will be understood, when forward solenoid driver amplifier 1802 and solenoid 1804 are actuated, the tape is advanced and when reverse driver 1806 and solenoid 1808 are activated, the tape is rewound.

Tape drive mechanism 142 also includes end and beginning of tape sensors 1810 and 1812. These are constructed in any suitable fashion to provide respective outputs over leads 1814 and 1816 as the $\overline{\text{EOT}}$ and $\overline{\text{BOT}}$ signals, 1 values of which indicate that the tape has not been transferred completely to one of the reels in the cassette.

Control signals for solenoid drivers 1802 and 1804 are provided by tape drive logic unit 604, including previously mentioned load key 304 and associated logic circuitry, and other logic circuitry for starting and stopping the tape at the required times. Load key 304 operates a double pole switch 1902 having a normally closed contact set 1904 connected between ground and the reset input of a set reset load switch flip-flop 1906. A noramlly open contact set 1908 connects the RECORD signal on lead 1910 to the set input of flip-flop 1906. The ONE and ZERO outputs of load switch flip-flop 1906 provide the LOAD and $\overline{\text{LOAD}}$ signals, respectively over leads 1912 and 1914 for use elsewhere in the system.

The LOAD signal on lead 1912 is also connected to the set input of set-reset load operation flip-flop 1916, the reset input to which is provided by the output of timing track playback circuit 622, i.e., the $\overline{\text{TIMING OUT}}$ signal The LOAD signal from load switch flip-flop 1906 is also connected as an input to a NAND gate 1920, the other input of which is provided over lead 1922 by the ONE output of load operation flip-flop 1916. The LOAD signal further provides an input to another NAND gate 1924, the second input of which is provided by the timing track output through an inverter 1926. The output of NAND gate 1920 is connected as one input to a NAND gate 1928.

The output of NAND gate 1924 is connected to the set input of a set reset load indicator flip-flop 1930, the reset input for which is provided over lead 1932 by the PLAY signal from mode select logic unit 602 through an inverter 1933, and an AC coupling capacitor 1934. The ONE output of load indicator flip-flop 1930 constitutes the LOAD SET signal, and also activates a load key illuminator 1936 comprising a light bulb or the like contained in load key 304.

Referring again to NAND gate 1928, a second input is provided by the ZERO output of a retriggerable single shot multi-vibrator 1938 having a 5 millisecond delay period. The trigger input to single shot 1938 is provided over lead 1918 by the timing track output signal connected as one input to a OR* gate 1919. As mentioned above, timing signals are generated by the REC. CLK signal from timing signal generator 610, i.e. at 9600 Hz or at 1200 Hz depending on tape speed. Thus, timing pulses are recorded on the tape at intervals of at most about 0.83 milliseconds (for 1200 Hz) and the signal one lead 1918 is a pulse train at such frequency for the entire duration of any block of recorded data. Single shot 1938 is retriggerable, so as long as timing signals continue to appear within 5 millisecond intervals, single shot 1938 remains on and a 0 output is provided over lead 1940 to inhibit NAND gate 1928.

When the timing pulses end, indicating completion of a block of recorded data, single shot 1938 is allowed to complete its delay period, and 5 milliseconds later it returns to its reset state with a 1 output on lead 1940. Single shot 1938 therefore serves as a sensor for timing signals and for completion of playback of a data block, and also of reverse operation of the tape for a complete data block.

An additional function served by single shot 1938 is to maintain tape run flip-flop 1966 in operation during the record sequence. For this purpose, the TIMING IN signals, coupled through an inverter 1918 are provided as an additional input to OR* gate 1919. Thus, during record, the timing pulses recorded on tape maintain single shot 1938 triggered for the entire interval during which data is transferred from one of the memory units 204A or 204B to the tape.

Tape control logic unit 604 also includes a further triggerable single shot multi-vibrator 1942 having a 100 millisecond delay period. The latter is chosen to provide sufficient time for the tape drive mechanism to attain its normal operating speed (e.g. 15 inches/sec.) before the record and the playback operations are actually permitted to commence.

Single shot 1942 is triggered by the output of an OR* gate 1944, one input to which is provided through capacitor 1946 by the LOAD signal on lead 1914. A second input to OR* gate 1944 is provided over lead 1948 by the START DATA TRANSFER signal from intermediate memory control logic unit 530.

The ZERO output of tape start delay single shot 1942 on lead 1960 represents the TAPE START DELAY signal, and is low during the tape start-up period, but high otherwise. This provides a third input to NAND gate 1928, and the set input of a set/reset tape run flip-flop 1966, the ONE and ZERO outputs of which provide the TAPE RUN and TAPE RUN signals respectively over leads 1968 and 1970 for use elsewhere in the system. The ONE output of single shot 1942 on lead 1964 is coupled as a second input to OR* gate 1919.

The reset input for tape run flip-flop 1966 is provided over lead 1972 by an OR* gate 1974 through an inverter 1975. OR* gate 1974 receives as its inputs, the I.C. SET signal on lead 1976 from sequence control logic unit 606, the output of NAND gate 1928 previously described, and the DATA TRANSFER COMPLETED signal on lead 1950 from intermediate memory control logic unit 530.

A tape operation sequence begins in response to a low level of the START DATA XFER signal, or when the LOAD signal provided through capacitor 1946 is low. These inputs provide a 1 output of OR* gate 1944 to set tape start delay single shot 1942, the ZERO output of which goes to 0. This sets tape run flip-flop 1966, and provides 1 level on leads 1968 and 1830 to the input of a NAND gate 1832. The latter receives as its other inputs, the EOT signal from lead 1814, and the CORRECT KEY signal from mode select logic unit 602 coupled through an inverter 1836.

Accordingly, if the correct key is not depressed, the output of inverter 1836 will be high. In that event, if the tape run flip-flop 1966 is set, and the end of the tape has not been reached, the ouput of NAND gate 1832 will be 0.

The output of NAND gate 1832 is connected by lead 1844 as one input to an OR* gate 1846, the other input to which is provided over lead 1848 by the output of a NAND gate 1850 hereinafter described. OR* gate 1846 is connected to forward solenoid driver amplifier 1802, whereby operation of OR* gate 1846 energizes solenoid 1806, causing the tape to run in the forward direction. The tape continues to run until tape run flip-flop 1966 is reset by a 0 output of inverter 1975, i.e., in response to the DATA XFER COMPLETE signal or a low output of NAND gate 1928 operation of which was explained above. As explained in detail below, the DATA TRANSFER COMPLETED signal remains high until the entire data capacity of one of the intermediate memory units has been transferred to or from the tape. At that time the signal on lead 1828 goes low. Reset of tape run flip-flop 1966 deactivates forward solenoid driver/amplifier 1802 and solenoid 1806 through NAND gate 1832 and OR* gate 1846, and stops the tape drive.

As noted above, tape start delay single shot 1942 prevents the reset of tape run flip-flop 1966 for a period of 100 milliseconds, and also triggers single shot 1938 through OR* gate 1919 at the end of the 100 millisecond delay. Thus, it will be appreciated that when the system is operating in a playback mode, and the tape has been started, if the first timing pulse does not retrigger single shot 1938 within 5 milliseconds after the 100 millisecond start-up time is completed, tape run flip-flop 1966 will be reset and no data will be played back.

In normal operation, this presents no difficulties since timing pulses are recorded on the timing track 100 milliseconds after the beginning of a recording interval. Assuming that only 50 milliseconds are actually required for the tape to attain full speed, and also to come to rest, then a 150 millisecond interval will exist between data blocks, i.e., recording begins 100 milliseconds after the tape starts to run, and the tape runs 50 milliseconds after the recording of a data block has ended. Moreover, the tape is not turned off for 5 milliseconds after the data block has been played back so the tape runs for approximately 55 milliseconds beyond the end of data block and assures that the timing pulses of the next data block will be encountered less than 100 milliseconds after the tape start-up. Provision of the additional 45 millisecond interval insures a margin of safety.

However, at the beginning of a tape, or if for some other reason a substantial length of unrecorded tape exists, the start-up period of 100 milliseconds can be exceeded without timing pulses being detected. Thus, particularly when preparing to play back the first data block on a tape, it it necessary to override timing circuits 1938 and 1942.

This is accomplished by use of a load key 304. Depression of the load key activates tape start single shot 1942 and tape run flip-flop 1966 as previously noted. Also, load switch flip-flop 1906 is set by load key 304, assuming the RECORD signal is 0 as it will be in preparation for playback operation. The set input of load operation flip-flop 1916 goes to 1. (As will be understood, the latter signal was previously 0 whereby load flip-flop 1916 was set.) The 1 input has no effect on the circuit operation and the flip-flop remains set. On the other hand, with 1 signals on leads 1912 and 1922, the output of NAND gate 1920 goes to 0. This inhibits NAND gate 1928, thereby preventing reset of tape run flip-flop 1966 as long as key 304 is depressed or until load flip-flop 1916 is reset by the first pulse detected in the timing track.

With load flip-flop 1916 reset, the output of NAND gate 1920 goes to 1, reconditioning NAND gate 1928. By this time, however, the initial timing pulse will have triggered single shot 1938, the output of which goes to 0. This, in turn, maintains NAND gate 1928 inhibited as long as timing pulse continues to be detected (and for a period of 5 milliseconds thereafter).

Thus, even if substantial initial portion of a tape does not contain information, the tape continues to run until the first body of information is encountered and continues to run until that body of information has been completely played out into the intermediate memory.

During the above-described operation, load key 304 is maintained depressed. If the load key is released prematurely, load siwtch flip-flop 1906, is reset, and NAND gate 1920 ceases to operate, returning its output to 1. Therefore, if timing pulses have not yet been encountered, the tape will stop without having reached the beginning of recorded information.

As a practical matter, with tape travel at the preferred speed of 15 inches per second, it is unlikely that such a condition will result unless the operator releases load key 304 instantly. To minimize such a possibility, however, the load key is provided with an internal source of illumination which is turned on by the arrival of the first timing pulse, thereby indicating to the operator that the load key may be released.

The foregoing is accomplished by connecting the signal appearing on lead 1912 as one input to NAND gate 1924, the other input to which is provided over lead 1918 and inverter 1925 by the timing track pulses. Thus, whenever a timing pulse appears, and load key 304 is depressed, NAND gate 1924 operates and its output goes to 0. This sets load indicator flip-flop 1930 which in turn actuates the load key illuminator 1936, and advises the operator that the load key 304 may be released.

The load operation transfers an entire body of information from the tape to each of the intermediate memory units as explained in detail below. However, a playback flip-flop 1538 is not set at this time and the actual playback operation does not begin. When flip-flop 1538 is set as explained above in connection with FIG. 15, the PLAY signal is coupled through inverter 1933 and capacitor 1934 to reset the load indicator flip-flop 1930. This extinguishes illuminator 1936, but continued illumination of the load key until that time reminds the operator that the system is ready for playback.

Tape cassette rewind and reverse operations are controlled by a set-reset rewind flip-flop 1852 and an OR* gate 1853 connected as the input to reverse solenoid drive amplifier 1804. One input to OR* 1853 is provided by the output of a NAND gate 1842 having its inputs provided by the CORRECT KEY and TAPE RUN signals. Thus, if the tape is running and the correct key is depressed NAND gate 1842 operates to provide an input to OR* gate 1853 which in turn activates the reverse solenoid driver-amplifier 1804. The purpose of this operation is described in more detail below, but briefly, for certain correction operations it is desired to permit recording over a particular data block stored in the tape. To do this, it is necessary to run the tape backward to the beginning of the data block to be recorded over. This condition is indicated by the presence of high levels of both the CORRECT KEY and TAPE RUN signals. Termination of the reverse operation occurs when timing pulse sensor single shot 1938 fails to detect timing pulses on the tape. [As will be appreciated, the last timing pulse sensed by single shot 1938 ordinarily is the last timing pulse of a data block, but for reverse operation, the last timing pulse sensed is the first timing pulse of the data block, thereby indicating that the tape has been reversed a sufficient distance.]

The other condition requiring reversal of the tape is during rewind. For this purose, the 0 output of tape rewind flip-flop 1852 (which signal is low when the flip-flop is set) is also provided as an input to OR* gate 1853. The set input for tape rewind flip-flop 1852 is provided by the output of a NAND gate 1860 over lead 1862, and by a signal on lead 1864 produced by tape rewind key 302, the two inputs being OR-tied together at the flip-flop input. Tape rewind key 302 actuates normally open contact pair 1858 to ground the flip-flop input when the key is depressed.

The reset input for the tape rewind flip-flop is provided by an OR* gate 1856 connected through an inverter 1866. OR* gate 1856 receives as its inputs the STOP MANUAL signal from mode select logic unit 602 over lead 1868, the beginning of tape sensor signal $\overline{BOT}$ over lead 1816 and the IC SET signal from sequence control logic circuit 606 over lead 1870.

Whenever rewind key 302 is depressed, flip-flop 1852 is set, and reverse solenoid drive amplifier 1804 and reverse solenoid 1808 are actuated causing the tape to be rewound. The rewind operation continues until tape rewind flip-flop 1852 is reset either by depression of stop key 306 or by completion of the rewind operation as indicated by the beginning of tape $\overline{BOT}$ signal from sensor 1812.

Tape rewind flip-flop 1852, together with previously mentioned OR* gate 1856 and inverter 1866 and NAND gates 1850 and 1860 also function as part of an automatic tape erasure circuit 1871. Tape erase circuit 1871 also includes a tape erase flip-flop 1872 having its set input provided through capacitor 1874 by tape erase key 319, and its reset input provided by an inverter 1876. Tape erase key 319 operates a normally open contact pair to ground the flip-flop set input momentarily through AC coupling capacitor 1874. The input for inverter 1876 is provided over lead 1870 by the I.C. SET signal. Also, OR-tied to the inverter output is the beginning of tape sensor signal $\overline{BOT}$ one lead 1816. The "ONE" output of tape erase flip-flop 1872 is provided as an input to NAND gates 1850 and 1860. The "ZERO" output of tape erase flip-flop 1872 provides the $\overline{\text{TAPE ERASE}}$ signal on lead 1882.

For automatic operation, the operator depresses tape erase key 319 which sets tape erase flip-flop 1872 through capacitor 1874. Since tape rewind flip-flop 1852 is reset at this time (i.e., the tape rewind operation is not in progress), the "ZERO" output of tape rewind flip-flop 1852 is 1. Thus, the 1 level of the TAPE ERASE signal on lead 1880 activates NAND gate 1850 and provides a 0 on lead 1848 to operate OR* gate 1846. This in turn actuates forward solenoid driver amplifier 1802 and solenoid 1806 to operate the tape in forward direction.

At the same time, with the $\overline{\text{TAPE ERASE}}$ signal on lead 1882 at 0, there is provided a 0 level on lead 1604 (see FIG. 16) to operate OR* gate 1602. This, in turn, actuates the driver circuits 1504 and 1506, and 1610 and 1612 in data and timing track record circuits 624 and 626. Further, since tape run flip-flop 1966 is reset, the TAPE RUN signal on leads 1510 and 1615 are low and thus data and timing record control flip-flops 1502 and 1608 are both reset. Drivers 1506 and 1612 are therefore operative to record the fixed "reset" magnetization state on the tape.

Tape operation continues as described above until the entire tape has been exhausted, at which time end of tape sensor 1810 provides a 0 value for the $\overline{EOT}$ on lead 1814. This is provided as an input to NAND gate 1860, through inverter 1818 which is conditioned by the 1 level of the TAPE ERASE signal on lead 1880, and therefore operates to provide a 0 signal on lead 1862. This, in turn, is provided to set tape rewind flip-flop 1852, activating reverse solenoid driver amplifier 1804 and solenoid 1808 to rewind the tape.

At the same time, the 0 level of the signal at the other output of tape rewind flip-flop 1852 inhibits NAND gate 1850, turning off forward solenoid driver amplifier 1802 and deactivating solenoid 1806. This prevents operation of the forward and reverse tape drivers simultaneously. Since tape erase flip-flop 1872 remains set, the TAPE ERASE signal on lead 1880 remains 1 and the operation of data and timing track record circuits 624 and 626 continues as described above. Therefore, as the tape rewinds, its entire length is erased.

When the beginning of the tape is reached, beginning of tape sensor 1812 provides a 0 output for the $\overline{BOT}$ signal on lead 1816. This is coupled through OR* gate 1856 and inverter 1866 to reset tape rewind flip-flop 1852, and directly to the reset input of tape erase flip-flop 1872. Thus, the tape comes to reset completely rewound with tape rewind flip-flop 1852 and tape erase flip-flop 1872 bot reset.

Intermediate Memory and Its Control

Figures 21, 23:
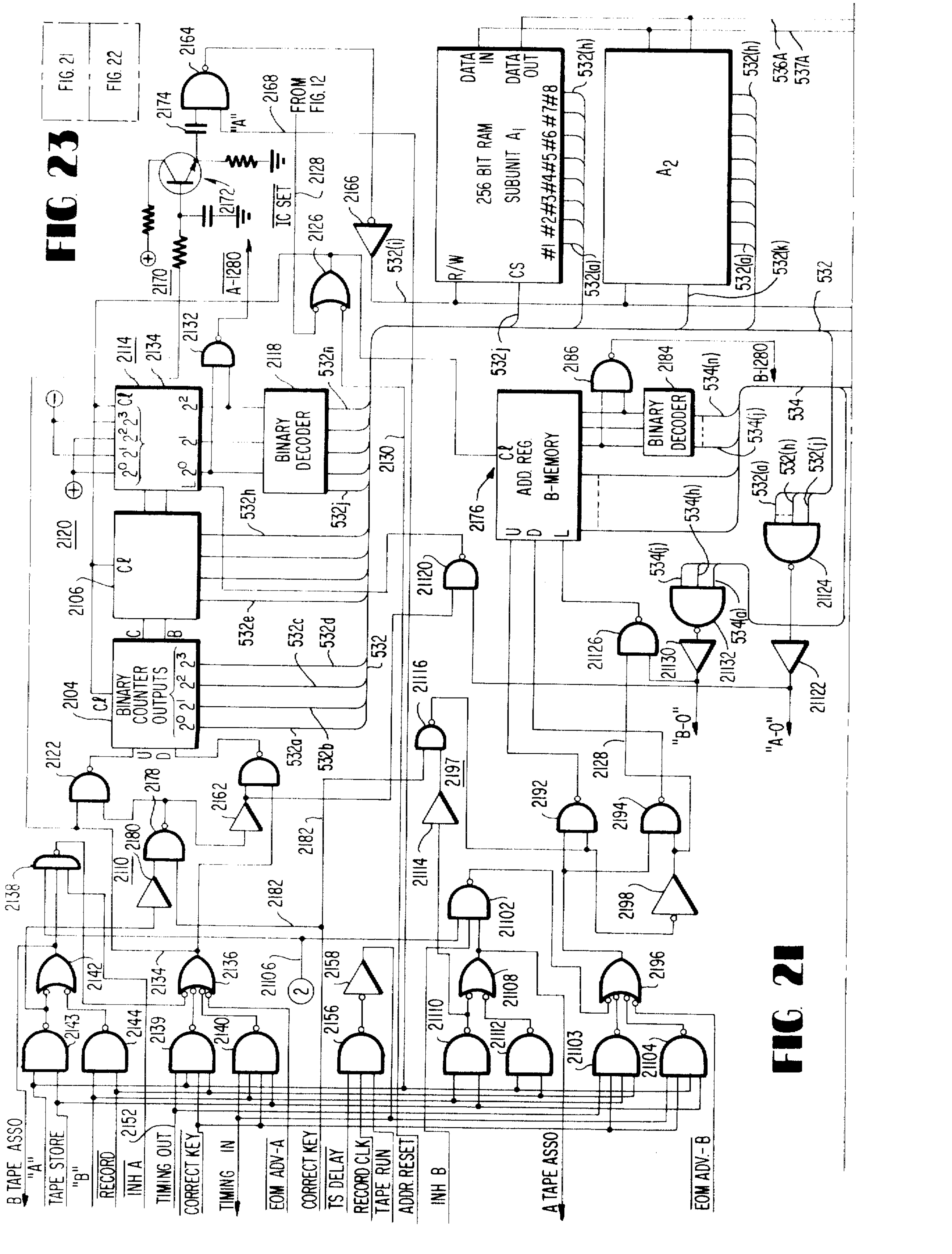
FIGS. 21 and 22, arranged as shown in FIG. 23, illustrate the construction of the intermediate memory and associated control logic.
Figure 22:
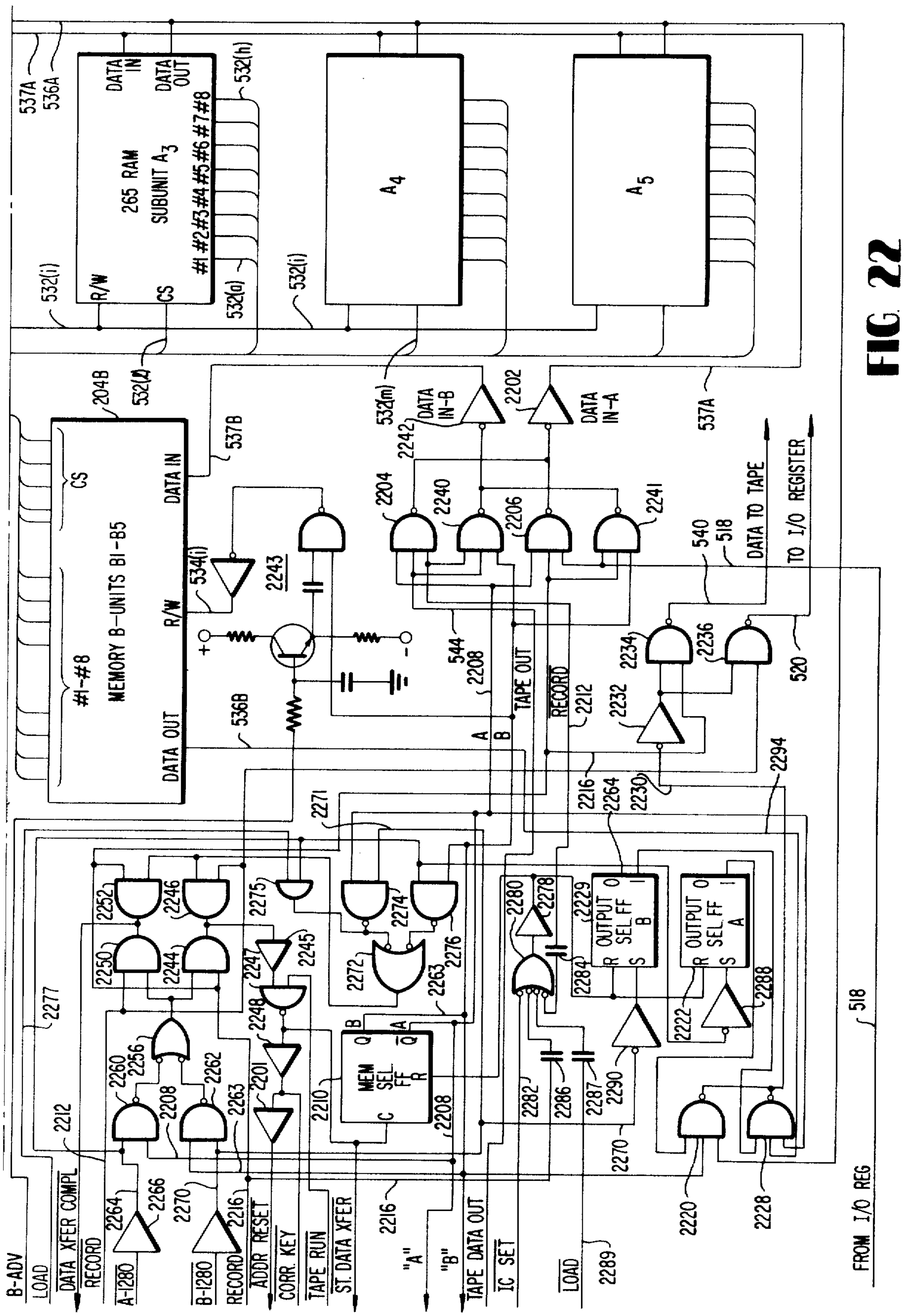

FIGS. 21 and 22 arranged as shown in FIG. 23 illustrate the details of construction of the intermediate memory units 204A and B, and the memory selection and control logic unit 530.

As previously noted, the storage capacity of each of intermediate memory units 204 is chosen in relation to the data input and tape transfer rates to assure that the alternate filling and emptying of the memory units does not occasion any data handling delays for any format or data rate with which the system is to be compatible. Also, as will be appreciated the bit capacity must be a multiple of the number of bits per character to be stored to avoid splitting, and thus destroying, a character during memory unit changeover. Further, for convenient operation, the storage capacity should at least equal the maximum number of characters per line in the various available formats. For example, the Design Elements 101 unit has a line length of 130 characters or, for the 8 bit code, 1040 bits.

This required capacity can be provided in various ways, but in the preferred embodiment, there is employed a pair of integrated circuit random access momory (RAM) units, each comprised on a plurality of commercially available RAM sub-units. In a preferred embodiment, the specific circuit components employed are five Model 1101 256 bit memory units manufactured by Intel Corporation, Mountain View, California, providing a total bit capacity of 1280 bits. It should be understood, however, that other equivalent RAM sub-units or other intermediate memory construction may be employed as will be apparent to one skilled in the art in light of the description herein.

The five subunits comprising memory unit 204A are individually illustrated, and designated A1 through A5. For convenience, memory unit 204B, which is identical in construction to unit 204A, is shown as a single block, appropriately designated.

With specific reference to RAM sub-unit A1 (FIG. 21) access for information storage and retrieval is controlled by an 8-bit binary coded address selection input, the bits of which are provided at input terminals labelled No. 1 through No. 8. The input signals are provided by means of eight separate wires, individually designated **532*a*–532*h*, illustrated as part of a multiple wire cable 532. The binary code pattern appearing on leads 532*a–h* is generated by a pair of four-bit up-down binary counters 2104 and 2106. The latter are preferably integrated circuit devices of conventional design, for example, Texas Instruments, Model SN 74193, or the equivalent. Counters 2104 and 2106 are described more fully below, but for the moment, it should be noted that the two units are connected in series to form an eight-bit counter with the outputs (labelled $2^0$, $2^1$, $2^2$ and $2^3$) defining a eight-bit binary code. Leads 532*a–h* are connected to the counter outputs with leads 532*a–d* connected to the $2^0 - 2^3$ outputs respectively of counter 2104, and leads 532*e–h* connected to the $2^0$–$2^3$ outputs respectively of counter 2106**.

Information is either written into or read out of a selected memory site depending on the binary value of a read/write actuating signal provided to the RAM subunit. The signal is coupled to the R/W input of subunit A1 over lead **532*i* by circuitry hereinafter described. If the R/W input is 1 the RAM subunit is actuated to "write," i.e. to store data. A 0 input conditions the RAM subunit to "read," i.e. for data retrieval. Data to be stored in RAM subunit A1 is provided at a "DATA IN" input over lead 537A while data retrieved from the RAM subunit in the read mode is provided at a "DATA OUT" terminal over lead 536A**.

The remaining four RAM subunits A2 (FIG. 21) and A3–A5 (FIG. 22) are identical to RAM subunit A1 and the above mentioned inputs and outputs are provided in common with the respective inputs and outputs of subunit A1. Specifically, the R/W inputs are all provided in common over lead **532*i*, the data inputs are all provided over lead 537A, and the data outputs are provided in common over lead 536A**.

Memory site access is controlled by the binary signal pattern appearing on individual leads **532*a–h* in cable 532, connected respectively to the No. 1 through No. 8 inputs of all of RAM sub-units A1-A5. Consequently, a particular binary code pattern appearing on leads 532*a–h*** is simultaneously directed to one of the memory sites in each of the RAM subunits. To prevent simultaneous read or write in all five memory sites, each of the RAM sunbuits includes a subunit selection input "CS" which actuates the input and output circuitry of that subunit when the CS signal is low. In effect this gates information into or out of only the selected subunit.

Considering all five subunits together, three additional bits are required for unique memory site selection, whereby an 11-bit counter rather than the 8-bit counter provided by counter stages 2104 and 2106 is needed. Because each RAM subunit must be selected individually rather than by a multibit code as in the case of the individual memory sites, the three additional bits are converted from a binary code to five level code, each level being used to select one of the RAM subunits.

The three binary selection bits are provided by a third up-down binary counter unit 2114, preferably identical to counter units 2104 and 2106. The $2^0$, $2^1$, and $2^2$ outputs of counter unit 2114 are connected by leads **2115*a–c* to the inputs of a binary decoder circuit 2118. Decoder circuit 2118 is a logic circuit of any suitable construction which converts the three-bit binary input to a one-of-five output on leads 532*j–n* (shown as part of cable 532), and is illustrated as a single block for simplicity. Since a low level selects a particular RAM subunit, decoder 2118** is constructed to provide four out of the five outputs high and one output, corresponding to the selected subunit, low.

Counter units 2104, 2106, and 2114 together constitute an 11-bit memory site address selection register 2120 as mentioned above. By way of example, a register output of 00000000000 ll selects the first memory site of RAM subunit A1, a register output of 00000000100 selects the first memory site of RAM subunit A2 and a register output of 10000000110 selects the second memory site of RAM subunit A4.

Control for counter units 2104, 2106 and 2115 is provided by a "count up" input "U", a "count down" input "D" and a reset or clear input "C1."

Each counter advances at a low to high transition of the "U" input with the "D" input maintained high. Down counting is produced by a low to high transition of the "D" input with the "U" input held high. The C1 input is normally held low; a high level forces all of the $2^0$ - $2^3$ outputs to a "0" or low level.

Each unit also provides a "carry" output "C" and a "borrow" output "B." The carry output goes to 0 with the next high to low transition of the "U" input if the output count is binary 1111 (decimal 15) and returns to "1") in response to the succeeding low to high transition, i.e. when the "U" input returns to 1. Correspondingly, the borrow output goes to 0 with the next high to low transition of the "D" input if the output count is 0000, and returns to 1 when the D input returns to 1.

The "U" and "D" inputs for counter unit 2104 are provided by the outputs of respective NAND gates 2122 and 2124 described below. The "U" and "D" inputs for counter units 2106 and 2114 are provided by the respective "C" and "B" outputs of unit 2104 and 2106. Thus, successive count pulses from NAND gate 2122 cause binary register 2120 to store a succession of counts up to a maximum of 2048 ($2^{11}$), the count state being represented by the eleven combined outputs of the register units as indicated above. The count pulses from NAND gate 2124 are employed to count back register 2120 during error correction as hereinafter explained.

The "C1" input for each of the counter units is provided by the output of an OR* gate 2126, the inputs to which is provided over lead 2128 by the $\overline{\text{I.C. SET}}$ signal previously described, and over lead 2130 by the $\overline{\text{ADDRESS RESET}}$ signal produced by the output of an inverter 2201 hereinafter described. This signal is low and thus actuates OR* gate 2126 when transfer of data to the tape is to commence. Reset of register 2120 causes the count to return to 00000000000, corresponding to selection of the first memory site of RAM subunit A1.

As previously mentioned, the data inputs for each of the RAM subunits are provided in common over lead 537A. This, in turn, is connected through an inverter 2202 to the outputs of a pair of OR-tied NAND gates 2204 and 2206. NAND gate 2204 receives as its inputs, the "A" memory selection signal over lead 2208 from the $\overline{\text{Q}}$ output of a J-K memory selection flip-flop 2210 hereinafter described, the $\overline{\text{RECORD}}$ signal over lead 2112 from mode select logic unit 602 and the TAPE DATA OUT signal over lead 544 from data track playback circuit 620. (See FIG. 5.) Thus, when the system is in playback, and memory unit 204A is selected, data from the tape is available for storage in the A memory.

The inputs to NAND gate 2206 are the "A" signal previously mentioned, the RECORD signal over lead 2216 from mode select logic unit 602 and the serial output of I/O register unit 1402 over lead 518. Thus, in record operation, data from the input register is made available for storage when the A memory is selected.

The common output from all RAM subunits A1–A5 provided over lead 536A is connected to the input of a NAND gate 2220 which receives as additional inputs, the 1 output of a set-reset output selection flip-flop 2222 over lead 2224, and the B memory selection signal from the Q output of selection flip-flop 2210, over lead 2226. Thus, when the B memory is selected for storage, the A memory is selected for read-out.

The output of NAND gate 2220 is or-tied to the output of another NAND gate 2228 which receives as inputs, the "A" selection signal, a signal from the 1 output of a second selection flip-flop 2229, and the DATA OUT signal from the "B" memory. NAND gate 2228 operates analogously to NAND gate 2220 to provide data readout from the "B" memory while the "A" memory is being filled.

The junction between NAND gates 2220 and 2228 is coupled over lead 2230 to an inverter 2232, and then to the inputs of a pair of NAND gates 2234 and 2236. The second input to NAND gate 2234 is provided over lead 2216 by the RECORD signal while the second input to NAND gate 2236 is provided over lead 2212 by the $\overline{\text{RECORD}}$ signal. When actuated, NAND gates 2234 provides the DATE TO TAPE signal on lead 540 for processing by data track record circuit 264. Correspondingly, when actuated, NAND gate 2236 provides the input for I/O register unit 1402. This signal is provided over lead 520.

As previously mentioned, the "count up" input for A memory address register 2120 is provided by the output of a NAND gate 2122. This, in turn, receives as its inputs, the output of an error correction logic circuit 2110 described below, and also the A-ADVANCE signal over lead 2134 from an OR* gate 2136. Correction logic circuit 2110 is arranged to provide a low input to NAND gate 2122, and thus to inhibit its operation when an error correction is in progress. This makes the "U" input of counter unit 2104 high and prevents up-counting of the A-memory address register.

OR* gate 2136 receives as inputs, the outputs of three NAND gates 2138, 2139, and 2140, and the EOM ADV-A signal from character identification and search logic unit 560. The inputs for NAND gate 2138 are the No. 2 output of sequence control logic unit 606, the INH-A signal from sequence control logic unit 606, and the output of an OR* gate 2142. This, in turn, is coupled to the outputs of a pair of NAND gates 2143 and 2144. NAND gate 2143 receives as its inputs, the "A" signal from memory selection flip-flop 2210, and the TAPE STORE signal from mode select logic unit 602. NAND gate 2144 receives as its inputs, the "B" signal from memory selection of flip-flop 2210, and the RECORD signal from mode select logic unit 602.

Considering the function of OR* gate 2142, it may be seen that the output is high either if memory selection flip-flop 2210 is in the A state for record operation, or in the B state for playback operation. If flip-flop 2210 is in the A state, that indicates the A memory unit is in condition to receive data. Thus, if the system is operating in record, flip-flop 2210 in the A state indicates that the A memory unit is receiving data from the input/output register. Correspondingly, with the system in playback, and flip-flop 2210 in the B state, it indicates that the B memory unit is receiving data from the tape. In both cases, the A memory unit is associated with the I/O register, and the B memory unit is associated with the tape. Identification of this condition is required by the inhibit control circuitry described above in connection with FIG. 11. An appropriate signal is provided at the output of OR* gate 2142 and is denoted as the B-TAPE ASSO signal.

A high value of the B TAPE ASSO signal conditions NAND gate 2138. This activates OR* gate 2136 to advance address register 2120 by groups of eight counts — each group corresponding to the transfer of a single character. This function is required for transfer of data between the A memory and the input/output register, and for error correction, as described below.

NAND gate 2139 receives as its inputs, the "A" and RECORD signals, and a CORRECT KEY signal from the error correction control circuit in mode select logic unit 602 previously described. Also, NAND gate 2139 receives as an input, the timing track output signal over lead 2152 from timing track playback circuit 548. As previously explained, the timing track signals are series of pulses synchronized with the data pulses and thus serve to advance the A memory address register to permit entry of data into the A memory unit from the tape.

NAND gate 2140 receives as its inputs, the "B," TAPE STORE, and CORRECT KEY signals, and the output of a NAND gate 2156 coupled through an inverter 2158. The inputs for NAND gate 2156 are provided by RECORD CLK signal over lead 2150 from frequency selection and division logic unit 610, and by the TAPE RUN and TAPE START DELAY signals from tape control logic unit 604. As will be recalled, the RECORD CLK signal is a sequence of pulses at 9600 or 1200 Hertz, depending on the tape speed. Thus, when the tape is running, and the tape start delay is concluded, a high frequency pulse train is provided to NAND gate 2140. [This signal, denoted "TIMING IN," is provided to the timing track record circuits, and is ultimately played back as the timing track output to operate the NAND gate 2139 described above.] When the system is recording and when the B memory unit is selected for storage (i.e., from an external input source) NAND gate 2140 and OR* gate 2136 advance the memory unit address register 2120 to permit transfer of data from the A memory to the tape.

Generation of the EOM ADV-A signal will be described below, but for now, it is noted that this signal serves to advance the A memory unit to the last memory site if the EOM character has just been played out of or is about to be recorded into that unit. This is a formatting function and assures that no data (e.g. the EOM character itself during record operation) is lost as a result of the data transfer operations caused by EOM detection.

The A-ADVANCE signal output of OR* gate 2136 is also provided as an input to NAND gate 2124 which drives the "count-down" input of address register 2120. The second input to NAND gate 2124 is provided through an inverter 2162 by previously mentioned correction logic circuit 2110. The latter is comprised of a NAND gate 2178, the output of which is also coupled to NAND gate 2122. The inputs for NAND gate 2122 are provided by an inverter 2180, coupled to the output of NAND gate 2143, and by the CORRECT KEY signal over lead 2182. As previously explained, the CORRECT KEY signal is high when an error correction operation is in progress. In that event, if the system is recording in the A memory unit, NAND gate 2178 operates to produce a low output. This in turn inhibits NAND gate 2122, and by means of inverter 2162 conditions NAND gate 2124 for operation in response to the A-ADVANCE signal. As will be recalled, a correction operation is initiated by pressing correction key 310 which causes the cycle flip-flop 1160 and sequence counter 1202 to execute an 88 count cycle, thereby producing the No. 2 output of the sequence control logic unit. This becomes the A-ADVANCE signal and consequently, the count in address 2120 is reduced by eight counts whereby the last character recorded is deleted when a new character is entered.

One additional feature of counter units 2104, 2106, and 2114 not previously mentioned is a load control input designated L and four "count set" inputs corresponding to $2^0$ through $2^3$ outputs. Operation is such that when the load control input goes low, the count of the counter unit is preset to that appearing at the inputs, with the count stabilizing at the low to high transition of the load control input.

The above-described feature of counter 2114 is utilized to permit correction of data previously stored in the B memory unit even though data is then being entered in the A memory unit. The manner in which this operation is accomplished is described in detail hereinafter, but structurally, there is provided to the $2^0$ and $2^2$ count load inputs of counter unit 2114 a direct connection to the positive power supply, while the $2^1$ and $2^3$ inputs are connected to the negative power supply. The load control input is coupled to the output of a NAND gate 21120. This receives as one input, the output of inverter 2162, previously described, indicating that an error correction operation is to take place. A second input is provided by the output of an inverter 21122 coupled to the output of a further NAND gate 21124. The latter is connected by means of multiple wire cable 532 to leads **532*a–h* and lead 532*j*. Recalling the construction of address register 2120, and the significance of the various outputs appearing on leads 532, it will be understood that the presence of high levels at each of the inputs of NAND gate 21124 indicates that register 21120 has been set to select the first memory site in RAM sub-unit A1, i.e., the address register has been reset. Thus, the second input to NAND gate 21120 provided through inverter 21122** indicates that the A memory address register is prepared to control data storage in the first eight memory sites of the A memory unit. Under these circumstances, it will be appreciated that there is no data in the A memory unit to correct and correctable data can only be in the B memory unit.

To accomplish transfer to the B memory unit, counter sub-unit 2114 is activated by the load control input and is preset to the count of 1280. As explained below, this causes the memory selection flip-flop 2210 to switch, thereby conditioning the B memory unit for error correction.

The remaining aspect of the A memory unit not yet described is selection of the read or write functions, i.e., determination of whether data is to be stored in or retrieved from the A memory unit. As previously mentioned the read-write operation for the "A" memory sub-units A1-A5 is controlled by the output of a NAND gate 2164 coupled through an inverter 2166 to lead **532*i*. The inputs for NAND gate 2164 are provided by the "A" signal over lead 2168 and by a pulse delay circuit 2170. The latter comprises an emitter-follower transistor circuit 2172, having its input RC coupled to the A-ADVANCE signal on lead 2134 and its output AC coupled by capacitor 2174 to the input of NAND gate 2164.**

The A-ADVANCE pulse signals provided over lead 2134 are slightly delayed by the R.C. input coupling circuit and the emitter-follower transistor 2172 and then differentiated by capacitor 2174 to produce a series of narrow pulses slightly delayed from the leading edge, but prior to the trailing edge of each of the A-ADVANCE pulses. Thus, if the A memory is selected for data storage as indicated by a high level on lead 2168, the sequence of pulses produced by delay circuit 2170 actuates NAND gate 2164 and inverter 2166 to provide a sequence of positive pulses on lead 2108. These pulses actually control storage of each bit by briefly actuating the memory subunits A1-A5 in the write mode. However, since the write pulses precede the positive to negative transitions of the individual A-ADVANCE pulses (i.e., the trailing edge of the pulses) the write operation for a particular bit is completed before the trailing edge of the advance pulse through NAND gate 2122 advances the A memory address register 2120. This assures unambiguous data storage of a particular bit in only one memory site.

As mentioned above B memory unit 204B is identical to the A memory unit 204A and includes five like memory subunits, each providing data storage capacitiy for 256 bits. Each of the B memory subunits has 8 binary address selection inputs, a chip select input, a read-write input, and a data input as well as a data output. Since the construction of the B memory unit is identical to that of the A memory, the entire memory unit is illustrated by a single block in FIG. 22 with appropriate inputs and outputs labeled.

Memory site selection for the B memory unit is provided by a B memory address register 2176 comprising three up-down counters identical to counter subunits 2104, 2106, and 2114 in A memory address register 2120. For convenience, register 2176 is shown as a single block, but it should be understood that the $2^0 - 2^3$ outputs of the first two stages are coupled directly to the No. 1 through No. 8 inputs of all of memory subunits B1-B5 over leads **534*a–h* as in the case of memory subunits A1–A5. Similarly. the $2^0 - 2^3$ outputs of the third counter subunit are coupled through a binary decoder unit 2184 like binary decoder 2118 which in turn produces five outputs individually coupled to the chip select inputs CS of respective ones of the B memory subunits over leads 534*j–n*.**

Reset for registerion 2176 is provided by the output of OR* gate 2126 in the same manner as for register 2120. The up and down count inputs for B memory address register 2176 are provided respectively by a pair of NAND gates 2192 and 2194. NAND gate 2192 receives as its inputs, the B-ADVANCE signal from OR* gate 2196, and the output of an error correction logic circuit 2197 like circuit 2110, while NAND gate 2194 receives as its inputs, the B-ADVANCE signal, and the output of error correction logic circuit 2197 through an inverter 2198. The B-ADVANCE signal is therefore steered to the count up or count down input of register 2176 by NAND gates 2192 and 2194, respectively, in the former instance if error correction is not in progress, and in the latter instance if error correction (i.e., back spacing) of the B memory is taking place.

The B-ADVANCE signal is generated by the three inputs to OR* gate 2196 provided by NAND gates 21102, 21103, and 21104, and by the EOM ADV-B signal from character identification and search logic unit 560 as hereafter described. NAND gate 21102 receives as its inputs, the No. 2 output of sequence control logic unit 606 over lead 21106, the $\overline{\text{INH-B}}$ signal from sequence control logic unit 606, and the output of an OR* gate 21108, the latter in turn receiving as its inputs, the outputs of NAND gates 21110 and 21112. The inputs to NAND gate 21110 are provided by the B memory selection signal, and the TAPE STORE signal, while the inputs to NAND gate 21112 are provided by the "A" memory select signal, and the $\overline{\text{RECORD}}$ signal.

Considering the output of OR* gate 21108, it will be appreciated that this signal is high when the A memory unit is associated with the tape. In other words, during record operation if memory selection flip-flop 2210 is in the B state, memory unit 204B is conditioned to receive data from the I/O register. Correspondingly, with the system in playback, if memory selection flip-flop 2210 is in the A state, the the A memory unit is conditioned to receive data from the tape. The output of OR* gate 21108, in addition to conditioning NAND gate 21102, therefore, provides the A TAPE ASSO signal for use by the memory inhibit logic described above in connection with FIG. 11.

Thus, when the A TAPE ASSO signal is high, NAND gate 21102 is conditioned to pass the No. 2 output of the sequence control logic unit. This activates B memory address register 2176 by groups of eight counts — each group corresponding to the transfer of a single character. As explained above in connection with the A memory unit, this function is required for transfer of data between the B memory and the input/output register (in both directions), and for error correction.

The output of NAND gate 21110 provides one input to correction logic circuit 2197 through an inverter 21114 coupled to a NAND gate 21116. The other input is provided over lead 2182 by the CORRECT KEY signal. Logic circuit 2197 operates like logic circuit 2110 to achieve back space of the B memory unit by eight memory sites to delete a single character.

Transfer to the A memory unit for the purpose of error correction when no data is present in the B memory unit is achieved by the NAND gate 21126 coupled to the load control input of the third counter subunit in B memory address register 2176. Similarly, for this purpose, there is provided connections from the positive power supply to the $2^0$ and $2^2$ count set inputs of the third counter unit. [For convenience, the required connections to the B memory address register block 2176 are not illustrated, bu it will be understood that these connections are made in the same manner indicated for counter subunit 2114 in A memory address register 2120].

Nand gate 21126 receives as its inputs, the output of an inverter 2198 over lead 21128 from error correction logic unit 2197 previously described, indicating that an error correction operation is to take place. The second input to NAND gate 21126 is provided by an inverter 21130 connected to the output of a further NAND gate 21132. The inputs for NAND gate 21132 are provided by leads **534*a*–534*h* and 534*j* in multi-wire cable 534. As will be recalled, these signals correspond to the outputs of the first two counter units in B memory address register 2196, plus the first output of binary decoder unit 2184. Thus, high signal levels on each of these leads indicates that the B memory address register has been reset, i.e., is in its ZERO count state. Under these conditions, if an error correction operation is called for, B memory address register 2176 is preset to a count corresponding to decimal 1280 and memory selection flip-flop 2210** is triggered to make the A memory accessible for error correction.

As in the case of the A memory, input data for the B memory is provided through a gating circuit which selects data from the tape or from the input-output register, depending on the system mode of operation. For this purpose, there is provided a pair of NAND gates 2240 and 2241, the outputs of which are OR-tied together and coupled through an inverter 2242 to the "data in" input of memory unit 204B. Inputs for NAND gate 2240 are provided in common to the "B" signal from memory selection flip-flop 2210, by the tape data output signal from data track playback circuit 542 over lead 544 and by the RECORD signal over lead 2212 from mode select logic unit 602. Correspondingly, the inputs for NAND gate 2241 are provided by the "B" signal, by the RECORD signal over lead 2216 from mode select logic unit 602, and by the data output of input output/register 504 over lead 518.

Data is thus provided through NAND gate 2240 from the tape when the system is playing back, and through NAND gate 2241 from the input/output register when the system is recording.

Control of the read-write function for memory unit 204B is provided by a control circuit 2243 identical to control circuit 2170 described above except that it is actuated by the B-ADVANCE and "B" signals, rather than the A-ADVANCE and "A" signals as in the case of circuit 2170. Data storage in the B memory is thus permitted only when the "B" selection signal is present.

The remaining function of the circuitry illustrated in FIGS. 21 and 22 is selection of which of memory units A and B is to receive data, either from the tape or from an external source through the input-output register. For this purpose, there is provided a memory selection flip-flop 2210 previously referred to which is a standard J-K flip-flop wired to provide alternating state transfer (toggling) in response to inputs at the clock or C input. The latter input is provided by a NAND-OR* logic circuit now to be described.

Specifically, a first pair of NAND gates 2244 and 2246 are connected with their output OR-tied together to an inverter 2245. This is connected as one input to a NAND gate 2247, which receives as its other input, the TAPE RUN signal from tape control logic unit 604. The output of NAND gate 2247 is provided as the clock input of memory selection flip-flop 2210, and to an inverter 2248. The output of NAND gate 2247 also constitutes the START DATA TRANSFER signal, while the output of inverter 2248, coupled through inverter 2201 provides the ADDRESS RESET signal, both previously discussed. The CORRECT KEY signal from mode select logic unit 602 is OR-tied to the input of inverter 2201. This signal is low, and thus forces the ADDRESS RESET signal to be high during error correction, thereby preventing reset of address registers 2120 and 2176 when error correction is in progress.

At other times, the CORRECT KEY signal is high and the input to inverter 2248 determines the value of the ADDRESS RESET signal. A second pair of NAND gates 2250 and 2252 are connected with their outputs OR-tied together to provide the DATA TRANSFER COMPLETE signal for resetting tape run flip-flop 1966 as previously noted.

NAND gate 2244 receives as its inputs, the output of an OR* gate 2256 and the RECORD signal over lead 2216. OR* gate 2256 in turn, receives as its inputs, the outputs of two NAND gates 2260 and 2262. NAND gate 2260 receives as its inputs, the A-1280 signal over lead 2264 provided by the output of an inverter 2266, and the "A" signal from memory selection flip-flop 2210 coupled over lead 2208. The A-1280 signal provided to the input of inverter 2266 is generated by NAND gate 2132. This has its inputs coupled to the $2^0$ and $2^2$ outputs of counter unit 2114 in A memory address register. As will be understood when the $2^0$ and $2^2$ outputs of counter 2114 reach 1, this represents a count of decimal 1280 — corresponding to the capacity of the memory unit. Another NAND gate 2186 coupled to B memory address register 2176 provides a B-1280 signal indicating that the B memory unit has reached its capacity.

From the above, it may be seen that NAND gate 2260 operates if the A memory is selected to receive data and the A memory address register 2120 has completed a cycle — i.e., if the A memory is full.

NAND gate 2262 receives as its inputs, the "B" signal from memory selection flip-flop 2210 over lead 2263 and the B-1280 signal generated by NAND gate 2186 and coupled through inverter 2268 over lead 2270. The output of NAND gate 2262 therefore operates if the B memory is selected for data storage, and if the B memory address register 2176 completes a 1280 count cycle — i.e., if the B memory is full. In either case, if the system is recording, NAND gate 2244 provides an output which switches memory selection flip-flop 2210 to select the other one of the memory units for data storage.

Conversely, if the system is operating in playback, and a data storage cycle for one of the memory units is completed as indicated by an output from OR* gate 2256, NAND gate 2250 is actuated to provide the DATA TRANSFER COMPLETED signal on lead 2254.

Memory selection flip-flop 2110 is also triggered when the system is operating in playback by NAND gate 2246, which receives as its inputs, the RECORD signal over lead 2212 and the output of an OR* gate 2272. The output of OR* gate 2272 is also provided as one input to NAND gate 2252, the latter receiving as a second input, the RECORD signal over lead 2269 from mode select logic unit 606.

The inputs to OR* gate 2272 are provided by three NAND gates 2274, 2275, and 2276. NAND gate 2274 receives as its inputs, the "A" selection signal from memory select flip-flop 2210 over lead 2208, and the B-1280 signal provided over lead 2270 from inverter 2268. NAND gate 2275 receives as its inputs, the A-1280 signal,and the LOAD signal over lead 2277 generated by flip-flop 1906 previously described. NAND gate 2276 receives as its inputs, the "B" select signal from memory select flip-flop 2210, and the A-1280 signal.

Thus, if the A memory is receiving data, and the B memory has completed a retrieval cycle, NAND gate 2274 operates while if the B memory is receiving data, and the A memory completes a retrieval cycle, NAND gate 2276 operates. NAND gate 2275 operates as part of the playback load cycle described below to permit data storage in both the A and B memory units as part of the load cycle. In all cases, OR gate 2272 operates, whereby, if the system is not recording (i.e., if the RECORD signal is high), NAND gate 2246 is actuated to toggle memory select flip-flop 2210. Conversely, if the system is recording OR* gate 2272 triggers NAND gate 2252 to produce the DATA TRANSFER COMPLETED signal.

Memory selection flip-flop 2210 is also provided with a reset input. This responds to a low input to force the memory selection flip-flop into the A memory state, i.e., with the Q output high. The reset signal for memory selection flip-flop 2210 is provided by the output of an inverter 2278 coupled to the output of an OR* gate 2280. The latter receives as its inputs, the I.C. SET signal over lead 2282, the RECORD signal AC coupled through capacitor 2284 from lead 2212, the RECORD signal coupled through capacitor 2286 from lead 2216 and the LOAD signal coupled through capacitor 2287 from lead 2289. Thus, whenever the system is turned on, or is switched into or out of one of the record modes, OR gate 2280 operates to reset memory selection flip-flop 2210, thereby assuring that data is first stored in the A memory at the beginning of an operating cycle.

The output of inverter 2278 is also coupled as the reset inputs to previously mentioned A and B memory output selection flip-flop 2222 and 2229. The set input for flip-flop 2222 is provided through an inverter 2288 by the A-1280 signal on lead 2264, while set input for flip-flop 2229 is provided through inverter 2290 by the B-1280 signal on lead 2270. The "1" output of flip-flop 2222 is provided as a control input to NAND gate 2220 while the "1" output of flip-flop 2229 provides a control input for NAND gate 2228.

As a result, whenever the equipment is turned on, or when the system shifts between the record and playback modes of operation, flip-flops 2222 and 2229 are reset, thereby inhibiting both NAND gates 2220 and 2228 to prevent passage of any output data provided by either memory unit A over lead 536A or memory unit B over lead 536B.

On the other hand when A memory address register completes an operating cycle, data is present in the A memory, and retrieval of this data may commence. This is accomplished by setting flip-flop 2228 by means of the A-1280 signal. Data output from the B memory is similarly initiated by setting flip-flop 2229 by the B-1280 signal. Both flip-flops then remain set until another transition between record and playback operation, or until the system is turned off and restarted.

Character Identification and Search Logic

Figure 24:
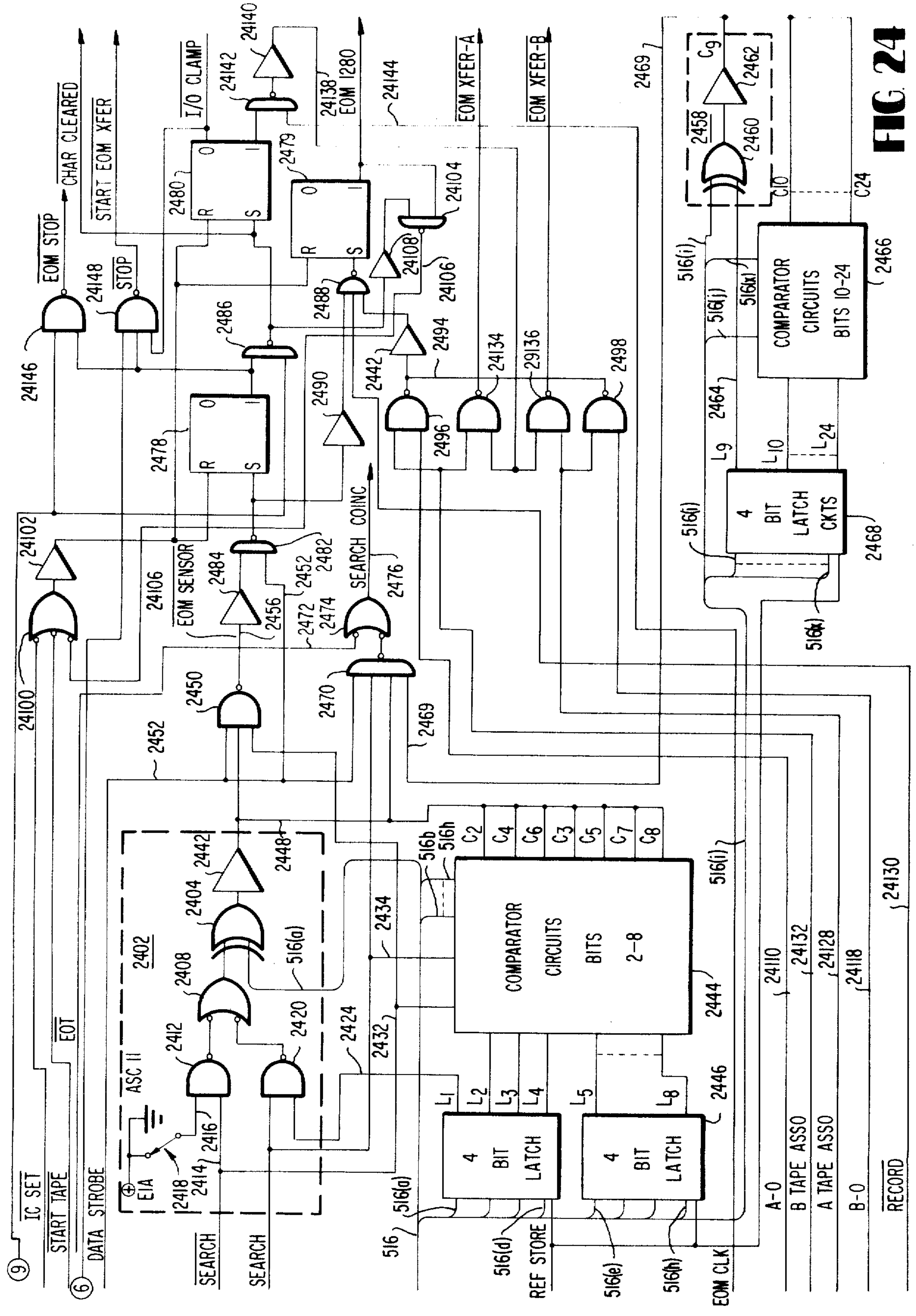
FIG. 24 illustrates the details of the character identification and search logic.

FIG. 24 illustrates character identification and search logic unit 560. The purpose of this portion of the system is to detect either the presence of the "END OF MESSAGE" code word in the first 8 bit positions of input/output register 504, and also to detect a 3-character sequence in the shift register representing a message address or identifier code by which a particular recorded message can be recognized and located.

Various approaches to character identification are possible but in one preferred embodiment, this is accomplished by comparing information in the input/output register on a bit-by-bit basis with pre-established reference information. Coincidence of all bits indicates that the character or characters in question have been identified. For identification of the "End of Message" character, a pre-stored reference code is employed, while for search operation, the reference identifier code is established by typing the desired three-character code on printer 102. The resulting information is then transferred through the input/output register to a temporary memory circuit. The actual data to be compared )either from one of the intermediate memories or from an external source) is also provided through the input/output register, either in the normal course of system operation for the character recognition function, (i.e. "End of Message") or by a special search operation sequence described below.

For the search operation, data from the tape is transferred in the normal manner to the two memory units, and is then rapidly transferred through the input/output register. When the special reference characters are sensed by comparison of the input/output register contents with the reference, the system comes to rest awaiting further instruction. Also, if the search operation proceeds unsuccessfully through the entire tape, the search stops, and an appropriate visual indication of this is provided.

For the "END OF MESSAGE" ("EOM") identification function, in one embodiment, advantage is taken of the fact that the character identification operation does not take place, i.e. is not needed, during the search operation and vice versa. Thus common comparison circuitry may be employed for the "EOM" recognition function and for the recognition functions associated with the first character for the three-character search.

The circuitry for accomplishing these functions is comprised of a first bit comparator 2402 including an EXCLUSIVE OR circuit 2404 having a first input connected to one lead 516*a* of 24 wire cable 516. The 24 individual wires [516*a*–516*x*] are connected respectively to the 24 bit position outputs of shift register 504, wire 516*a* being connected to the first bit position. This provides the bit No. 1 input for comparison with the reference value for the first bit. The reference input to EXCLUSIVE OR circuit 2404 is provided by an OR* gate 2408 over lead 2410. A first input to OR* gate 2408, representing the reference value of the first bit of the "EOM" character identification code, is provided by the output of a NAND gate 2412. This receives as one input the $\overline{\text{SEARCH}}$ signal from search control flip-flop 1546 described above. This signal is 1 when the system is not operating in the search mode, whereby NAND gate 2412 provides the reference value for the first bit only when a three-character search is not in progress.

The second input to NAND gate 2412 constitutes the value of the first bit reference information. This is provided over lead 2416 by a moving contact of a two-position switch 2418. The position of switch 2418 is determined by whether the system is operating in the EIA or ASCII format, and the stationary contacts are labelled "EIA" and "ASCII" accordingly. For convenient operation, the moving contact of switch 2418 may be mechanically coupled to the baud rate selection switch 1516 (see FIG. 15), to rest in the EIA position for 132 baud operation, and in the ASCII position for all other data rates. However, a separate switch or electronic gating appropriately responsive to the signals generated by baud rate selection logic 1590 may also be employed.

The EIA and ASCII contacts of switch 2418 are adapted to be connected either to the positive power supply or to ground, the particular connection being determined by whether the first bit of the "EOM" code is a 1 or 0 in the respective EIA or ASCII formats. Reference to Table One above shows that the first bit of the "EOM" code words is 1 for EIA. For ASCII, the first bit is 0. Thus, the EIA and ASCII contacts are respectively connected to the power supply and to ground.

The reference input for operation in the search mode is provided by a second input to OR* gate 2408 from a further NAND gate 2420. The latter receives as a control input, the SEARCH signal over lead 2422 from search control flip-flop 1546 from mode select logic unit 602. As explained below, this signal is high only when the search is actually in progress, i.e., after search key 312 has been released, whereby NAND gate 2420 provides the reference value for the first bit only during the search.

The second input for NAND gate 2420, representing the first bit of the three character search code, is provided over lead 2424 by a first output $L_1$ of a four bit latch circuit 2426. Latch circuit 2426 is preferably a commercially available integrated circuit device such as four bit latch circuit type SN 7475, manufactured by Texas Instruments, Inc., or the equivalent. The latch circuit has a clock input "C," four data inputs, and four corresponding data outputs. The data inputs are provided respectively by leads 516*a*–516*d* in cable 516 previously described. The outputs designated $L_1$–$L_4$ are associated with the data provided over leads 516*a*–516*d*, respectively.

The clock input for latch circuit 2426 is provided by a DATA STORE signal on lead 2428, generated by inverter 15108 described previously in connection with FIG. 15. As will be recalled, this signal is high in coincidence with the DATA STROBE signal, indicating that a complete character is present in the shift register. Data from the first four bit positions of the shift register are thus stored in latch circuit 2426 in coincidence with the DATA STROBE signal if search key 312 is depressed, indicating entry through the keyboard of one of the reference characters.

The output of OR* gate 2408 is compared with the actual value of the signal in the first bit position of input/output register 504 by exclusive OR circuit 2404. As previously explained in connection with FIG. 7*d*, the exclusive OR circuit produces a high output only if the two inputs are different, and a low output if the two inputs are the same. An inverter 2442, coupled to the output of exclusive OR circuit 2404 thus produces a $C_1$ signal which is high when the data in the first bit position of input/output register 504 matches the reference signal stored either in the $L_1$ position of latch circuit 2426 if the system is operating in the search mode, or in switch 2418 otherwise.

Corresponding bit coincidence signals $C_2$ through $C_8$ for the data in bit positions 2 through 8 of the input/output register are generated by seven additional comparator circuits identical to comparator circuit 2402. For ease of illustration, these are shown as a single block 2444 having control inputs provided over leads 2422 and 2414 respectively, by the SEARCH and $\overline{\text{SEARCH}}$ signals from mode select logic unit 602, and information inputs provided over leads 516*b* through *h* of 24-wire cable 516 connected to the shift register outputs for bit positions 2 through 8, respectively.

The individual comparator circuits each include a 2-position switch like switch 2418 (and mechanically coupled to it for convenient operation) to establish the character identification reference values for the "EOM" code word. These values are "1110011" for EIA, and "0100001" for ASCII (assuming even parity, and including the stop bit — a 1 — for EIA.) The reference values for the search operation are provided by the $L_2$ through $L_4$ outputs of latch circuit 2426 for bits 2 through 4, and by the $L_5$ – $L_8$ outputs of another latch circuit 2446 identical to latch circuit 2426. Latch circuit 2446 has its inputs coupled by leads 516*a* – 516*h* to the shift register outputs for bit positions 5 through 8, and its clock input coupled to the DATA STORE signal on lead 2428, generated as previously described.

The $C_2$–$C_8$ outputs of comparator subunit 2444 are OR-tied together, and to the $C_1$ output of comparator unit 2402, and by means of a lead 2448 are coupled to one input of a NAND gate 2450.

As previously explained, if the $C_1$ through $C_8$ signals are high, this indicates that the respective first through 8th bits of the data in the input/output register matches a prestored reference — either the search reference or the EOM code reference. Correspondingly, a low value for one of the $C_1$–$C_8$ signals indicates that there is a mismatch. Thus, with all of the $C_1$–$C_8$ signals tied together to lead 2448, it will be appreciated that if all of the 8 bits match the associated reference, the signal on lead 2448 will be high, but if even one bit does not match, the signal on lead 2449 will be low.

A second input to NAND gate 2450 is provided by the $\overline{\text{SEARCH}}$ signal over lead 2414, while the third input is provided over lead 2452 by the DATA STROBE signal from mode select logic unit 602. Thus, at either the 4th or 70th count of the 88 count sequence, if the system is not operating in search, NAND gate 2450 is conditioned.

Accordingly, it may be appreciated that if the system is not operating in search, and the first 8 bits match the prestored reference at the time that a complete character is present in the first 8 bit positions of the input/output register, then the EOM character has been detected. This is indicated by a coincidence of inputs to NAND gate 2450, and correspondingly, a low output from the NAND gate over lead 2456.

Correspondingly, during search operation, if the signal on lead 2448 is high, this indicates that the 8 bits present in the first 8 positions of the input/output register match the prestored search reference code. However, unless the remaining 16 bits, corresponding to the second and third characters of the 3-character search identification code match, a successful search operation has not been completed. To determine the existence of the required 3-character match, 16 additional comparator circuits are provided, one of which is shown in detail at 2458. The circuit is generally similar to comparator circuit 2402, described above, but provides bit comparison capability only for the search operation.

Comparison circuit 2458 simply comprises an EXCLUSIVE OR circuit 2460, the output of which is connected to an inverter 2462. A first input to EXCLUSIVE OR circuit 2460 is provided over lead 516*i* from the 9th bit position output of input/outut register 504. The reference input is provided over lead 2464 by one output of a four-bit latch circuit identical to four-bit latch circuits 2426 and 2446. For convenient illustration, the latch circuit providing the 9th bit reference signal $L_9$, and reference signals $L_{10}$ through $L_{12}$ for bits 10 through 12, is grouped with three other identical latch circuits providing the reference signals $L_{13}$ through $L_{24}$ for the respective 13th through 24th shift register bit in a single unit designated 2466. The latter receives information inputs through respective ones of the wires in 24-wire cable 516 from the input/output register. A control input is provided over lead 2428 by the STORE signal generated as previously described. As in the case of the previously described comparator circuits, whenever the contents of the 9th bit position of the input/output register matches the $L_9$ signal, the output of EXCLUSIVE OR circuit 2460 is 0 and the $C_9$ output of inverter 2462 is 1.

The coincidence signals $C_{10}$ through $C_{24}$ for the respective shift register bit positions 10 through 24 are provided by a series of 15 comparator circuits identical to comparator circuit 2458 just described. For convenience, these circuits are grouped in a block designated 2468 which receives the shift register outputs for the 10th through the 24th bit positions over leads 516*J–x* and reference signals for bits 10 through 24 from the respective $L_{10}$ through $L_{24}$ outputs of latch circuits 2468. Comparator circuits 2466 operate identically to circuit 2458 to provide coincidence signals $C_{10}$ – $C_{24}$ which are 1 if the data in the respective shift register bit positions match the associated reference signals in latch circuit 2468.

The $C_9$ – $C_{24}$ coincidence signals are all OR-tied together over lead 2469 as one input to a NAND gate 2470. Additional inputs to NAND gate 2470 are provided by the OR-tied coincidence signals $C_1$ – $C_8$ provided over lead 2448 by the SEARCH signal over lead 2422 and the DATA STROBE signal over lead 2452. NAND gate 2470 tests for search coincidence. Thus, if the OR-tied $C_9$ – $C_{24}$ signals are all 1, this indicates that bit coincidence for each of the 16 bits correspond to the second and third characters in the input/output register, while if this signal is "low," then at least one of the 16 bits does not match. If, in addition, the signal on lead 2448 is 1, this means that all 24 bits match the prestored reference, and if the system is operating in search, such a match in coincidence with the DATA STROBE signal indicates successful completion of a search. Under such conditions, NAND gate 2470 operates to provide a low output.

Alternatively, it will be understood that if an entire tape cassette has been played through and the search has not been successfully completed, then further continuation of the search operation is futile and must be halted. For this purpose, the $\overline{\text{EOT}}$ signal from tape drive unit 142 (see FIGS. 5 and 18) is provided over lead 2472, along with the output of NAND gate 2470 as inputs of an OR* gate 2474. As will be recalled, the $\overline{\text{EOT}}$ signal is 1 if the end of tape has not been reached, but is 0 if the end of tape has been reached. The output of OR gate 2474, on lead 2476 constitutes the SEARCH COINCIDENCE signal, and is an indication of the state of the search operation. This signal is high if the search has been successfully completed or if further search is futile, and is low if the search should continue.

The remaining portions of the circuitry illustrated in FIG. 24 constitutes signal processing logic for converting the $\overline{\text{EOM SENSED}}$ signal on lead 2456 into appropriate control signals for the remainder of the system. System response to detection of the EOM signal must be such that, for on-line playback operation, the EOM character is transferred to the line coupler before the playback operation is halted. For local playback operation, this is not necessary since the printer has by that time processed the last character in the message.

For record operation, detection of the EOM character requires transfer of that character into one of the memory units, followed by transfer of the information in that memory unit to the tape. This is true whether the incoming data is generated locally or remotely.

The circuitry employed to accomplish the foregoing comprises three set-reset flip-flops 2478, 2479 and 2480. The set input for flip-flop 2478 is provided by a NAND gate 2482 which receives as its inputs, the output of an inverter 2484 driven by the $\overline{\text{EOM SENSED}}$ signal on lead 2456, and the DATA STROBE signal on lead 2452. The set input for flip-flop 2480 is provided through a NAND gate 2486 which receives as its inputs, the ONE output of flip-flop 2478, and the No. 9 output of sequence control logic unit 606 representing count 68 of the 88 count sequence. The set input for flip-flop 2479 is provided by a NAND gate 2488 which receives as its inputs, the output of a pair of inverters 2490 and 2492, and the RECORD signal on lead 24130 from mode select logic unit 602. Inverter 2490 is coupled to the output of NAND gate 2482 while inverter 2492 is coupled by a lead 2494 to the OR-tied outputs of a pair of NAND gates 2496 and 2498, described below. The reset inputs for flip-flop 2478, 2497 and 2480 are provided in common by the output of an OR* gate 24100 coupled through an inverter 24102. OR* gate 24100 receives as its inputs, the I.C. SET signal from sequence control logic unit 606, the START DATA XFER signal from memory control logic unit 530 and the output of a NAND gate 24104 over lead 24106. The inputs to NAND gate 24104 are provided by an inverter 24108 and by the ONE output of flip-flop 2497.

NAND gate 2496 receives as its inputs, the "A-O" and B TAPE ASSO signals over leads 24110 and 24132 from memory control logic unit 530. The inputs to NAND gate 2498 are provided by the "B-O" and A TAPE ASSO signals from memory control logic unit 530 over leads 24118 and 24128.

The B-TAPE ASSO and A-TAPE ASSO signals also provide inputs to a further pair of NAND gates 24134 and 24136, respectively. The second input to NAND gates 24134 and 24136 are provided in common over lead 24138 by an inverter 24140 coupled to the output of a NAND gate 24142. This, in turn, receives as its inputs, the ONE output flip-flop 2480, and the EOM CLK signal over lead 24144 from frequency selection and division logic unit 610. The ONE output of flip-flop 2478 also provides inputs to a further pair of NAND gates 24146 and 24148. The second input to NAND gate 24146 is provided by the No. 9 output from sequence control logic unit 606 while the second input for NAND gate 24148 is provided by the No. 6 output of the sequence control logic unit. A third input to NAND gate 24148 is provided by the ZERO output of flip-flop 2480.

NAND gate 24146 provides the EOM STOP signal while NAND gate 24148 provides the START EOM XFER signal. The EOM XFER-A and EOM XFER-B signals are provided by NAND gates 24134 and 24136 respectively. The ZERO output of flip-flop 2480 provides the I/O CLAMP signal, while the ONE output of flip-flop 2479 provides the EOM-1280 signal. The CHAR. CLEARED signal is provided by the output of NAND gate 2486.

OPERATION

Operation of the dual intermediate memory data handling system described above may best be understood from the following description of representative modes in which the system is capable of functioning.

Record Operation

For operation in the record mode, record-playback select key 314 (see FIG. 15) is placed in "record" position, and local-on line select key 318, direct-convert switch 825, parallel-serial switch 1519 and baud rate selector switch 1564 are appropriately positioned. With power applied, the I.C. SET signal (or its complement) produced by initial condition start circuit 1208 resets cycle flip-flop 1160, I/O register 1402 and search registers 1404 and 1406, playback flip-flop 1538, tape rewind flip-flop 1852, tape erase flip-flop 1872, tape run flip-flop 1966, memory address registers 2120 and 2176, memory selection flip-flop 2210, output selection flip-flop 2222 and 2229, and EOM flip-flops 2478, 2479 and 2480.

With record flip-flop 1520 set, the TAPE STORE and RECORD signals on leads 1521 and 1528 are high and the RECORD signal on lead 1526 is low. This sets character present flip-flop 1186 through OR* gate 11100. Also, with master flip-flop 2210 reset, the system is prepared to store data from an external source initially in memory unit 204A.

For parallel operation, incoming data is provided by manual operation of the input/output printer 102 to provide a sequence of 6-bit character code words in the EIA format. The 6-bit signal is processed by parity bit generator 802 to produce a 7-bit signal on leads 804*a* through *g*. Since the RECORD and PARALLEL signals on leads 840 and 834 are both high, a 1 level on lead 836 indicating depression of a printer key, and the presence of a 6-bit character code on leads 512 causes NAND gate 828 to operate to produce the PARALLEL ENTER signal on lead 814.

The PARALLEL ENTER signal is provided over lead 1210 to set cycle flip-flop 1160 through OR* gate 1172 and inverter 1174. This activates NAND gate 1158 to advance counting chain 1202 in response to the DATA CLK signal on lead 1156, the frequency depending on the position of baud rate selector switch 1516. As counting chain 1202 operates, at count 4, the DATA STROBE signal is generated by NAND gate 15102 and OR* gate 15100. This resets character present flip-flop 1186, and produces a low value for the CHAR. PRES. signal.

Referring back to FIG. 8, the outputs of parity bit generator 802 are provided directly to NAND gates 808*a* through *g* and to NAND gates 822*a* through *h* through EIA to ASCII code converter 806. For EIA operation, the DIRECT signal on lead 812 is 1 and the PARALLEL ENTER signal coupled through inverter 815 actuates NAND gates 808 to couple the parity bit generator output directly to the inputs of OR* gates 818*a* through *h*. NAND gate 808*h*, which receives no signal input, provides a 1 — the stop bit for the EIA format.

For ASCII operation the CONVERT signal on lead 824 is 1, and the output of EIA to ASCII code converter 806 is provided through NAND gates 822*a* through 822*h* to OR* gates 818*a* through *h*. The latter provide the shift register parallel inputs on leads 514*a–h*.

Referring to FIG. 14, leads 514*a* – *h* are connected to parallel data inputs of I/O register 1402. At the same time, the PARALLEL ENTER signal is coupled through OR* gate 1418 and inverter 1422 over lead 1420 to the P.E. input of the I/O register, and through OR gate 1414 and lead 528 to the $C_P$ input to enter the incoming character into the I/O register.

To test for the presence of the EOM code word, the I/O register outputs are provided over lead 516*a* to bit 1 comparator circuit 2402 and over leads 516*b* through 516*h* to comparator circuits 2444 for bit positions "2" through "8" (see FIG. 24.) With the system not operating in the search mode, the SEARCH and SEARCH signals on leads 2422 and 2414 are 0 and 1 respectively. NAND gate 2412 therefore operates and the reference signal for bit 1 comparator 2402 is provided through OR* gate 2408 by switch 2418 which is in the EIA or ASCII position depending on the desired operating format.

As mentioned above, the $\overline{\text{PARALLEL ENTER}}$ signal, by which entry of the incoming character into the I/O register is effected, also starts the operating cycle of counting chain 1202. At the 4th count, before the shift operation begins the DATA STROBE signal is generated by NAND gate 15102 and OR* gate 15100, and is provided over lead 2452 to condition NAND gate 2450. Then, if all of the $C_1$–$C_8$ coincidence signals are high, NAND gate 2450 operates, indicating that the character just inserted in the I/O register is EOM.

If the EOM character is not detected, the signal on leads 2456 is high, and the eight bit transfer sequence continues. In that case, the 12th, 20th, 28th, 36th, 44th, 52nd, 60th and 68th pulses in the cycle of counting chain 1202, provided by the No. 2 output of sequence control logic unit 606 (see FIG. 12) are coupled through lead 1416, inverter 1417 and OR* gate 1414 to advance the I/O register by eight counts. This transfers the incoming character from the 1st through the 8th bit positions of the I/O register over lead **516*h*, NAND gate 902 and lead 518, to NAND gates 2206 and 2241. With the RECORD signal on lead 2216 and the "A" selection signal on lead 2208 both high, NAND gate 2206 operates to provide the incoming data through inverter 2202 and lead 537A** to the data input of memory units A1–A5.

With the "A" and TAPE STORE signals high, NAND gate 2143 and OR* gate 2142 operate to produce the B-TAPE ASSO signal to condition NAND gate 2138. Also, the B TAPE ASSO signal on lead 11142 conditions NAND gates 11126 and 11128, but since the CHAR. PRES., $\overline{\text{EOM}}$-1280, and SEARCH KEY signals are all low, the $\overline{\text{INH-A}}$ signal on lead 11130 is high and NAND gate 2138 is further conditioned. The latter then operates, and passes the 8 pulses comprising the No. 2 output of sequence control logic unit 606 through OR gate 2136 to generate the A-ADVANCE signal on lead 2134. With the CORRECT KEY signal low, the output of NAND gate 2178 is high, whereby NAND gate 2122 is conditioned and responds to the A-ADVANCE signal to advance memory address register by eight counts in synchronism with the incoming data provided from the I/O register over lead 518.

Since the "A" signal on lead 2168 is high, NAND gate 2164 is conditioned. As the advance signals provided on lead 2134 by the output of NAND gate 2138 are coupled to transistor circuit 2172, the latter conducts after a short delay produced by the RC input circuit and actuates NAND gate 2164. The resulting signal is provided through inverter 2166 on lead **532*i* to actuate memory subunits A1–A5 for write operation. The write actuation pulse for a given memory site appears slightly before the trailing edge of the output of NAND gate 2122 which then advances A memory unit address register 2120** by one count prior to the next write operation.

Successive incoming characters generated by input-output printer 102 are handled in precisely the same manner as described above until the capacity of memory unit 204A has been reached. At that time, data transfer from the A memory unit to the tape is initiated, and incoming data is stored in the B memory unit, as explained in detail below.

Operation for serial data input is essentially the same as that for the parallel mode except that information is received serially rather than in parallel from the external source. Also, since the incoming character is transferred into the input/output register 1402 one bit at a time, it will be appreciated that an entire character is not present in the I/O register until after the 8-bit transfer sequence has been completed. This is reflected by the fact that the DATA STROBE signal generated by logic circuit 1598 is produced by the NAND gate 15104 and OR* gate 15100 in response to the 70th count of the 88 count cycle of counter 1202. Thus, inspection for the EOM character and resetting of character present flip-flop 1186 occur at count 70, rather than at count 4. Resetting flip-flop 1186 at count 70 means that during the first incoming character NAND gate 11126 operates to produce the $\overline{\text{A-INH}}$ signal which inhibits NAND gate 2138. This prevents A memory address register 2120 from advancing in response to the No. 2 output of the sequence control logic unti until entry of the second character into the I/O register commences.

Moreover, with reference to FIG. 8, it may be seen that incoming data appearing on lead 510 passes through signal shaper 844 and produces the SERIAL START signal on lead 852. The incoming data itself is coupled through NAND gate 846, lead 854, and OR* gate 856 over lead 511 as the serial input to I/O register unit 1402.

Referring to FIG. 11, the SERIAL START signal is coupled through inverter 1176. This produces a low output coupled through OR* gate 1172 and inverter 1174 to set cycle flip-flop 1160. This actuates 88-position counting chain 1202 and produces the 8-bit data transfer signal as the No. 2 output of sequence control logic unit 516 as before. This signal operates I/O register 1402 through inverter 1417 and OR* gate 1414, and generates the A-ADVANCE signal on lead 2134, also in the same manner as previously described. Again, as long as the EOM character is not detected in response to the DATA STROBE signal associated with each incoming character, the information storage in the memory unit 204A continues until the memory unit reaches its capacity.

When memory unit 204A reaches its capacity of 1280 bits, NAND gate 2132 operates and produces the A-1280 signal, which is coupled through inverter 2266 and lead 2264 as an input to NAND gates 2260 and 2276. Since memory selection flip-flop 2210 is still reset, its $\overline{Q}$ output is high. Consequently, the "A" signal on lead 2208 actuates NAND gate 2260 which in turn actuates OR* gate 2256 to provide inputs to NAND gates 2244 and 2250. Since the RECORD signal on lead 2269 is high, only NAND gate 2244 operates. This actuates inverter 2245 and NAND gate 2247 to provide the $\overline{\text{START DATA TRANSFER}}$ signal to trigger (i.e. complement) memory selection flip-flop 2210 causing the Q output to go high and producing a high value for the "B" signal on lead 1263.

The output of NAND gate 2244 is also coupled through inverters 2201 and 2248 to generate the $\overline{\text{ADDRESS RESET}}$ signal which is coupled through lead 2130 and OR* gate 2126 to reset address registers 2120 and 2176. The $\overline{\text{START DATA TRANSFER}}$ signal is further coupled over lead 1948 and OR* gate 1944 to set tape start delay single shot 1942 which in turn sets tape run flip-flop 1966 as the ZERO output of the single shot goes low.

When the $\overline{\text{TAPE START DELAY}}$ signal on lead 1960 goes high, tape run flip-flop 1966 is set, and the TAPE RUN signal on lead 1968 is high. Since the CORRECT KEY signal is low when error correction is not in progress, the output of inverter 1836 is high and the TAPE RUN signal on lead 1968 operates NAND gate 1832 and OR* gate 1846 to actuate forward solenoid driver-amplifier 1802, and the tape speed begins to build up.

After the 100 millisecond delay introduced by the tape start delay single shot 1942, the TAPE START DELAY signal on lead 1950 returns to a high level. This, as well as the high level of the TAPE RUN signal conditions NAND gate 2156 which then responds to the 9600 Hertz RECORD CLK signal to generate the TIMING IN signal for recording on the timing track of the tape.

The TIMING IN signal is also provided to NAND gate 2140. Since the CORRECT KEY signal, "B" and TAPE STORE signals are all high at this time, NAND gate 2140 and OR* gate 2136 operate to generate the A-ADVANCE signal. This causes the "A" memory address register 2120 to advance in response to the RECORD CLK signal, thereby successively actuating the memory sites in the A memory. However, since the "A" signal is low, NAND gate 2164 is inhibited and the A memory unit is conditioned for read rather than write operation.

As address register 2120 is cycled under control of the high frequency A-ADVANCE pulse train, data is read out of each memory site in succession and is provided over lead 536(A) to NAND gate 2220. This is conditioned by the "B" signal, and by the ONE output of flip-flop 2222 (the latter having been set by the "A-1280" signal on lead 2264.) As a result, NAND gate 2220 operates to provide the data output of the A memory unit over lead 2230 and inverter 2232 to NAND gate 2234. This operates in response to the RECORD signal on lead 2216 to provide a DATA signal on lead 540 to data track recording circuit 538 (see FIG. 15.) At the same time, the TIMING IN signal is provided over lead 1515 to timing track record circuit 626 shown in FIG. 15, and is recorded in a timing track on the tape in synchronism with the data pulses.

As A memory address register 2120 continues to cycle, and data contained in the A memory unit is transferred to the tape, incoming data from input/output printer 102, or from a remote signal serial data source is stored in memory unit 204B. For this purpose, the No. 2 output of sequence control logic unit 606 generated in response to the incoming data pulse is provided to NAND gate 21102 which is conditioned by the A-TAPE ASSO signal from OR* gate 21108, (the latter being actuated by the "B" and TAPE STORE signals provided to NAND gate 21110) and the high value of the B-INH signal from sequence control logic unit 606. NAND gate 21102 therefore provides the B-ADVANCE signal through OR* gate 2196. This is coupled through NAND gate 2192 which operates in precisely the same fashion as NAND gate 2122 to advance the count state of B memory address register 2176 in response to the incoming data. Incoming data is thus stored in successive memory sites in the B memory unit while previously received data stored in the A memory unit is being transferred to the tape.

As will be appreciated, as data is transferred from successive memory sites in the A memory unit, the count of A memory address register 2120 advances. Thus, when the count state of address register 2120 again reaches 1280, all data previously stored in the A memory unit will have been transferred to the tape.

At this time, NAND gate 2132 operates and generates the A-1280 signal which is coupled through inverter 2266 and lead 2264 to NAND gate 2276. Since the "B" signal on lead 2263 is high at this time, NAND gate 2276 and OR* gate 2272 operate to provide an input to NAND gate 2252. Further, since the RECORD signal on lead 2269 is high, NAND gate 2252 operates and produces the DATA TRANSFER COMPLETED signal which is coupled over lead 1950 through OR* gate 1974 and inverter 1975 to reset the tape run flip-flop 1966. As a result, the TAPE RUN signal on lead 9168 goes low, whereby NAND gate 1832 is disabled, and forward solenoid driver-amplifier 1802 is turned off, stopping the tape.

Since the transfer of data to the tape occurs at 9600 Hertz, the 1280-bit transfer operation, even including the 100 millisecond tape start delay requires less than 0.250 second. Accordingly, even for on-line record operation at 4800 baud, the maximum baud rate which the system can accommodate, the data transfer from the A memory unit to the tape will have been completed before 1280 bits of incoming data will have been stored in the B memory unit, thereby exhausting its capacity. Thus, the B memory unit continues to load from the external source even after the A memory to tape transfer operation has been completed.

When the B memory unit does reach its capacity of 1280 bits, NAND gate 2186 operates to provide the B-1280 signal which is coupled through inverter 2268 and lead 2270 to NAND gate 2262. The latter is conditioned by the "B" signal on lead 2263 and produces an output through OR* gate 2256 to NAND gate 2244. The latter having been conditioned by the RECORD signal on lead 2269, operates again to produce the START DATA TRANSFER signal which complements memory selection flip-flop 2210 and initiates tape operation in the same manner as previously described.

However, when memory selection flip-flop 2210 is complemented, the "A" signal goes high and in a manner completely analogous to that described above in connection with the A memory unit, the data just stored in the B memory unit is transferred to the tape, along with timing track information for use subsequently during playback operation.

Error Correction Operation

Error correction operation is employed when the system is operating in the local record mode, and permits the operator to delete previously typed characters one at a time in reverse order. Two operational situations exist, depending on whether the character to be deleted is or is not located in memory sites 1272 through 1280 of one of the memory units.

Assume first that the character to be deleted is in the A memory unit, but not in memory sites 1272 through 1280. Since data is at that time being stored in the A memory unit, memory selection flip-flop 2201 is reset, i.e., with the "A" signal on lead 2208 at the high level. Referring to FIG. 15, when correct key 310 is depressed, flip-flop 1574 is set, producing a high level for the CORRECT KEY signal, and a low level for the CORRECT KEY signal. Before depression of correct key 310, the ONE output of flip-flop 1574 was low so flip-flop 1576 was set, its ONE output thus conditioning NAND gate 1578. Then, when flip-flop 1574 is set, NAND gate 1578 operates to produce the $\overline{\text{REVERSE}}$ signal.

The latter is coupled by means of lead 1206, OR* gate 1172, and inverter 1174 to set cycle flip-flop 1160 which in turn actuates NAND gate 1158 and permits counting chain 1202 to advance in response to the DATA CLK signal on lead 1156. At the same time, with the CORRECT KEY signal on lead 2182 high, a conditioning signal is provided to NAND gate 2178. Also, because the "A" and TAPE STORE signals are high, the B TAPE ASSO signal is generated by NAND gate 2143, the output of inverter 2180 is high causing NAND gate 2178 to operate. This produces a low output which is coupled to NAND gate 2122 inhibiting the same, and is also coupled through inverter 2162 to actuate NAND gate 2124. The latter then responds to the A-ADVANCE output of OR* gate 2136 and actuates the count down input of A memory unit address register 2120 in response to the No. 2 output of the sequence control logic unit provided over lead 21106 through NAND gate 2138. Register 2120 thus counts back eight steps corresponding to the eight pulses constituting the No. 2 output of the sequence control logic unit.

Then, at count 70, the No. 7 output of sequence control logic unit goes high, and is provided through inverter 1577 to the reset input of flip-flop 1576. This resets the flip-flop, and inhibits NAND gate 1578, causing the $\overline{\text{REVERSE}}$ output to return to a high level. This, in turn, releases OR* gate 1172 and inverter 1174, thereby removing the set input for cycle flip-flop 1160.

Since the system is operating in the record mode, at the 70th count of the operating cycle in question, NAND gate 1170 operates, and proivdes a RESET signal for flip flop 1160 through OR* gate 1166 and inverter 1168. With cycle flip-flop 1160 reset, the operation of counting chain 1202 is halted thereby terminating backward counting of register 2120 after eight counts corresdponding to a single character. Successive depression of correct key 310 produces similar 8-step count-back. Corrected characters may be entered as previously described, without further changes.

The other error correction situation which may be encountered is if the character to be deleted is in the last eight memory sites of one of memory units 204A or 204B, for example the A memory unit. From the description of the normal record operation, it will be understood that when a character is entered into the last eight memory sites of the A memory unit, NAND gate 2132 operates causing memory selection flip-flop 2210 to be complemented and initiating the memory unit to tape data transfer sequence. The system thus comes to rest with the data from the A memory unit stored in the tape, the B memory unit conditioned to receive data from the input-output register, and access to the A memory unit denied. The A memory address register 2110 rests at a count of 1280, while the B memory unit address register is reset to a 0 count in readiness for new data from the I/O register.

Note, however, the data is not erased from the A memory since erasure is automatically accomplished when new data is written in. It is this feature of the system operation which is exploited to permit access to data already stored in the tape for error correction. Specifically, since the B memory address register 2176 is at a 0 count, NAND gate 21132 operates and produces a high output from inverter 21130 to condition NAND gate 21126. Then, if the error correction key is depressed NAND gate 21116 is operated through inverter 21114 and NAND gate 21110. This activates NAND gate 21126 through inverter 2198, and the load control input of B memory address register 2176 goes low.

As previously mentioned, a low value for the load control input of register 2176 causes establishment of a count of 1280. NAND gate 2186 thus operates, and the $\overline{\text{B-1280}}$ signal goes low. The system thus reacts as if the B memory unit has reached its capacity, and the $\overline{\text{B-1280}}$ signal, coupled through inverter 2268 operates NAND gate 2262, OR* gate 2256, NAND gate 2244, inverter 2245 and NAND gate 2247 to generate the $\overline{\text{START DATA TRANSFER}}$ signal, to start the tape and to complement memory selection flip-flop 2210. However, reset of address registers 2120 and 2176 which normally accompanies these operations is inhibited by the low level of the $\overline{\text{CORRECT KEY}}$ signal at the input of inverter 2201. Registers 2120 and 2176 thus remain at counts of 1280. Also, since memory selection flip-flop 2210 was complemented, the "A" signal returns to a high level, thereby rendering memory unit 204A accessible for error correction.

The conjunction of the "A" and A-1280 signals operates NAND gate 2260, OR* gate 2256, NAND gate 2244 and inverter 2245, but NAND gate 2247 is inhibited because the tape is now running, and the $\overline{\text{TAPE RUN}}$ signal is low. Memory selection flip-flop 2210 is thus not complemented, as it ordinarily would at the count of 1280 for the A memory register 2120 with the "A" signal at a ligh level.

Also, with the CORRECT KEY signal high, register 2120 is then down-counted in response to the No. 2 output of the sequence control logic unit coupled through OR* gate 2136 and NAND gate 2124. The last character in the A memory unit is thus deleted, and address register 2120 comes to rest at a count of 1272.

At the same time, with the $\overline{\text{START DATA TRANSFER}}$ signal having been generated, the tape start delay single shot 1942 is actuated to set taPe run flip-flop 1966. The TAPE RUN signal on lead 1968 then goes high, and conditions NAND gate 1842. Since the CORRECT KEY signal is also high at this time, NAND gate 1842 operates, and actuates reverse solenoid driver-amplifier 1804 through OR* gate 1853. Thus, in response to the $\overline{\text{START DATA TRANSFER}}$ signal, the tape runs backward. Since the system is in a record mode, the TAPE STORE signal is high, and the high level of CORRECT KEY signal actuates NAND gate 1660 and OR* gate 1657. This actuates NAND gate 1656 permitting playback of the timing signals from the tape. The read head is advantageously downstream of the record head, whereby for reverse operation, the timing track is played out of the tape as $\overline{\text{TIMING OUT}}$ before it passes the timing track record head 1508. This is necessary since the TAPE STORE signal on lead 1606 actuates OR* gate 1602, which in turn actuates drivers 1504 and 1506 to erase the timing track as the tape runs backward.

As the $\overline{\text{TIMING OUT}}$ signal is coupled overlead 1658 to OR* gate 1919, timing pulse sensor single shot 1938 is successfully actuated by each pulse whereby the signal on lead 1940 remains low and inhibits NAND gate 1928 as the tape runs backward.

After the entire data file previously stored from the A memory unit has been played back, timing pulses are no longer provided to OR* gate 1919. Five milliseconds later, the timing pulse sensor single shot 1938 times out. NAND gate 1928 is therefore reconditioned, and a RESET signal for tape run flip-flop 1966 is provided through OR* gate 1974 and inverter 1985. Resetting the tape run flip-flop deactivates NAND gate 1842 and turns off reverse solenoid driver-amplifier 1804 causing the tape to stop with the tape ready to re-record the data block just erased.

As a result of the correction operation, A memory unit address register 2120 is at a count of 1272. Further depression of the correct key reduces the count in units of eight, effectively deleting a character each time the key is depressed. Correspondingly, as new characters are actuated, register 2120 will again reach the count of 1280, and the previously described transfer to the B memory, and storage of the A memory contents (actually restorage) will take place.

Load Operation

Whenever a prerecorded tape cassette is inserted into machine for playback, the first two 1280-bit data blocks are transferred from the tape into the A and B intermediate memory units before playback begins.

For this operation, the user inserts the tape into the machine, and places record-playback key 314 in the playback position. This resets record flip-flop 1520 and provides a high output on lead 1526 for the $\overline{\text{RECORD}}$ signal. Playback flip-flop 1538 is still reset at this time (either as a result of a previous operation, or due to the I.C. SET signal if the system has just been turned on) so the $\overline{\text{PLAY}}$ and PLAY signals are 1 and 0 respectively.

Also, load switch flip-flop 1906 is reset through normally closed contacts 1904 of load key 304 so the LOAD signal on lead 1912 is low. This sets load operation flip-flop 1916 so its ONE output on lead 1922 is high, whereby NAND gate 1920 is conditioned. The latter does not operate, however, because the LOAD signal on lead 1912 is low.

The operator then depresses load key 304 connecting the $\overline{\text{RECORD}}$ signal on lead 1910 through switch contacts 1908 to set load switch flip-flop 1906. This produces a 1 output on lead 1912 and a 0 output on lead 1914 for the LOAD and $\overline{\text{LOAD}}$ signals, respectively.

The $\overline{\text{LOAD}}$ signal on lead 1914 is provided through capacitor 1946 and OR* gate 1944 to set tape start delay single shot 1942. This sets tape run flip-flop 1966 so that the TAPE RUN signal on lead 1970 goes high. Since the CORRECT KEY signal is low, inverter 1836 conditions NAND gate 1832 which operates in response to the TAPE RUN signal. This operates OR* gate 1846 and actuates forward solenoid driver-amplifier 1802 thereby starting the operation of the tape.

The $\overline{\text{LOAD}}$ signal on lead 1914 is provided through lead 11106, OR* gate 11100 and inverter 11102 to set character present flip-flop 1186. This prevents data transfer to the I/O register. The $\overline{\text{LOAD}}$ signal, coupled through lead 2289, capacitor 2287, OR* gate 2280 and inverter 2278, resets memory selection flip-flop 2210 assuring data storage initially in memory unit 204A.

When the LOAD signal on lead 1912 goes high NAND gate 1920, previously conditioned by the ONE output of load operation flip-flop 1916, operates and inhibits NAND gate 1928. Thus, even when the tape start delay single shot 1942 times out after 100 milliseconds, and the ZERO output on lead 1960 returns to 1, NAND gate 1928 does not operate, thereby preventing tape run flip-flop 1966 from being reset at the end of the 100 millisecond delay period if data has not yet been encountered on the tape.

When the first timing pulse of the initial data block is played back the $\overline{\text{TIMING OUT}}$ signal from NAND gate 1656 goes low. This resets load operation flip-flop 1916, and its output on lead 1922 goes low to inhibit NAND gate 1920, thereby reconditioning NAND gate 1928.

However, the first pulse of the $\overline{\text{TIMING OUT}}$ signal also sets timing pulse signal shot 1938 through OR gate 1919 so its output on lead 1940 goes low. Thus, even though NAND gate 1928 is again conditioned it does not operate, and tape run flip-flop 1966 remains set. This condition continues as long as $\overline{\text{TIMING OUT}}$ pulses continue to be received at less than 5 millisecond intervals to keep single shot 1938 triggered.

In addition to activating single shot 1938, the TIMING OUT signals from timing track play back circuit 548 are provided through lead 2125, NAND gate 2139, and OR* gate 2136 to generate the A-ADVANCE signal on lead 2134. This actuates A-memory unit address register 2120 as previously described. Also, with the "A" signal high NAND gate 2164 operates in response to the A-ADVANCE signal to activate memory unit 204A for write operation.

The data output from data playback circuit 542 is coupled over lead 544 to NAND gates 2204 and 2240. Since the "A" signal is high and the "B" signal is low, NAND gate 2240 is inhibited, but NAND gate 2204 operates (the $\overline{\text{RECORD}}$ signal also being high) and the data being played from the tape is coupled to lead 537A and to the data input of the A memory unit. Thus, under control of the TIMING OUT pulses being read from the timing track, the data pulses are stored in sequence in the memory sites of the A memory unit with the A memory address register 2120 advancing from one count state to the next in response to the timing track signals.

When the count of A memory address register 2120 advances to 1280, indicating that the A memory unit has reached its capacity, NAND gate 2132 operates, to produce the $\overline{\text{A-1280}}$ signal. This is coupled through inverter 2266 and lead 2264, NAND gate 2260, OR* gate 2256 and NAND gate 2250 to generate the $\overline{\text{DATA TRANSFER COMPLETE}}$ signal. This is coupled through lead 1950, OR* gate 1974 and inverter 1975 to reset tape run flip-flop 1966.

Concurrently, the signal on lead 2264 is coupled to NAND gate 2275. The latter, previously conditioned by the LOAD signal on lead 2277, operates, and through OR* gate 2272 operates NAND gate 2246.

Operation of NAND gate 2246 actuates inverter 2245 and NAND gate 2247, the latter having been conditioned when tape run flip-flop 1966 was reset. NAND gate 2247 produces the $\overline{\text{START DATA TRANSFER}}$ signal, and the $\overline{\text{ADDRESS RESET}}$ signal at the output of inverter 2201. The former signal toggles memory selection flip-flop 2210, and retriggers the tape start delay single shot 1942 through OR* gate 1944, which, in turn again sets tape flip-flop 1966.

With memory selection flip-flop 2210 complemented, the "B" signal is now high, and by an operation completely analogous to that described above, the tape data output is coupled through NAND gate 2240 and inverter 2242 to lead 537B and the data input terminal of memory unit 204B.

Correspondingly, the TIMING OUT signals appearing on lead 2252 are coupled through NAND gate 21104 and OR* gate 2196 to produce the B-ADVANCE signal. This is provided through NAND gate 2192 to advance the B memory address register 2176, and to operate the read-write control circuit 2243 for memory unit 204B. Data is thus stored successively in each of the memory sites of the B memory unit.

When the count of B memory address register 2176 reaches 1280, indicating that the maximum capacity of the B memory has been reached, NAND gate 2186 produces the $\overline{\text{B-1280}}$ which is coupled through inverter 2286 and lead 2270 to NAND gate 2263. This is conditioned by the high level of the "B" signal, and thus operates to produce a signal through OR* gate 2256 to NAND gate 2250. This, in turn, is conditioned by the $\overline{\text{RECORD}}$ signal on lead 2212 and operates to produce the $\overline{\text{DATA TRANSFER COMPLETE}}$ signal. This is coupled over lead 1950, OR* gate 1974, and inverter 1975 to reset the tape run flip-flop 1966, causing the tape to stop.

Recalling that operation of NAND gate 2246 causes generation of the $\overline{\text{ADDRESS RESET}}$ signal while operation of NAND gate 2250 does not, it may be seen that A memory address register 2120 will have been reset after storage of data in the A memory unit, but after data storage in the B memory unit, address register 2176 will not have been reset. Moreover, while NAND gate 2144 operates in response to the presence of the "B" and $\overline{\text{RECORD}}$ signals thereby conditioning NAND gate 2138, the No. 2 output of the sequence control logic unit is not generated during the transfer of data from the tape to the B memory unit. This is because cycle flip-flop 1160 remains reset in the absence of triggering signals from NAND gate 1176 or from the $\overline{\text{START PRINT}}$ signal on lead 1212 produced by the NAND gate 870, both of which are inhibited by the low level of the PLAY signal which results from playback flip-flop 1538 being reset. The system thus comes to rest with data blocks stored in both A and B memory units, and the memory selection flip-flop 2210 set to produce a high value for the "B" signal and a low value for the "A" signal.

Playback Operation

After the load operation described above has been completed, initiation of actual playing out of the tape does not begin until playback key 308 is depressed. For local playback operation, key 318 is placed in the local position so the signal on lead 1560 is high and that on lead 1562 is low [This operation may take place prior to depression of the load key.] Key 1519 is also properly positioned.

When start key 308 is depressed, the low level of the RECORD signal on lead 1528 is coupled through OR* gate 5132, inverter 1534, and capacitor 1536 to set the playback flip-flop 1538, whereby a high level is coupled through inverter 1540 and 1542 to produce a high value for the PLAY signal. Correspondingly, the $\overline{\text{PLAY}}$ signal at the output of inverter 1540 is low.

The PLAY signal is coupled over lead 1932 through inverter 1933 and capacitor 1934 to reset load indicator flip-flop 1930 thereby extinguishing load key illuminator 1936. Also, the PLAY signal on lead 860 conditions NAND gate 870 to prepare the same for generation of the $\overline{\text{START PRINTOUT CYCLE}}$ signal. The memory output over lead 520 is coupled through OR* gate 856, and lead 511 to the serial data input of I/O register unit 1402.

In addition to the PLAY signal on lead 860 NAND gate 870 receives as a conditioning signal, the 6 output of sequence control logic unit 606 on lead 936 (indicating that counting chain 1202 is reset). The final conditioning signal for NAND gate 870 is the UTILIZATION DEVICE READY signal on lead 876 provided by the printer indicating the same to be ready to receive data. NAND gate 870 therefore operates and provides the $\overline{\text{START PRINTOUT CYCLE}}$ signal which is coupled over lead 121 through OR* gate 1172 and inverter 1174 to set cycle flip-flop 1160. This, in turn, conditions NAND gate 1158 and activates counting chain 1202 in response to the DATA CLK signal on lead 1156. As counting chain 1202 operates, the No. 2 output is coupled by means of lead 21106 to NAND gate 2138. This is conditioned by the B-TAPE ASSO signal from OR* gate 2142, generated by NAND gate 2144 operating in response to the "B" and $\overline{\text{RECORD}}$ signals, and by the $\overline{\text{A-IHN}}$ signal. The latter is high because the SEARCH KEY signal on lead 11120 is low, and both NAND gates 11126 and 11128 are inhibited, the former by the TAPE STORE signal, and the latter by the EOM-1280 signal.

The output of NAND gate 2138 is coupled through OR* gate 2136 to provide the A-ADVANCE signal over lead 2134 to operate NAND gate 2122 and (through control circuit 2170, to operate NAND gate 2164.) As previously explained the former advances A memory address register 2120 by eight counts in response to the eight pulses comprising the 2 output of the sequence control logic unit, but since master flip-flop 2210 is in the B state, NAND gate 2164 does not operate, and thus memory unit 204 operates to play out the data stored in the eight first memory sites, i.e, the first character.

At the same time, the No. 2 output of the sequence control logic unit is provided over lead 1416 and is coupled through inverter 1417, OR* gate 1414, and lead 528 to advance input/output register 1402. Thus, as data is transmitted serially one bit at a time out of the A memory unit, it is received by input/output register 1402 which responds to the eight pulses of the No. 2 output of the sequence control logic unit to store all of the eight bits comprising the first character.

The outputs of I/O register unit 1402 are provided as inputs to parity check circuits 928 and to code converter 912 which provides inputs to NAND gates 916 *a – f*. Also, the outputs of the I/O register are connected directly to NAND gates 864 *a – f*. Parity check circuit 928 operates continuously to provide a 0 output on lead 930 if proper parity is not maintained.

Assuming that no parity error is detected, the output of parity check circuit 928 on lead 908 is high. This provides a conditioning signal for NAND gates 864 *a* through *f* and 916 *a* through *f*, and, through inverter 932, an inhibit signal over lead 940 for NAND gates 938 *a* – f.

Operation of NAND gates 864 or 916 depends on the format being employed. If the data contained in the shift registers is in the EIA format, switch 825 will be in the DIRECT position. Thus the signal on lead 812 will be high while the signal on lead 824 will be low.

This conditions NAND gates 864*a* through *f* and inhibits NAND gates 916*a* through *f*.

Conversely, if the information contained in the shift registers is in the ASCII format and is to be provided to printer 102 in the EIA format, switch 825 will be in the CONVERT position and the signal on lead 824 will be high while the signal on lead 812 will be low. This conditions NAND gates 916*a* through *f* and inhibits NAND gates 864*a* through *f*.

As will be understood in the former case, the contents of I/O register 1402 are provided to printer 102, directly through NAND gates 864*a* through *f* and OR* gates 920 *a* through *f*. In the latter case, data is provided to the printer by way of code converter 912 through NAND gates 916*a* through *f* and OR* gates 920*a* through *f*.

In the event that a parity error is detected, parity check circuit 928 provides a high output from inverter 932 on lead 940 and a low output on lead 908. The former conditions NAND gates 938 *a* through *f* while the latter inhibits all of NAND gates 864 *a* through *f* and 916 *a* through *f*. Thus, instead of the character contained in the shift register, the substitute character generated by NAND gates 938 *a* through *f* is provided to the printer.

As the operating cycle of counter 1202 begins, the low value of the START PRINT signal, coupled through inverter 900 conditions printer control NAND gate 901. Referring to FIG. 11, it will be recalled that character present flip-flop 1186 is set by the low value of the LOAD signal through OR* gate 11100 and inverter 11102. Since the system is in playback the DATA STROBE signal is generated at count 70. Thus, throughout the first operating cycle of playback character present flip-flop 1186 is still reset, and the CHARACTER PRESENT input to NAND gate 901 is still low. NAND gate 901 thus does not operate, and printer 102 is inhibited during this operating cycle.

At count 70 of the first cycle, the DATA STROBE signal is generated by NAND gate 15102 and OR* gate 15100. This resets character present flip-flop 1186 and conditions NAND gate 901 for operation at the beginning of the second cycle of the sequence control logic unit. As will be appreciated, this prevents operation of the printer during the eight-bit transfer sequence by which the first character contained in the A memory unit is entered in the input/output register since a legitimate character is not then present.

At the 72nd, 80th, or 88th count of the 88-count cycle, the No. 4 output of the sequence control logic unit goes high and is coupled through inverter 1167, OR* gate 1166 and inverter 1168 to reset cycle flip-flop 1160. This returns counting chain 1202 to its 0 condition and provides a high value for the No. 6 output of the sequence control logic unit over lead 936 to condition NAND gate 870. The UTIL.DEV. READY signal on lead 876 is still high so NAND gate 970 is again conditioned, and produces a second START PRINTOUT CYCLE signal over lead 868.

This again sets cycle flip-flop 1160 in the manner previously described and initiates generation of the next 8-bit transfer sequence provided by the No. 2 output of the sequence control logic unit. Operation of the A memory unit, the input/output register, and the associated input/output circuitry is precisely as described above except at this time, the CHARACTER PRESENT signal is high, and NAND gate 901 activates the printer at the beginning of the 8-bit transfer sequence. As a result, the character then stored in the input/output register, i.e., the first character in the data block present in memory unit 204A is coupled to the printer before the second shift operation actually begins at the 12th count under control of the No. 2 output of the sequence control logic unit.

Correspondingly, at the end of the second 8-bit transfer sequence, the second character is completely present in the input/output register, and is ready for transfer to the printer at the 4th count of the third shift cycle. Assuming that detection of the EOM character in a manner hereinafter described does not take place, the above described sequence of operation continues uninterrupted until the entire contents of the A memory unit have been transferred to the input/output register 1402.

When the last character has been transferred out of the A memory unit the count in address register 2120 will be 1280, which actuates NAND gate 2132 to provide the A-1280 signal to inverter 2266. Since memory selection flip-flop 2210 is in the "B" state, the signal on lead 2263 is high and the output of inverter 2266 operates NAND gate 2276, OR* gate 2272, and NAND gate 2246, the latter being conditioned by the RECORD signal on lead 2212. This operates inverter 2245 and NAND gate 2247 previously conditioned by the TAPE RUN signal, to switch memory selection flip-flop 2210 to the "A" state, and to set tape run flip-flop 1966 through OR* gate 1944 and tape start delay single shot 1942. At the same time, the output of NAND gate 2247 is coupled through inverters 2248 and 2201 to reset address registers 2120 and 2176.

As may be appreciated, the A memory unit is now accessible to receive data, and the tape is running whereby the third data block from the tape memory is transferred to the A memory unit in precisely the same manner as described previously in connection with the load operation. When the entire data block has been transferred from the tape to the A memory unit, register 2120 again reaches a count of 1280, which operates NAND gate 2132, inverter 2266, NAND gate 2260, OR* gate 2256, and NAND gate 2250 to produce the DATA TRANSFER COMPLETE signal, again turning off tape run flip-flop 1966. The third data block is now stored in the A memory unit.

Concurrently with the foregoing, the data previously stored in the B memory unit commences to be played out to the I/O register. This is accomplished under control of NAND gate 21112, OR* gate 21108 and NAND gate 21102 which cooperate with the No. 2 output of sequence control logic unit 606 on lead 21106 to generate the B-ADVANCE signal through OR* gate 2196. The output of the latter is coupled through NAND gate 2192 to advance B memory address register 2176 in groups of eight pulses, thereby transferring data from the B memory unit to the input/output register in precisely the same manner previously described.

In this regard, it may be noted that the last character in the A memory unit was loaded in the input/output register just before memory selection flip-flop 2210 was complemented to permit loading of the data into the A memory unit. Thus, at the time that data begins to play out of the B memory unit, a character is already present in the shift register and is immediately printed out. Accordingly, there is no delay between printing of the next to last and last characters previously stored in the A memory unit, or between the last character in the A memory unit, and the first character in the B memory unit.

Operation as described above continues until all of the data stored in the B memory unit has been exhausted. At that time, the B-1280 signal is generated by NAND gate 2186 and is coupled through inverter 2268 and lead 2270 to NAND gate 2274 which operates in response to the "A" signal from memory selection flip-flop 2210 to actuate OR* gate 2272, NAND gate 2246, inverter 2245, and NAND gate 2247 to generate the START DATA TRANSFER signal. This again switches memory flip-flop 2210, returning it to the "B" state and starts the tape to prepare the system for storage of a new data block in the B memory unit. Concurrently, the data block now stored in the A memory unit is transferred to the input/output register as previously described. Such operation, with alternating storage of data in one memory unit, and concurrent playout of data from the other memory unit continues until the end of message (EOM) character is detected.

Serial Playback Operation

Serial playback operation is essentially similar to parallel playback operation except that the information is provided to the output utilization device on a serial, i.e. bit-by-bit basis from the 8th bit position of the input/output register rather than the parallel, i.e., simultaneously from all eight bit positions.

Operation of the memory control logic and the memory units themselves is identical in local and remote playback since actuation of cycle flip-flop 1160 and counting chain 1202 is accomplished by the START PRINTOUT CYCLE signal on lead 1212. For this purpose, the UTIL. DEV. READY signal is provided to NAND gate 870 from whatever serial external utilization device is being used, or by coupler 116.

For operation of the system in the play mode immediately following a load operation, the memory unit 204A is associated with the input/output register as previously described, and in response to operation of cycle flip-flop 1160, the No. 2 output of the sequence control logic unit actuates A memory address register 2120, to enter the first character of the data block into the input/output register. However, since the character present flip-flop 1186 is reset at the beginning of the load operation, the CHARACTER PRESENT signal on lead 1184 is low. As a result, a signal on lead 971 is low, and OR* gate 970 operates through inverter 968 to maintain line flip-flop 962 reset. However, at count 70 of the initial 88-count sequence, the DATA STROBE signal is generated and character present flip-flop 1186 is reset. At this time, line flip-flop 962 is freed for operation by the high level of the signal on lead 971.

Upon completion of the first 88 count cycle, NAND gate 1176 operates again and cycle flip-flop 1160 is again set. The momentary reset of counting chain 120 at the end of previous operating cycle causes start pulse flip-flop 954 to be set.

The ZERO output on lead 955 is therefore low, inhibiting NAND gate 952 and providing a low signal through inverter 964 for the K input of line flip-flop 962.

The first triggering signal for the line flip-flop is provided by the first pulse of the No. 1 output of sequence control logic unit 606, i.e. corresponding to the 4th count of the operating cycle of counting chain 1202. With the flip-flop K input low at that time, the $\bar{Q}$ output of line flip-flop 962 is also low thereby generating the "space" corresponding to the start pulse of the transmission codes shown in FIGS. 4a through 4c.

At the 6th count of the operating cycle of counting chain 1202, the No. 5 output of sequence control logic unit 606 becomes 1. This signal is provided over lead 958 to reset start pulse flip-flop 954 providing a high level on lead 955 to condition NAND gate 952. with the PLAY signal on lead 860 high, NAND gate 952 operates to provide a 1 or a 0 depending on the value of the signal on lead 516 at the output of the 8th bit position of I/O register 1402.

As explained above, the No. 1 and No. 2 outputs of sequence control logic unit 606 are identical but for the addition to the No. 1 output of a pulse at the 4th count of the operating cycle of counting chain 1202. Thus, after the 4th pulse, line flip-flop 962 is triggered in synchronism with the advance of the shift register.

However, it will also be recalled that for line flip-flop 962 the value of the K input at the beginning of the clock pulse appears at the $\bar{Q}$ output at the end of the clock pulse while for the shift register stages the value of the output of one state at the time of the advance is stored in and appears at the output of the succeeding stage at the end of the advance pulse. Thus, while the shift register and line flip-flop 962 are operated synchronously, the output of the shift register remains static sufficiently long for line flip-flop 962 to switch to the value determined by the shift register contents before the shift.

The above described procedure continues for all of the 8 pulses constituting the No. 2 output of sequence control logic unit 606 whereby an entire character is transferred through line flip-flop 962.

The 8th bit of a character code word in the EIA format is the "stop" bit. This is generated by resetting line flip-flop 962 to produce a value of 1 for the $\bar{Q}$ output at the 68th count of the operating cycle of counting chain 1202. The reset signal is provided by the No. 3 output of sequence control logic unit 606 over lead 980, OR* gate 970, and inverter 968. Cycle flip-flop 1160 and counting chain 1202 are then reset at the 72nd count of the counting chain operating cycle by the No. 4 output of sequence control logic unit provided by inverter 1167, OR* gate 1166 and inverter 1168. At that time, counting chain 1202 returns to its reset condition and the 6 output is provided to reactivate NAND gate 1176 and to commence the next operating cycle by setting cycle flip-flop 1160.

For ASCII operation, however, it will be recalled that the 8th bit is a parity bit which must be followed by one or two stop bits to complete the transmission character code word. During ASCII operation, OR* gate 1230 and NAND gate 1220 operate to provide the 76th count of the operating cycle of counting chain 1202 as the No. 3 output of the sequence control logic unit 606. Line flip-flop 962 is therefore not reset until the 76th count, rather than at the 68th count.

Similarly, either NAND gate 1223 or 1224 operates to provide the No. 4 output of the sequence control logic unit either at the 80th count of the operating cycle of counting chain 1202 for baud rates of 300 and above, or as the 88th count for 110 baud operation. For ASCII operation, therefore, cycle flip-flop 1160 is not reset until the 80th or 88th count, at which time counting chain 1202 is returned to 0 and reactivates cycle flip-flop 1160 through NAND gate 1176 and OR* gate 1172. Since line flip-flop 962 remains reset from the 76th count of an operating cycle of counting chain 1202 until it is next triggered by the 4th count of the next operating cycle the $\overline{Q}$ output of the line flip-flop remains high during this entire interval, thereby generating the required one or two stop bits.

Search Operation

The search operation is actually a combination of various features of the record and playback operations, in that the system operates in a quasi-record mode for entry of the reference characters, and in the play mode during the actual search. To start the search, key 314 is placed in the playback position, making the TAPE STORE signal on lead 1521 low. Then, search key 312 is depressed, which couples the TAPE STORE signal through contacts 1582 to provide a low level for the $\overline{\text{RECORD}}$ signal on lead 1526, and through inverter 1524 to provide a high level for the RECORD signal on lead 1528. This conditions various parts of the system which depend on a high value for the RECORD signal and a low value of the $\overline{\text{RECORD}}$ signal — i.e., the system operates for data entry purposes in the same way as during record operation.

Depression of the search key also provides a high level for the SEARCH KEY signal on lead 1585. This is coupled by lead 1120 and inverters 11122 and 11124 to generate low values for the $\overline{\text{INH-A}}$ and $\overline{\text{INH-B}}$ signals, which, in turn, are provided to the input to NAND gates 2133 and 21102 prevent advance of either of memory address registers 2120 or 2176. This prevents change of the memory site address during entry of the reference characters as explained below, thus assuring that the search begins with the first characters of the data blocks present in the memory units at that time.

While depressing search key 312, the operator depresses a sequence of three keys on the printer keyboard to establish the reference characters to be identified during the search. Referring to FIG. 8, with the RECORD signal on lead 832 high, depression of the key on the keyboard actuates NAND gate 828 to produce the $\overline{\text{PARALLEL ENTER}}$ signal as described above for a parallel input unit or a SERIAL START signal for a serial input unit. Either signal actuates the cycle flip-flop through OR* gate 1172 and inverter 1174 to advance counting chain 1202 in response to the DATA CLK signal on lead 1156. The incoming data is then entered in parallel in register 1402 in response to the $\overline{\text{PARALLEL ENTER}}$ signal coupled to the P.E. and $C_P$ control inputs, or serially in response to the $C_P$ input alone. Referring back to FIG. 15, depression of the search key conditions NAND gate 1586. If the PARALLEL signal is high, the DATA STROBE signal is generated by NAND gate 15102 and OR* gate 15100 at the 4th count of the 88 count operating cycle just begun. If the PARALLEL signal is low, the DATA STROBE signal appears at count 70, in either case, assuring that the first reference character is fully entered in parallel into input/output register unit 1402. NAND gate 1586 then operates to produce a high value for the REFERENCE STORE signal on lead 15110. This signal is coupled to the control input of 4-bit latch circuits 2426 and 2446, and latch unit 2468 to enter into the respective bit positions of the latch circuits all of the data stored in the 24 character positions of shift register 504.

Notice, however, that as the 88 count cycle proceeds, the $C_P$ input of shift register unit 1402 is actuated by the No. 2 output of the sequence control logic unit over lead 1416, inverter 1417, and OR* gate 1414 and lead 522, and the $C_P$ inputs of shift register unit 1404 and 1406 are actuated directly by the 2 output of the sequence control logic unit on lead 1416. Thus, data entered in parallel into the I/O register 1402 is transferred serially into bit positions 9 through 16.

Entry of the second and third reference characters proceeds in the manner just described. Thus, depression of the next character key produces the ENTER DATA signal on lead 836 which in turn actuates NAND gate 828 to produce another $\overline{\text{PARALLEL ENTER}}$ signal. This again actuates cycle flip-flop 1160 and initiates a second 88 count operating cycle. For serial entry, the SERIAL START signal actuates the cycle flip-flop.

AT count 4 or 70 of the second cycle, the DATA STROBE signal is again generated. Since the search key remains depressed, NAND gate 1586 and inverter 15108 produce a second REFERENCE STORE signal for actuating latch circuit 2426, 2446, and 2468. The original character previously entered in latch circuits 2426 and 2446 is now replaced by the second reference character. For a parallel input, the first reference character, having already been shifted into shift register bit positions 9 through 16, is now entered in bit positions 9 - 16 in latch circuit 2468, after which the first reference character is shifted to register positions 17–24, and the second reference character is shifted to register positions 9–16. For serial operation the shift is produced by the second 88 bit cycle, but the DATA STROBE signal does not occur until count 70, so again the first and second characters are properly located in the latch memory.

When the third reference character is entered, the above described sequence of operation is again repeated, Now, however, the REFERENCE STORE signal causes the first entered reference character, now in shift register bit positions 17 through 24, to be entered into the bit positions 17–24 of latch circuit 2468. Similarly, the second reference character, now in shift register bit positions 9 through 16, is entered in bit positions 9-16 of latch circuit 2468, and the third reference character just entered in parallel into the I/O register, is stored in the eight bit positions of latch circuit 2426 and 2446.

At this time, search key 312 is released. The resulting positive to negative transition of the signal on lead 1583 is coupled through capacitor 1588 and inverter 1590 to actuate NAND gate 1592. This is conditioned by the high level of the ZERO output of flip-flop 1520 resulting from switch 314 being in the playback position so NAND gate 1592 operates, and sets search flip-flop 1546. This allows the SEARCH and $\overline{\text{SEARCH}}$ signals to go high and low, respectively. Operation of NAND gate 1592 sets playback flip-flop 1538 through OR* gate 1532, and inverter 1534. Release of the search key also provides a low level on leads 1585 and 11120 which produces a high output from inverters 11122 and 11124, freeing the A and B memory address registers 2120 and 2176 for operation. The low value of the $\overline{\text{SEARCH}}$ signal also inhibits NAND gate 901 to prevent parallel playback, and resets flip-flop 962 through OR*gate 970 to prevent serial playback. A low value of the $\overline{\text{SEARCH}}$ signal also operates OR* gate 1108 to condition NAND gate 1104. This provides the 38.4 mHz output of divider 1100 to inverter 1154 whereby the DATA CLK signal on lead 1156 is a pulse train at that frequency.

In addition, the high value of the SEARCH signal on lead 2422 conditions NAND gate 2420 in bit 1 comparator circuit 2402 and the corresponding NAND gates in comparator unit 2444, along with NAND gate 2470. The low value of the $\overline{\text{SEARCH}}$ signal on lead 1414 inhibits NAND gate 2412, and corresponding NAND gates in comparator unit 2444, along with NAND gate 2450. These operations actuate the search coincidence detection logic and inhibit the EOM detection circuitry.

The transfer of data from the tape to memory units 204A and 204B, and from the memory units to the I/O register during the actual search proceeds in exactly the manner as described above in connection with playback except for the fact that data transfer from the memory units to the I/O register under control of the No. 2 output of sequence control logic unit 606 is at 38.4 mhz, rather than at any other frequency.

It may be noted that the successive operations of cycle flip-flop 1160 are initiated by the output of NAND gate 870 (i.e., the $\overline{\text{START PLAYBACK CYCLE}}$ signal.) The PLAY signal is high because the playback flip-flop has been set, while the UTIL. DEV. READY signal is high since the output printer does not operate during the search. Reset for the cycle flip-flop is produced by the No. 4 output of sequence control logic unit 606 which is present at count 72 if band rate selection switch 1564 is in the 132 baud position, as would normally be the case. Correspondingly, restart of the tape unit associated with the I/O register reaches a count of 1280. A search beginning with the first data block on a tape is normally preceeded by a load operation as previously described to prepare the first data block for utilization. Thus it may be seen that the contents of the memory unit passes very quickly through the input/output register whereby the search operation may proceed in extremely rapid fashion.

In order to determine when the desired characters have been located, the data in the 24 bit positions of the shift register 504 are sampled in response to each DATA STROBE signal and compared with the data stored in latch circuits 2426, 2446, and 2468. Since the RECORD signal is now low, the DATA STROBE signal is generated by OR* gate 15106 and NAND gate 15104 at the 70th count of each 88 count operating cycle. In other words, as each character is shifted into the 24 bit shift register, the entire contents of the shift register is sampled to determine whether the proper sequence of characters is present.

If all 24 bits in the shift register match with the corresponding reference bit, the $C_1$ through $C_{24}$ outputs of comparator circuits 2402, 2444, 2458, and 2466 are all high, and NAND gate 2470, conditioned by the SEARCH signal on lead 2424 operates to produce the SEARCH COINCIDENCE signal at the output of OR* gate 2474 on lead 2476.

The SEARCH COINCIDENCE signal is coupled through NAND gate 15118, OR* gate 15114, and inverter 1568 to reset search flip-flop 1546 thereby terminating the search operation. At the same time, the output of inverter 1568 is coupled over lead 1544, OR* gate 1550 and inverter 1548 to reset the playback flip-flop 1538. With both the search and playback flip-flops reset, actuating signals for sequence control logic unit 606 are no longer present, and playback operation halts with the three reference address characters present in the shift register and the count of the address register for whichever one of memory units 204A or 204B is then associated with the shift register at a count corresponding to the first bit of the first character following the search address. The system is thus prepared to respond to reactuation of play flip-flop 1538 (by means of start key 308) to proceed with a play operation identical to that previously described.

It will be noted that upon completion of the search operation, character present flip-flop 1186 is set by the SEARCH signal AC coupled through capacitor 11104, OR* gate 11100 inverter ineerter 11102 thus indicating that legitimate data is not present in the I/O register. Of course, when the playback operation is restarted the 70th count of the first 88 count data transfer operation produces the DATA STROBE signal which resets character present flip-flop 1186 in preparation for normal printout.

End of Message Detection

Detection of the end of message character is required for both playback and record, but not during the search operation. The actual sequence of operations resulting from the detection of the EOM character depends on the system mode of operation. In describing the relevant operating sequences, it will be assumed that the EOM character is stored in or played out of the A memory unit. Complementary operation occurs if the B memory unit receives or provides the EOM character.

Consider first the situation in which the EOM character is generated by depression of EOM control key 310. As indicated in FIG. 15, depression of the EOM key results in generation of the EOM character code and provision thereof to the parallel inputs of I/O register unit 1402. At the same time, the $\overline{\text{EOM ENTER}}$ signal on leas 1570 is coupled through OR* gate 1418, and inverter 1422 to the P.E. input of I/O register 1402, and by means of lead 1420, OR* gate 1414 and lead 522 to the $C_P$ input. Thus, in response to depression of the EOM KEY, THE EOM character is entered in the I/O register. Simultaneously, the $\overline{\text{EOM ENTER}}$ signal on lead 1214 is coupled through OR* gate 1172 inverter 1174 to actuate cycle flip-flop 1160 and to commence an 88 count data transfer cycle. inverter 1174 to actute cycle flqpXfl/p xx60 and to commence an 88 count dat transfer cycle.

Referring to FIG. 15, it may be seen that for local-record operation, NAND gate 15104 is conditioned whereby the DATA CLK signal is generated by the fourth count of the 88 count sequency through OR* gate 15100. Since the system is not in search, the $\overline{\text{SEARCH}}$ signal on lead 2414 is high. This conditions NAND gate 2412 for bit 1, aNd the corresponding NAND gates in comparator circuits 2444 for bits 2 through 8. Concurrently, the SEARCH signal on lead 2422 is low, which inhibits NAND gate 2420 for bit 1 and the corresponding NAND gates in comparator unit 2444 for bits 2–8. Comparators 2402 and 2444 are thus conditioned to respond only to the EOM character.

With the EOM character present in the I/O register at count 4, the $C_1$ through $C_8$ comparator signals are all high. NAND gate 2450, conditioned by the $\overline{\text{SEARCH}}$ and DATA STROBE signals, operates to provide the $\overline{\text{EOM SENSED}}$ signal on lead 2456 which is coupled through inverter 2484, and actuates NAND gate 2482, also conditioned by the DATA STROBE signal.

NAND gate 2482 sets the first of the three EOM flip-flops 2478 which in turn conditions NAND gates 2486, 24146 and 24148.

The 88 count data transfer sequence initiated by depression of the EOM key 316 proceeds in normal fashion to transfer the EOM character serially from the I/O register into the next 8 memory sites in memory unit 204A. At count 68 of the 88-count cycle, NAND gate 2486 is actuated and sets flip-flop 2480, causing the I/O CLAMP signal at the ZERO output of the flip-flop to go low. This inhibits NAND gate 24148 to hold the START EOM XFER signal high thereby preventing cycle flip-flop 1160 from operating to initiate another 88 count cycle. The I/O CLAMP signal is also provided over lead 903 to inhibit NAND gate 402, thereby preventing transfer of further data to the memory unit.

The CHAR. CLEARED signal which sets flip-flop 2480 is also provided over lead 11108, OR* gate 11100 and inverter 11102 to set character present flip-flop 1186, making the CHAR. PRESENT signal high. This conditions NAND gate 11126 which also is conditioned by the TAPE STORE and B-TAPE ASSO. signals to generate the INH A signal which is provided over lead 2137 to inhibit NAND gate 2138. This prevents advance of the A memory address register in response to the No. 2 output of the sequence control logic unit until flip-flop 1186 is reset during the next 88 count cycle, i.e. when the next character is entered into the I/O register.

With flip-flop 2480 set, its ONE output conditions NAND gate 24142 which responds to the EOM CLK signal on lead 24136 to produce a series of pulses on lead 24138. Referring to FIG. 11, it may be seen that the EOM CLK signal is formed by the output of binary divider unit 1113. The signal on lead 24138 is thus a pulse train at a frequency of 2400 Hz and appears after completion of the 88 count transfer cycle by which the EOM character was entered into the A memory unit.

Referring again to FIG. 24, with the system operating in the record mode, and memory unit 204A receiving data from the input/output register the B TAPE ASSO signal is high, actuating NAND gate 24134, to generate the EOM TRANSFER-A signal. This is coupled to OR* gate 2136 to advance the count state of A memory address register 2120. In other words, the EOM character is entered into the A memory, the A memory address is advanced at 2400 Hertz. At the same time NAND gate 902 is inhibited so that data input to the A memory unit is clamped high, whereby a 1 bit is recorded in each memory site as the count of register 2120 advances, When the count state of register 2120 reaches 1280, NAND gate 2132 operates. NAND gate 2260 then operates and provides a signal through OR* gate 2256 to actuate NAND gate 2244, which is conditioned by the RECORD signal on lead 2269. NAND gate 2244 provides an output through inverter 2245 and NAND gate 2247 to complement memory selection flip-flop 2210, to transfer it to the "B" state and to start the tape. The latter operation causes the information stored in memory unit 204A to be transferred to the tape, and resets flip-flop 2478 and 2480 through OR* gate 24100. As will be realized, however, the data stored comprises the terminal portion of a message plus the EOM character, followed by a series of 1's, the number of which depends on the location in the A memory unit that the EOM character occupies.

In connection with the foregoing, several possibilities exist, namely that the EOM character is in the first 8 memory sites of the A memory unit, that it is in the last 8 memory sites of the memory unit, or that it is at some intermediate location. For the EOM character at an intermediate location, operation is as described above. For the EOM character entered in the first 8 memory sites of the A memory unit, it will be understood that the count of A memory address register 2120 before depression of the end of message key 316 is 0. Thus, the A-ZERO signal generated by NAND gate 21124 and inverter 21122 is high, which conditions NAND gate 2496. With the B TAPE ASSO signal high, NAND gate 2496 and inverter 2492 operate to condition NAND gate 2488. Then, when the EOM character is entered and its presence detected at count 4 of the resulting operating cycle of counting chain 1202, address register 2120 will still be at a count of 0, and NAND gate 2488 will be further conditioned but with the RECORD signal low, NAND gate 2488 is still inhibited, and flip-flop 2479 is not set.

Thus, the EOM character proceeds to be entered in the first 8 memory sites of the A memory unit, and at count 68 of the associated cycle of counting chain 1202, flip-flop 2480 is set and generates the EOM TRANSFER-A signal is previously described. Operation for the EOM character in the first eight memory sites is essentially the same as for entry of EOM at some intermediate location.

The third condition is location of the EOM character in the last 8 memory sites of memory unit 202A. Under this circumstance, the count in memory address register 2120 at the time end of message key 316 is depressed, will be 1272. Thus NAND gate 2496 and inverter 2492 do not condition NAND gate 2488.

As the 88 count transfer cycle initiated by depression of the EOM key proceeds, the count in A memory address register 2120 advances, and at the 68th count reaches 1280. At that time, therefore, NAND gate 2132 operates to generate the A-1280 signal, which triggers memory selection flip-flop 2210, and starts the tape in the manner previously described. Likewise, starting the tape actuates OR* gate 24100 and inverter 24102 to reset flip-flops 2478, and 2480, thereby preventing the EOM XFER-A signal from being generated. [A memory address register 2120 is already at a count of 1280; no further advance is necessary.]

Turning now to operation in the on line-record mode, it will be noted that the DATA STROBE signal is generated at count 70, rather than at count 4 of each 88 count cycle. The operation of the EOM control logic circuitry is therefore somewhat different. Considering first the case of the EOM character entered in the first eight memory sites of the A memory, or in some intermediate position, incoming data including the EOM character remotely generated in some suitable fashion, is entered through the I/O register in the manner previously described and is transferred to one of the intermediate memory units, for example memory unit 204A. At count 70 of the operating cycle associated with the EOM character, the character will be completely loaded in the input/output register. At that time, the EOM SENSED signal on lead 2456 if generated and sets flip-flop 2478 through NAND gate 2482. This conditions NAND gates 2486, 24146 and 24148. Then, when the operating cycle is completed, counting chain 1202 is reset, and the No. 6 output of sequence control logic unit actuates NAND gate 24148 to generate the START EOM TRANSFER signal. This is coupled through OR* gate 1172 and inverter 1174 to set cycle flip-flop 1160, and thereby to initiate another 88-count sequence of counting chain 1202. This causes the EOM character to be transferred from the I/O register into the A memory unit just as if the operation was caused by the receipt of an incoming character.

Then, at count 68 of that operating cycle, NAND gate 2486 operates and sets flip-flop 2480. This makes the I/O CLAMP signal low to inhibit NAND gate 2148 and to prevent initiation of further operating cycle. At the same time, the I/O CLAMP signal inhibits NAND gate 902 and maintains a high level at the data input of memory unit 204A.

Also, with flip-flop 2480 set. NAND gate 24142 and inverter 24140 operate to provide the 2400 Hertz EOM CLK to NAND gate 24134. This is conditioned by the B TAPE ASSO signal to generate the EOM XFER-A signal. As in the case of local-record operation, the EOM XFER-A signal advances the count in the A memory register 2120 up to 1280 at which time the tape is restarted, memory selection flip-flop 2210 is complemented, and flip-flops 2478 and 2480 reset through OR* gate 24100.

Again the CHAR. CLEARED signal sets flip-flop 1186 to generate the INH A signal thereby preventing transfer of data from the I/O register until the character present flip-flop is reset, as by entry into the I/O register of the first character of a new message. When the EOM character is to be entered into the last 8 memory sites of the A memory unit, it will be understood that at count 70 of the operating cycle by which the EOM character is entered into the I/O register, the count of A memory address register 2120 is at 1272. Completion of the operating cycle actuates NAND gate 24148 to initiate another operating cycle of counter 1202 by which the EOM character is actually entered into the A memory unit. At count 68 of that operating cycle, A memory address register 2120 reaches a count of 1280, and memory selection flip-flop 2210 is triggered, the tape operation started, and flip-flop 2478 reset without flip-flop 2480 ever having been set. Thus, the EOM XFER-A pulses are not generated and the A memory address register is not advanced.

Response of the system to the EOM character during playback is the same whether the system is operating in the local or on line mode since the DATA STROBE signal in both cases occurs at count 70 of each operating cycle. Assuming for purposes of description that the EOM character is present in the A memory unit, and is located either in the first eight memory sites or in an intermediate location, the EOM character is transferred to the I/O register by the normal playback operation previously described. At count 70 of the operating cycle by which this transfer takes place, sensing of the EOM character by comparator circuits 2402 and 2444 actuates NAND gate 2450 inverter 2484 and NAND gate 2482 to set flip-flop 2478. This conditions NAND gates 2486, 24146 and 24148. At the end of the operating cycle, the No.6 output of the sequence control logic unit goes high, actuating NAND gate 24148. This in turn sets cycle flip-flop 1150 through OR* gate 1172 whereby the EOM character is shifted out of the I/O register. As will be appreciated, at the beginning of the shift cycle, the I/O register outputs are sampled in parallel to actuate printer 102 if the system is operating in the local-playback mode, but since there is no provision for printing out the EOM character, the printer does not operate. On the other hand, for on line operation, the EOM character is shifted out of the I/O register and is coupled through line flip-flop 952 in the manner previously described for any other character.

Setting of flip-flop 2478 also causes a MEMORY CLAMP signal to go low. This signal is coupled over lead 2237 and inhibits NAND gate 2236 whereby the data output of the intermediatememory coupled to the I/O register over lead 520 is held high.

At count 68 of the cycle initiated by NAND gate 24148, NAND gates 2486 and 24146 are operated by the No. 9 output of sequence control logic unit 606. NAND gate 2486 generates the CHAR. CLEARED signal which sets flip-flop 2480 and 1186, while NAND gate 24146 generates EOM STOP signal which is coupled by means of OR* gate 1550 and inverter 1586 to reset playback flip-flop 1538.

Setting of flip-flop 2480 makes the I/O CLAMP signal low, and inhibits NAND gate 24148, thereby preventing initiation of further 8-bit data transfer cycles. Also, NAND gate 24142 is conditioned to couple the EOM CLAMP signal through lead 24138 to NAND gate 24136. With the system in playback and the A memory unit associated with the I/O register, the B TAPE ASSO. signal is high. This conditions NAND gate 24134 thereby generating the EOM XFER-A signal which is provided through OR* gate 2136 and lead 2134 to actuate NAND gate 2122, which advances A memory address register 2120 at 2400 Hz. Data is "played out" of the A memory unit as register 2120 advances but it will be recalled that such data constitutes all 1's. In any case, with playback flip-flop 1538 reset data transfer to printer 102 or coupler 116 does not occur during the 2400 Hz advance of register 2120. Also, the CHAR. CLEARED signal which sets flip-flop 2480 also sets character present flip-flop 1186, thereby inhibiting NAND gate 901 and line flip-flop 962. This condition remains until flip-flop 1186 is reset, as by entry of the first character of the next message into the I/O register.

When A memory address register reaches a count of 1280, NAND gate 2132 operates and produces the A-1280 signal. With the RECORD signal on lead 2112 and the memory selection flip-flop 2210 in the "B" state, the A-1280 signal coupled through inverter 2266 actuates NAND gate 2276, OR* gate 2272, NAND gate 2246, inverter 2245, and NAND gate 2247 to complement memory selection flip-flop 2210, and to start the tape. With memory selection flip-flop 2210 now in the A state, a new data block is entered into memory unit 204A in the normal manner for playback operation, and the START DATA TRANSFER signal is coupled through OR* gate 24100, and inverter 24102 to reset flip-flops 2478 and 2480. After a data block is loaded into the A memory unit, the DATA TRANSFER COMPLETED signal is generated and the tape is stopped with data blocks in both the A and B memory unit, and the system prepared to play back the data block from the B memory unit when playback operation is again initiated.

For the EOM character in the last eight memory sites of the A memory unit, the result is somewhat different. For this, as the EOM character is transferred out of the A memory unit, register 2120 reaches the count of 1280 at the same time that the EOM character is loaded into the I/O register, i.e., at count 68 of the 88 count transfer cycle associated with the EOM character. However, detection of the EOM under control of the DATA STROBE signal does not occur until count 70. Thus, at count 68, the A-1280 signal is generated by NAND gate 2132. Since memory selection flip-flop 2210 is in the "B" state at this time, the START DATA TRANSFER signal is generated by NAND gate 2247, and the tape is again started to load data into the A memory unit. The START DATA XFER signal is also coupled through NAND gate 2247, and inverters 2248 and 2201 to reset address registers 2120 and 2176. Note, however, that the START DATA TRANSFER signal, which also normally resets flip-flops 2478, 2479 and 2480 through OR gate 24100 and 24102 is inoperative since all of these flip-flops are still reset at this time.

At count 70 of the aforementioned operating cycle, the EOM character is sensed, and NAND gate 2482 operates to set flip-flop 2478, and to provide a high signal to NAND gate 2488 through inverter 2490. Since B memory register 2176 is now reset to count of O and the A memory is now tape associated, the signals on leads 24118 and 24128 are both high, thereby actuating NAND gate 2498 and inverter 2492. This operates NAND gate 2488, flip-flop 2479 is set, providing a high value for the EOM 1280 signal on lead 11138. With the A TAPE ASSO. signal on lead 11140 also high NAND gate 11134 operates, and the INH-B signal is generated. This is provided by leads 11136 and 21101 to inhibit NAND gate 21102.

Operation of flip-flop 2478 conditions NAND gates 2486, 24146, and 24148 as before. Then, at the completion of the 88 count cycle, the No.6 output of the sequence control logic unit goes high, operating NAND gate 24148 to generate the START EOM TRANSFER signal and to set cycle flip-flop 1160 through OR* gate 1172. The resulting 88 count data transfer cycle shifts the EOM character out of the I/O register but with NAND gate 21102 inhibited, the No. 2 output of the sequence control logic unit is not passed to OR* gate 2196. As a result, the B memory address register 2176 does not advance with the input-output register as would ordinarily be the case. The data in the first eight memory sites of the B memory unit (actually the first character of a new message) is not transferred to the I/O register as the EOM character is shifted out.

At count 68 of the data transfer sequence, initiated by NAND gate 24148, the No.9 output of the sequence control logic unit goes high, and NAND gates 2486 and 24146 are operated. The EOM STOP signal generated by NAND gate 21146 resets the playback flip-flop as previously described thereby terminating the playback sequence. Operation of NAND gate 2486 sets flip-flop 2480 which prepares the system for generation of the 2400 Hz signal but at the same time, actuates NAND gate 24104 previously conditioned when flip-flop 2479 was set. Operation of NAND gate 24104 provides a low signal on lead 24106 which is coupled through OR* gate 24100 and inverter 24102 to reset flip-flops 2478, 2479 and 2480. Thus, the EOM transfer functions terminate immediately upon completion of the transfer of the EOM character out of the shift register without further advance of the B memory address register 2176.

Since first character in the B memory unit was not transferred to the I/O register, subsequent playback must be inhibited until a character is entered. This is accomplished by setting flip-flop 1186 in response to CHARACTER CLEARED signal generated by NAND gate 2486. Output control NAND gate 901 and line flip-flop 962 are thus held inhibited until flip-flop 1186 is reset by the next DATA STROBE signal indicating a character is present in the I/O register.

We claim:

1. A system for handling data in the form of multibit character code words comprising: input-output means adapted to be connected to an external data source; intermediate memory means comprising first and second memory units, each having the capacity for storing a block of data comprising a plurality of character code words; a principal memory for storage of a plurality of data blocks; and control logic means for establishing a recording operation sequence comprising entry of data from said external source through said input-output means, serial accumulation of the bits making up blocks of data in alternate ones of said intermediate memory units, and serial transfer of the bits making up data to said principal memory from each of said memory units after accumulation therein of a complete data block, said control logic means including selection means having a first state in which the first memory unit is coupled to said input/output means and the second memory unit is coupled to said principal memory, and a second state in which the second memory unit is coupled to said input/output means, and the first memory unit is coupled to said principal memory, first means for effecting transfer of date one bit at a time from said input/output means to said first memory unit when said selection means is in said first state, and from said input/output means to said second memory unit when said selection means is in said second state, second means for effecting data transfer of bits comprising character code words from said second memory unit to said principal memory on a serial bit at a time transfer basis when said selection means is in said first state and from said second memory unit to said principal memory when said selection means is in said second state, first control means for actuating said first transfer means in response to incoming data from said external source, means for sensing when entry of said block of data in one of said intermediate memory units has been completed, second control means responsive to said sensing means for switching the state of said selection means, and for actuating said second transfer means to transfer the block of data just accumulated in one of said intermediate memory units to said principal memory a bit at a time, and, error correction means connected to said memory unit for deleting an undesired character from a predetermined memory unit by reversing the recording operation sequence for said predetermined memory unit.

2. A system as defined in claim 1 wherein said input-/output means includes multiple bit storage means, means responsive to the bits of an externally generated character code word from said external source to generate an additional bit, the value of which is a function of the parity of the incoming code word, and means for entering said incoming code word together with said additional bit in said storage means.

3. A system as defined in claim 1 wherein said error correction means includes means for generating an error correction command signal and means responsive to the absence of data stored in the input/output means coupled memory unit due to the readout thereof into said principal memory and to the generation of said error correction command signal to switch the state of said selection means, and then to delete a predetermined end portion of the data block in the input/output means coupled memory unit by reversing the recording operation; and further means responsive to said switchover means to prepare said principal memory to restore at least a new predetermined end portion in said input/output means coupled memory unit after the data block therein is again completed by additional incoming data.

4. A system as defined in claim 1 wherein said sensing means comprises means responsive to accumulation in the input/output means coupled memory unit of a predetermined number of data bits to generate a control signal, said second control means being responsive to said control signal to actuate said second transfer means, and said selection means being responsive to said control signal to change from one state to the other.

5. A system as defined in claim 1 further comprising means for storing a reference code word representing a message termination character, means connected to said reference storage means and said input/output means to compare an incoming character code word with said reference code word, means for generating a coincidence signal when said incoming character code word matches said reference code word, and logic means responsive to said coincidence signal for actuating said second control means and said selection means.

6. A system as defined in claim 5 wherein said logic means includes means responsive to said coincidence signal for assuring storage in the input/output means coupled memory unit of said message termination character, means responsive to completion of storage of said message termination character to load a succession of format bits of a particular value into said last mentioned memory unit until a complete data block has been accumulated, and means responsive to operation of said sensing means for preventing the loading of format bits.

7. A system as defined in claim 1 wherein said input/output means includes means for temporarily storing incoming data from said external source; and means responsive to an incoming character code word to transfer a previously received character code word from said input/output storage means one of said said input/output associated memory unit.

8. A system as defined in claim 1 wherein each of said memory units includes a plurality of separate memory sites for storing the individual bits comprising a data block; and wherein said second transfer means comprises means to actuate each of said memory sites in sequence to provide the contents thereof to said principal memory, means for generating a timing pulse concurrently with the actuation of each memory site, and means for storing said timing pulse in said principal memory together with the associated data bit.

9. A system for handling data in the form of multibit character code words comprising: input/output means adapted to be connected to an external utilization device; intermediate memory means comprising first and second memory units each having capacity for storing a block of data comprising a plurality of character code words; a principal memory for storage of a plurality of data blocks; and control logic means for establishing a playback operation sequence comprising serial bit-by-bit entry of a block of data in alternate ones of said memory units from said principal memory, and transfer of a block of data from each of said memory units in turn after entry of a data block therein to said external utilization device through said input/output means; said control logic means including selection means having a first state in which the first memory unit is coupled to said input/output means and the second memory unit is coupled to said principal memory, and a second state in which the second memory unit is coupled to said input/output means and the first memory unit is coupled to said principal memory, first means for effecting transfer of data from said first memory unit to said input/output means, when said selection means is in said first state, and to said input/output means from said second memory unit when said selection means is in said second state; second means for effecting data transfer from said input/output means to an external utilization device, third means for transferring data in the form of bits comprising character code words from said principal memory to said second memory unit on a serial bit at a time transfer basis when said selection means is in said first state, and from said principal memory to said first memory unit when said selection means is in said second state, first and second control means for actuating said first and second transfer means to provide data to said utilization device, and third control means responsive to transfer of a block of data from one of said intermediate memory units to said utilization device for switching the state of said selection means and for actuating said third transfer means to enter a block of data into said principal memory coupled memory unit on a bit at a time basis, said input/output means including means responsive to the bits of an outgoing character code word to test for an error in said code word, and means responsive to detection of an error for preventing said erroneous code word from being provided to said utilization device.

10. A system as defined in claim 9 wherein said second transfer means includes first means for providing data to said external utilization device in parallel form with all of the bits defining a character code word appearing simultaneously; second means for providing data to said utilization device in serial form with each of the bits defining a character code word appearing in sequence; wherein said first transfer means is operative to provide data to said input/output means one bit at a time.

11. A system as defined in claim 9 further including means responsive to detection of an erroneous code word to suppress said erroneous code word, and to substitute another code word therefor.

12. A system as defined in claim 9 wherein said third control means comprises means responsive to accumulation in said principal memory coupled memory unit of a predetermined number of data bits for temporarily halting data storage therein, means responsive to transfer from said input/output means coupled memory unit to said input/output means of said predetermined number of bits for generating a control signal; said selection means being responsive to said control signal to switch states, and said third transfer means being operative in response to said control signal.

13. A system as defined in claim 9 wherein the end of a message is identified by a particular terminal character, wherein said third control means includes means for providing a second control signal in response to transfer of said particular character to said input/output means; and logic means responsive to said second control signal for terminating said playback sequence.

14. A system as defined in claim 13 wherein said logic means includes means operative to assure switching of said selection means and actuation of said third transfer means to enter a block of data into the principal memory coupled memory unit before said playback sequence is terminated.

15. A system as defined in claim 13 wherein said input/output means includes means for temporarily storing character code words provided by said input/output means coupled memory unit, means to initiate transfer of a previously stored character code word to said external utilization device, and means responsive to transfer of a character code word from said temporary storage means to transfer another code word to said input/output means from the input/output means coupled memory unit; and wherein said logic means is responsive to said second control signal to assure transfer out of any data stored in said temporary storage means before said playback sequence is terminated.

16. A system as defined in claim 9 wherein the end of a message is identified by a particular terminal character, wherein said third control means includes means for providing a second control signal in response to transfer of said particular character to said input/output means; and logic means including first and second cycle means, said first cycle means being responsive to said second control signal to prevent utilization by said input/output means of further data transferred from said input/output means coupled memory unit, and said second cycle means being responsive to operation of said first cycle means and to occurrence of the next of said first control signals to prevent transfer of data from the input/output coupled memory unit to the input/output means.

17. A system as defined in claim 9 wherein said principal memory contains a plurality of control pulses, each data bit being associated with one of said control pulses; wherein each of said intermediate memory units includes a plurality of separate memory sites for storing the bits comprising a data block, wherein said control logic means includes means to operate said principal memory to generate data pulses and the associated control pulses; and means responsive to said control pulses to actuate said memory sites in sequence to transfer the data pulses associated with said control pulses to said sequence of memory sites of said principal memory coupled memory unit.

18. A system as defined in claim 9 wherein said control logic means includes search operation means for establishing a search operation sequence to locate a particular combination of characters stored in said principal memory, said search operation means comprising means for storing a reference representing said particular combination of characters, means for generating an external search command, means responsive to said search command to initiate the playback operation sequence, further means responsive to said search command to inhibit operation of said second transfer means, means for comparing said stored reference with data provided to said input/output means and for providing a coincidence signal when said particular combination of characters is located, and means responsive to said coincidence signal for terminating said search operation sequence.

19. A system as defined in claim 18 further including timing means for controlling the rate of data transfer from the input/output means coupled memory unit for the playback operation sequence, said timing means being responsive to said search command to establish a data transfer rate for the search operation equal to the fastest rate available for playback operation.

20. A system as defined in claim 18 including means responsive to transfer of all available data from said principal memory to terminate said search operation, even if said search is not successfully completed.

21. A memory system for storage and retrieval of information in the form of multibit character code words, comprising input/output means, first coupling means connected to said input/output means and adapted to be connected to an external data source for connecting said data source to said input/output means and second coupling means connected to said input/output means and adapted to be connected to an external data utilization device for connecting said input/output means to said device; intermediate memory means comprising first and second memory units, each having capacity for storing a block of data comprising a number of character code words; data storage means adapted to receive a memory medium as a principal memory for the system; selection means having a first state in which the first memory unit is coupled to the input/output means and the second memory unit is coupled to said data storage means, and a second state in which the second memory unit is coupled to the input/output means and the first memory unit is coupled to said data storage means; first means for transferring data one bit at a time between said input/output means and said first memory unit when said selection means is in said first state, and between said input/output means and said second memory unit when said selection means in in said second state; second means for transferring information one bit at a time between said second memory unit and said data storage means when said selection means is in said first state and between said first memory unit and said data storage means when said selection means is in said second state, and logic means for controlling the information transfer operations for said system.

22. A system as defined in claim 21 further including clock means for generating primary timing signals, means for selecting a data transfer bit rate for the system, means responsive to said selecting means and to said clock means for generating a first pulse train at a frequency less than the clock frequency corresponding to said selected bit rate; wherein said first coupling means includes means for receiving data one bit at a time at a bit rate which is a sub-multiple of the frequency of said first pulse train; and wherein said logic means includes counter means responsive to said first pulse train and to an actuating signal to generate a series of timing pulses at said sub-multiple frequency with the first pulse in predetermined time relation to said activating signal, sensing means responsive to incoming data to generate said activating signal, and means responsive to said timing pulses for operating said input/output means to accept said incoming data, and to transfer said data to the input/output means coupled intermediate memory unit at a rate determined by said submultiple bit rate.

23. A system as defined in claim 22 wherein said input/output means includes means for temporarily storing incoming data in response to said timing pulses, and means responsive to said timing pulses for operating said first transfer means to transfer previously stored data bits from said input/output storage means to the input/output coupled intermediate memory unit.

24. A system as defined in claim 22 including means responsive to said clock means for generating a second pulse train at a frequency substantially exceeding the frequency of said first pulse train, sensing means responsive to accumulation in the input/output means coupled intermediate memory unit of an entire block of data for generating a first control signal, means in said logic means responsive to said first control signal to switch the states of said selection means and further means responsive to said control signal for operating the data storage means coupled intermediate memory unit to transfer data one bit at a time to said data storage means at a bit rate equal to the frequency of said second pulse train.

25. A system as defined in claim 24 further including means responsive to said second pulse train for storing a timing bit in said principal memory means concurrently with each data bit stored therein.

26. A system as defined in claim 22 wherein each character code word commences with a predetermined non-information bearing bit; wherein said sensing means is responsive to said non-information bearing bit to activate said counter to advance in response to the pulses of said first pulse train, said counter including means to provide a first timing pulse at a predetermined count corresponding to the nominal center of the bit period of the first information bearing bit of the incoming character code word, and means for providing further timing pulses at a succession of counts corresponding to the nominal centers of the bit periods for the other information bearing bits of said incoming character code word, means for collecting said timing pulses to form a train of pulses, and means for deactivating and resetting said counter when a predetermined maximum count is reached.

27. A system as defined in claim 26 wherein the frequency of said first pulse train is eight times the nominal bit rate.

28. A system as defined in claim 22 wherein said second coupling means includes means for transmitting data one bit at a time at a bit rate which is a submultiple of the frequency of said first pulse train; means in said logic means actuating said counter means to generate said timing pulses at said sub-multiple frequency, means for actuating the input/output means coupled intermediate memory unit, said input/output means and said second coupling means in response to said timing pulses to transfer data from said last mentioned input/output means coupled intermediate memory unit through said input/output means to said utilization device at said sub-multiple frequency.

29. A system as defined in claim 28 wherein said counter includes means for generating an additional pulse preceding said timing pulses by an interval equal to the interval between data bits at said selected data bit rate, and means responsive to said additional pulse for generating an initial bit for transmission as part of each character code word.

30. A system as defined in claim 23 further including means responsive to said clock means to generate a second pulse train at a frequency substantially higher than the frequency of said first pulse train, means responsive to said second pulse train for generating a second series of timing pulses; wherein said second transfer means includes means for storing one of said second timing pulses concurrently with a data bit in said principal memory, means for retrieving said second timing pulses, means responsive to said retrieved second timing pulses for activating said second transfer means to enter data from the principal memory into the data storage means coupled intermediate memory unit; and further including means responsive to accumulation in said last mentioned intermediate memory unit of an amount of data equal to the storage capacity thereof generating a control signal, means responsive to said control signal for switching the state of said selection means, and thereafter for actuating said first transfer means to transfer data from the input/output means coupled intermediate memory unit one bit at a time to said input/output means, further means responsive to said control signal for reactuating said second transfer means to enter further data from said principal memory to said data storage means coupled intermediate memory unit while data from said input/output means coupled intermediate memory is being transferred to said input/output means.

31. A system as defined in claim 30 wherein the end of a complete message is identified by a particular terminal character, wherein said logic means includes means responsive to the presence of a terminal character in said input/output means to generate a second control signal, means responsive to said second control signal to actuate said second coupling means to transfer said terminal character to said external utilization device, means for thereafter preventing operation of said second coupling means, means responsive to transfer of said terminal character to said external utilization device for operating the input/output means coupled intermediate memory unit to transfer the data therein to said input/output unit means.

32. A system, as defined in claim 31 further including means responsive to the completion of the transfer of the contents of said input/output means coupled memory unit to said input/output means for switching the state of said selection means, and for thereafter actuating said second transfer means to enter additional data from said principal memory to the data storage means coupled intermediate memory unit.

33. A system as defined in claim 31 wherein the transfer of data from said last mentioned input/output means coupled memory unit after detection of said terminal character in said input/output means is at a rate substantially exceeding the frequency of said first pulse train.

34. A system as defined in claim 21 wherein the end of a complete message is identified by a particular terminal character, wherein said sensing means includes means responsive to the presence of said terminal character in said input/output means to generate a second control signal, means responsive to said second control signal to actuate said first transfer means to enter said terminal character in the input/output means coupled intermediate memory unit, means responsive to entry of said terminal character and to the total number of characters in said last mentioned input/output mean coupled memory unit to enter additional characters into said memory unit, and means responsive to entry of a complete data block in said last mentioned input/output means coupled memory unit to prevent entry of additional characters, to switch the state of said selection means, and thereafter to operate said second transfer means to transfer the contents of the data storage means coupled intermediate memory unit to said data storage means.

35. A system as defined in claim 21 wherein said memory medium comprises a magnetic recording tape: wherein said data storage means includes tape transport means and drive means for said transport means; wherein said second transfer means includes first and second recording circuits for recording first and second information tracks; and wherein said logic means includes means for generating a data transfer pulse train, means to initiate a data record operation sequence comprising means for activating said transport drive means for continuous operation, means for operating the data storage means coupled intermediate memory unit in response to said data transfer pulse train to transfer data to said first recording circuit in bit-by-bit synchronism with said data transfer pulses, and means for coupling said data transfer pulse train to said second recording circuit to store a track of timing pulses on said tape with the timing pulses in synchronism with the bits of said data track.

36. A system as defined in claim 35 wherein said logic means further includes means responsive to transfer of the entire contents of the data storage means coupled intermediate memory unit to the tape for deactivating said transport drive means.

37. A system as defined in claim 35 including means responsive to activation of said transport drive means to delay the actuation of the data storage means coupled intermediate memory unit and said recording circuits for a predetermined interval to allow said transport to reach its normal operating speed.

38. A system as defined in claim 35 wherein said first and second recording circuits include means for converting the binary code input to a non-return-to-zero code for recording.

39. A system as defined in claim 35 wherein said second transfer means includes first and second playback circuits associated with the first and second information tracks of a tape serving as the principal memory medium, and wherein said logic means includes means to initiate a data playback sequence comprising means for actuating said transport drive means for continuous operation, means for connecting said first playback circuit to the data storage means coupled intermediate memory unit, means connected to said second playback circuit and responsive to timing pulses in said second tape information track for activating said data storage means coupled intermediate memory unit to store the data bit associated with each timing pulse, and means responsive to playback of a block of data equal to the capacity of the data storage means coupled intermediate memory unit for deactivating said transport drive means.

40. A system as defined in claim 39 wherein said deactivating means comprises means for stopping said transport drive means after a predetermined interval if timing pulses are not detected by said second playback circuit.

41. A system as defined in claim 39 wherein said deactivating means comprises means for counting the number of data bits entered in the data storage means coupled memory unit and means for stopping said transport drive when a predetermined bit count has been reached.

42. A system as defined in claim 39 including means responsive to actuation of said transport drive means to delay activation of the data storage means coupled intermediate memory unit for a predetermined tape start-up interval to allow said transport to reach its normal operating speed, and means for inhibiting operation of said deactivating means during said start-up delay interval.

43. A system as defined in claim 42 wherein said logic means includes means connected to said second playback circuit and responsive to an externally generated command to override said deactivation means until a timing pulse has been played back from said timing track through said second playback circuit.

44. A memory system as defined in claim 21 wherein said second transfer means is adapted to retrieve data from a magnetic tape serving as said principal memory medium, said tape having recorded thereon a first track of data pulses and a second track of timing pulses synchronized with said data pulses, groups of said pulses being separated by blank portions of said tape to define individual blocks of data having a number of bits equal to the capacity of said intermediate memory units, wherein said second transfer means includes separate playback circuits for said data and timing tracks; wherein said data storage means comprises magnetic tape transport means and transport drive means; and wherein said logic means includes means for establishing a playback operating sequence comprising means for activating said transport drive means, control means responsive to timing pulses played back by said timing track playback circuit to activate the data storage coupled intermediate memory unit to store a data pulse associated with each timing pulse, and cycle termination means responsive to playback of an entire data block for deactivating said transport drive means and for preventing further storage of data in said data storage means coupled intermediate memory unit.

45. A system as defined in claim 44 including means responsive to actuation of said transport drive means to prevent storage of data in said data storage means coupled; memory unit and to inhibit said cycle termination means for a predetermined start-up delay period to allow said transport to reach its normal operating speed.

46. A system as defined in claim 45 wherein said logic means includes means for establishing a load operation sequence comprising means responsive to an external load command to activate said transport drive means and to deactivate said cycle termination means, and means responsive to the start of playback of information by said second transfer means to reactivate said cycle termination means.

47. A system as defined in claim 46 wherein said means for reactivating said cycle termination means is responsive to the first timing track pulse of a data block.

48. A system as defined in claim 21 wherein said input/output means includes storage means for at least one multibit character code word, wherein said first coupling means comprises means for receiving incoming character code words in serial form at several different nominal bit rates, wherein said logic means includes means for generating a first pulse train at a frequency which is a high multiple of the highest of said nominal bit rates, dividing means responsive to said first pulse train to generate a second pulse train at a frequency equal to a selected nominal bit rate, means responsive to the first bit of an incoming character code word to generate an activating signal for said dividing means, said dividing means being operative to generate the first pulse of said second pulse train after a predetermined number of pulses of said first pulse train following said activating signal, and for generating succeeding pulses of said second pulse train at a frequency equal to said nominal bit rate, means for activating said input/output storage means in response to said second pulse train to store incoming data bits in synchronism with the pulses of said second pulse train, and means for deactivating said dividing means after a predetermined number of pulses of said second pulse train have been generated.

49. A system as defined in claim 48 wherein said first coupling means includes means for receiving incoming code words in parallel form, wherein said logic means includes means responsive to appearance of a code word in parallel form in said first coupling means to generate said activating signal for said dividing means and also to generate a parallel data entry control signal, means responsive to said parallel data entry control signal to enter the bits of said incoming code word simultaneously into said input/output storage means, said input/output storage means thereafter being resposnive to said second pulse train to transfer data stored therein into the intermediate memory unit coupled to said input/output means on a bit-by-bit basis.

50. A system as defined in claim 21 wherein said data storage means includes transport means for receiving a magnetic tape as said memory medium, and drive means for said tape transport, said drive means including means for operating said transport in a forward direction, means for operating said transport in a reverse direction, means cooperating with said transport for sensing the beginning of a tape, and means cooperating with said transport for sensing the end of a tape; and werein said logic means includes means for actuating said forward drive means during data transfer between said data means and the data storage means coupled memory unit and means responsive to the sensing of the end of a tape for deactivating said forward drive means.

51. A system as defined in claim 50 including means for generating an external rewind command signal and wherein said logic means includes means responsive to said external rewind command signal to operate said reverse drive means, and means responsive to the sensing of the beginning of the tape for deactivating said reverse drive means.

52. A system as defined in claim 51 further including means for generating an external tape erase command signal and wherein said logic means includes means for establishing a tape erase operation sequence comprising means responsive to said external tape erase command signal to operate said forward drive means, means responsive to sensing of the end of the tape and to said tape erase command signal to deactivate said forward drive means and to activate said reverse drive means, means in said second data transfer means responsive to said tape erase command signal to erase the tape, and means responsive to the sensing of the beginning of the tape and said tape erase command signal to terminate said erase operation sequence.

53. A system as defined in claim 50 further including means for generating an external tape erase command signal and means responsive to said external tape erase command signal for operating said data storage means to erase all information stored on a tape adapted to be carried by said transport.

54. A system as defined in claim 21 including means for generating an external error command signal and wherein said logic means includes means responsive to said external error correction command signal to delete a character code word from the input/output means coupled intermediate memory unit.

55. A system as defined in claim 21 wherein said data storage means is adapted to receive a magnetic tape cassette as said principal memory medium.

56. A system as defined in claim 21 wherein said input/output means further includes means coupled thereto to detect the existence of an error in a character to be transferred to said utilization device, and means responsive to detection of an error for preventing transfer of the erroneous code word.

57. A system as defined in claim 21 wherein said input/output means includes a shift register having a number of stages sufficient to store an entire character code word; means responsive to said incoming character code word from an external serial data source for operating said shift register and the input/output means coupled intermediate memory units to enter said incoming code word bit by bit into said shift register and to transfer a code word previously entered in said shaft register one bit at a time to said intermediate memory unit.

58. A system as defined in claim 57 wherein said input/output means includes means for connecting the bits of an incoming character code word from a parallel data source simultaneously to respective stages of said shift register and wherein said logic means includes means for entering said code word into said shift register stages and for thereafter advancing said shift register a sufficient number of times to transfer said code word one bit at a time to said input/output means coupled intermediate memory unit.

59. A system as defined in claim 57 wherein said input/output means includes means responsive to the bits of an incoming code word to generate an additional bit, the value of which is a function of the parity of the incoming code word, and means for entering said additional bit in one of the bit positions of said shift register, together with the associated code word.

60. A system as defined in claim 21 wherein each of said intermediate memory units comprises a random access memory having a plurality of individually accessible memory sites, said random access memory being operable in storage and retrieval operating modes, and means for selectively activating said individual memory sites for storage or retrieval operation.

61. A system as defined in claim 21 wherein each of said intermediate memory units includes a plurality of individually accessible memory sites, said memory units being selectively operable to store a data bit in an addressed memory site or to read out a data bit from an addressed memory site, means coupled to each of said memory units to address the individual memory sites thereof and further means coupled to each of said memory units to select storage or read-out operation for a particular memory site addressed by said addressing means.

62. A system as defined in claim 21 wherein said logic means includes means for establishing data storage and retrieval modes of operation for the system, means for generating signals indicative of the selected mode, means responsive to said storage mode signal to activate said first coupling means, said input/output means, said first transfer means, and said input/output means coupled intermediate memory unit to store data in said input/output means coupled memory unit, means responsive to storage in said input/output means coupled memory unit of a complete data block from said input/output means for switching the state of said selection means, and for activating said data storage means, said second transfer means, and said data storage means coupled intermediate memory unit to transfer the data therein to said data storage means, and means responsive to the transfer of a block of data to said data storage means to deactivate said second transfer means, said data storage means, and the data storage means coupled intermediate memory unit.

63. A system as defined in claim 62 wherein each of said intermediate memory units includes a plurality of individually accessible memory sites, said memory units being selectively operable to write a data bit in an addressed memory site or to read out a data bit from an addressed memory site, means coupled to each of said memory units to address the individual memory sites thereof in a particular sequence, means responsive to the arrival of data at said input/otput means to advance the addressing means for the input/output means coupled intermediate memory unit through a portion of its sequence, read/write control means coupled to each of said memory units to select read or write operation for a particular memory site addressed by said addressing means, and wherein said logic means includes means cooperating with said read/write control means for the first intermediate memory unit and responsive to said storage mode signal to operate said first memory unit to write data when the selection means is in its first state, and to read out data when the selection means is in the second state, and means cooperating with the read/write control means for said second memory unit and responsive to said storage mode signal to operate said second memory unit to read data when the selection means is in its first state, and to write data when the selection means is in the second state.

64. A system as defined in claim 63 further including means for generating an error command signal and error correction means comprising countback means responsive to said external error command signal and to said storage mode signal for operating the addressing means for the input/output means coupled memory unit to re-address the memory site corresponding to the first bit of the last character entered in said input/output means coupled memory unit, whereby the portion of the address sequence corresponding to the last entered character is repeated when new data appears at said input/output means.

65. A system as defined in claim 64 wherein said addressing means is an up-down counter, wherein said advancing means is operative to advance said counter on a step-by-step basis by a number of counts equal to the number of bits to be stored in the associated memory unit, and wherein said countback means comprises means to reduce the count in said counter by a number of counts equal to the number of bits to be corrected.

66. A system as defined in claim 64 including switchover means responsive to said error correction command signal, and to a predetermined address state of the input/output means coupled memory unit to switch the state of the selection means whereby the intermediate memory unit previously coupled to said data storage means becomes coupled to the input/output means and further including means responsive to said error correction signal for maintaining the address of the intermediate memory unit now coupled to said input/output means at the address corresponding to the last available memory site until operation of said countback means commences.

67. A system as defined in claim 66 further including means responsive to operation of said switch-over means to prepare said principal memory to re-record at least a portion of the last data block transferred thereto.

68. A system as defined in claim 67 wherein said memory medium is a magnetic tape, wherein said data storage means includes tape transport means operable in a forward direction to receive data transferred from one of said intermediate memory units, and wherein said enabling means comprises means responsive to operation of said switch-over means to operate said tape in a reverse direction until the entire portion of the tape containing the previously recorded data block has been rewound.

69. A memory system as defined in claim 63 further comprising means for storing a reference code word representing a message termination character, means connected to said reference storage means and said input/output means to compare an incoming character code word with said reference code word, means for generating a coincidence signal when said incoming character code word matches said reference code word, and logic means responsive to said coincidence signal for actuating the address advancing means for the input/output means coupled memory unit to assure storage therein of said message termination character, means responsive to completion of storage of said message termination character to operate the address advancing means for the input/output means coupled memory unit to load a succession of format bits therein of a particular value, and means responsive to accumulation of a complete data block for preventing the loading of format bits.

70. A system as defined in claim 69 wherein said means for preventing the loading of formatting bits comprises means responsive to the addressing means for the input/output means coupled memory unit reaching the address corresponding to the last available memory site of the input/output means coupled intermediate memory unit to inhibit the operation of said loading means.

71. A system as defined in claim 21 wherein said logic means includes means for establishing data storage and retrieval modes of operation for the system, means for generating signals indicative of the selected mode, means responsive to a retrieval mode signal to activate said second coupling means, said input/output means, said first transfer means, and said input/output means coupled intermediate memory unit to transfer data from said input/output means coupled memory unit through said input/output means to an external data utilization device, means responsive to transfer from said input/output means coupled memory unit of a complete data block to said input/output means for switching the state of said selection means, and for activating said principal memory, said second transfer means, and said data storage means coupled intermediate memory unit to transfer another data block from sad principal memory to the intermediate memory unit coupled to said data storage means and means responsive to the transfer of said block of data from said principal memory to deactivate said second transfer means, said principal memory, and the intermediate memory unit coupled to said data storage means.

72. A system as defined in claim 71 wherein each of said intermediate memory units includes a plurality of individually accessible memory sites, said memory units being selectively operable to write a data bit in an addressed memory site or to read out a data bit from an addressed memory site, means coupled to each of said memory units to address the individual memory sites thereof in a particular sequence, read/write control means coupled to each of said memory units to select read or write operation for a particular memory site addressed by said addressing means, and wherein said logic means includes means cooperating with the read/write control means for said first intermediate memory unit and responsive to said retrieval mode signal to operate said first memory unit to read out data when the selection means is in its first state, and to write data when the selection means is in the second state, and means cooperating with the read/write control means for said second memory unit and responsive to said retrieval mode signal to operate said second memory unit to write data when the selection means is in its first state, and to read out data when the selection means is in the second state.

73. A system as defined in claim 72 wherein the end of a complete message is identified by a particular terminal character, and wherein said logic means includes means for storing a reference code word corresponding to said message termination character, means connected to said reference storage means and said input/output means to compare an outgong character code word with said reference code word, means for generating a coincidence signal when said outgoing character code word matches said reference code word, and logic means responsive to said coincidence signal for actuating the address advancing means for the input/output means coupled memory unit to continue the same through its operating sequence, means for sensing the end of said operating sequence, and means responsive to the end of said operating sequence for terminating the operation of said address advancing means.

74. A system as defined in claim 71 wherein the beginning of a message is identified by a multiple character recognition code, and wherein said logic means includes means for establishing a search mode of operation to locate a particular recognition code comprising means for storing reference characters constituting a recognition code, means for generating an external search command signal and means responsive to said external search command signal, and to said retrieval mode signal to enter said storage means, a particular recognition code, means responsive to completion of entry in said storage means of said recognition code for initiating operation of the system in its removal data retrieval mode, means for comparing the contents of the data provided to said input/output means by the intermediate memory unit coupled thereto with said stored recognition code, means responsive to a match between said recognition code, and the data in said input/output means to terminate said search operation.

75. A memory system for storage and retrieval of information in the form of multibit character code words, comprising input/output means, first coupling means adapted to receive data from an external data source, and adapted to provide data to an external data utilization device; intermediate memory means comprising first and second memory units, each having capacity for storing a block of data comprising a number of character code words, each of said intermediate memory units having a plurality of individually accessible memory sites, said memory units being selectively operable to write a data bit in an addressed memory site or to read out a data bit from an addressed memory site; counter means associated with each of said memory units to address the individual memory sites thereof; read/write control means coupled to each of said memory units to select read or write operation for an addressed memory site; data storage means comprising transport means adapted to handle a magnetic tape as a principal memory for said system, record circuitry for coupling data to said tape, and playback circuitry for receiving data from said tape; selection means having a first state in which the first memory unit is coupled to the input/output means and the second memory unit is coupled to said data storage means, and a second state in which the second memory unit is coupled to the input/ouput means and the first memory unit is coupled to said data storage means; mode selection means for establishing data storage and retrieval modes of system operation, and for providing signals representative of the selected mode; clock means for generating a first pulse train, an actuating signal, counter means responsive to said first pulse train and to said actuating signal to generate a series of timing pulses with the first of said timing pulses in predetermined time relation to said actuating signal; first transfer means for transferring data between said input/output means and the input/output means coupled memory unit; second transfer means including said record and playback circuitry for transferring data between the data storage means coupled memory unit and said data storage means; data transfer control means responsive to said mode selection signals for operating the read/write control means, said first and second transfer means, and said intermediate memory units such that, when the respective address counters are operated, the input/output means coupled memory unit is conditioned to write data for the information storage mode of operation, and to read out data for the information retrieval mode of operation, and the data storage means coupled memory unit is conditioned to read out data for the information storage mode of operation, and to write data for the information retrieval mode of operation; means responsive to said data storage mode signal and to incoming data to generate said actuating signal for said timing pulse generating counter; means for generating an external playback initiation signal; means responsive to said retrieval mode signal and to said external playback initiation signal to generate a succession of said actuating signals for said timing pulse generating counter; means responsive to said timing pulses to advance the addressing counter for the input/output means coupled memory unit one count for each timing pulse, means responsive to a predetermined first count in the addressing counter for the input/output means coupled memory unit corresponding to the address of the last memory site to generate a first switching signal; means responsive to said first switching signal to switch the state of said selection means; means responsive to said first switching signal to reset the address counters for said first and second memory units to a predetermined second count corresponding to the address of the first memory site; further means responsive to said first switching signal to start said tape transport; means responsive to operation of said tape transport and said first pulse train to generate a control pulse train; means responsive to said control pulse train and said storage mode signal for advancing the address counter for the data storage means coupled memory unit; means adapted to store on the tape, each control pulse along with the corresponding data pulse for the data storage means coupled memory unit; means responsive to said retrieval mode signal and to control pulses stored on said tape to advance the address counterfor the data storage means coupled memory unit; means responsive to said predetermined first count in the address counter for the data storage means coupled memory unit and to said storage mode signal to generate a second switching signal; and means responsive to said second switching signal to stop said tape transport and to terminate said control pulse train.

76. A system as defined in claim 75 including means responsive to said first switching signal to delay the generation of the control pulse train, and to inhibit operation of said recording circuit for a predetermined interval to allow said tape transport to reach its normal operating speed.

77. A system as defined in claim 76 including means connected to said playback circuit for sensing control pulses recorded on said tape, means for stopping said tape transport after a predetermined interval if control pulses are not detected by said sensing means; and means for inhibiting operation of said transport stopping means during the predetermined start-up delay interval.

78. A system as defined in claim 77 further including means for establishing a load operation sequence comprising means responsive to an external load command to place said selection means in its second state and to said retrieval mode signal to activate said transport drive means and to deactivate said transport stopping means; means responsive to the next control pulse detected by said sensing means to reactivate said transport stopping means; and means responsive to said external load command to said first count in the address counter for said first intermediate memory unit to generate said first switching signal.

79. A memory system as defined in claim 75 wherein said second transfer means includes first and second record and first and second playback circuits, said first record circuit and said first playback circuit being associated with a first tape track for data pulses, and a second record circuit and said second playback circuit being associated with a separate tape track for recording said control pulses.

80. A system as defined in claim 75 wherein said input/output means is adpated to accept incoming character code words serially commencing with a predetermined non-information bearing bit; wherein said means to activate said timing pulse generating counter is responsive to said non-information bearing bit in an incoming character code word; said counter including means to provide a first timing pulse at a predetermined count corresponding to the nominal center of the bit period of the first information bearing bit of the incoming character code word; means for providing further timing pulses at a succession of counts corresponding to the nominal centers of the bit periods for the other information bearing bits of said incoming character code word, means for collecting said timing pulses to form said series of pulses, and means for deactivating and resetting said counter when a predetermined maximum count is reached.

81. A system as defined in claim 80 wherein said input/output means is adapted to accept incoming code words in parallel form, wherein said means to actuate said timing pulse generating counter is responsive to appearance of a code word in parallel form to generate said actuating signal, and also to generate a parallel data entry control signal, means responsive to said parallel data entry control signal to enter the bits of said incoming code word simultaneously into said input/output means, and means responsive to said series of timing pulses to transfer data from said input/output means into the input/output means coupled intermediate memory unit on a bit-by-bit basis.

82. A system as defined in claim 81 wherein said input/output means comprises a shift register having a number of stages sufficient to store an entire character code word, and wherein said first coupling means includes means adapted to couple data serially between said shift register and serial external equipment and in parallel between said shift register and parallel external equipment; and wherein said first transfer means comprises means for coupling data serially between said shift register and the input/output means coupled memory unit.

83. A system as defined in claim 81 wherein said first coupling means includes means for transmitting data one bit at a time at a bit rate which is equal to the repetition rate of said timing pulses; and wherein said timing pulse generating counter includes means for generating an additional pulse preceding said timing pulses by an interval equal to the interval between data bits at said data bit rate, and means responsive to said additional pulse for generating an initial bit for transmission as part of each character code word.

84. A system as defined in claim 75 including error correction control logic comprising means for generating an error correction signal, means responsive to said error correction signal and to said storage mode signal to generate said actuating signal for said timing pulse generating counter; and means responsive to said error correction signal to operate the address counter for the input/output means coupled memory unit in a reverse direction in response to each of said timing pulses.

85. A memory system as defined in claim 84 wherein said error correction control means includes means responsive to said predetermined second count in the address counter for the input/output means coupled memory unit to generate said first switching signal; means responsive to said error correction signal to inhibit reset of said intermediate memory address counters in response to said first switching signal; means responsive to said first switching signal and said error correction signal to operate said tape transport unit in a reverse direction; means for actuating said playback circuit during said reverse operation; means connected to said playback circuit for sensing recorded control pulses; and means for stopping said tape transport after a predetermined interval if control pulses are not detected by said sensing means.

86. A system as defined in claim 75 including means for establishing a search mode of operation for locating a recognition code comprising a combination of characters stored in said tape comprising reference character storage means; means for generating a reference storage signal; means responsive to said reference storage signal, to said retrieval mode signal, and to incoming data to store said data in said character storage means; means responsive to storage of said recognition code in said character storage means for generating a search operation signal and said playback initiation signal; means responsive to said search operation signal to inhibit operation of said first coupling means; means for comparing data provided to said input/output means from said input/output means coupled memory unit with the data contained in said character storage means and for generating a coincidence signal when said data match; and means responsive to said coincidence signal for terminating said search operation.

87. A system as defined in claim 86 wherein said system is capable of handling data at a variety of data rates; and wherein said clock means is operative to provide said first pulse train during a search operation at a frequency such that the repetition rate of said timing pulses is equal to or greater than the maximum data bit rate at which the system can operate.

88. A system as defined in claim 86 wherein said character storage means comprises a plurality of latch circuits, one of said latch circuit being provided for each bit of said recognition code; means for coupling said latch circuits to said input/output means; and means for actuating said latch circuits to receive data from said input/output means when an incoming character is present.

89. A system as defined in claim 88 wherein said input/output means includes a shift register having a sufficient number of bit positions to store the complete recognition code; wherein each of said latch circuits is connected to one of the shift register bit positions; and wherein said comparing means comprises a plurality of individual comparator circuits connected to one of said latch circuits and to the corresponding bit position of the shift register.

90. A system as defined in claim 75 wherein the end of a complete message is identified by a particular terminal character; and further including means connected to said input/output means for sensing said terminal character and for generating a coincidence signal when said character is detected, means responsive to said coincidence signal for generating an actuating signal for said timing pulse generating counter; means responsive to said storage mode signal and the last one of a series of timing pulses following said coincidence signal to generate a series of control pulses; means for operating the address counter for the input/output associated memory unit in response to said second control pulse train; and means responsive to said first switching signal for preventing generation of said series of control pulses.

91. A system as defined in claim 90 further including means responsive to said coincidence signal and said retrieval mode signal for generating said actuating signal for said timing pulse generating counter; and means responsive to the last one of a series of timing pulses following said coincidence signal for preventing further operation of timing pulse generating counter.

92. A system as defined in claim 75 wherein the frequency of said control pulse train substantially exceeds the repetition rate for said series of timing pulses.

* * * * *